US011539791B1

(12) United States Patent
Mikolajczuk et al.

(10) Patent No.: US 11,539,791 B1
(45) Date of Patent: Dec. 27, 2022

(54) METHODS, APPARATUSES AND COMPUTER PROGRAM PRODUCTS FOR SYNCHRONIZING DATA OBJECTS BETWEEN AND AMONG APPLICATION SERVICE SYSTEMS

(71) Applicants: ATLASSIAN PTY LTD, Sydney (AU); ATLASSIAN INC, San Francisco, CA (US)

(72) Inventors: Pawel Mikolajczuk, Siedlce (PL); Nathaniel Benton Jones, Marietta, GA (US); Thomas Whalen-Bridge, Belfast (GB); Michal Szymandera, Gdansk (PL)

(73) Assignees: ATLASSIAN PTY LTD, Sydney (AU); ATLASSIAN, INC., San Francisco, CA (US)

( * ) Notice: Subject to any disclaimer, the term of this patent is extended or adjusted under 35 U.S.C. 154(b) by 0 days.

(21) Appl. No.: 17/449,323

(22) Filed: Sep. 29, 2021

(51) Int. Cl.

| | |
|---|---|
| ***H04L 67/1095*** | (2022.01) |
| ***G06F 16/23*** | (2019.01) |
| ***G06F 16/22*** | (2019.01) |
| ***G06F 16/27*** | (2019.01) |

(52) U.S. Cl.
CPC ...... *H04L 67/1095* (2013.01); *G06F 16/2282* (2019.01); *G06F 16/2322* (2019.01); *G06F 16/275* (2019.01)

(58) Field of Classification Search
CPC ............. H04L 67/1095; G06F 16/2282; G06F 16/275; G06F 16/2322
See application file for complete search history.

(56) References Cited

U.S. PATENT DOCUMENTS

2011/0173294 A1* 7/2011 Jackson .................. H04L 12/14 709/217
2015/0058287 A1* 2/2015 Zhang ..................... H04L 67/10 707/610

* cited by examiner

*Primary Examiner* — Wing F Chan
*Assistant Examiner* — Billy H Ng
(74) *Attorney, Agent, or Firm* — Alston & Bird LLP

(57) ABSTRACT

Various embodiments herein described are directed to methods, apparatuses and computer program products configured for improving data synchronization in on-premises application service systems. In some embodiments, an on-premises application service system may transmit a synchronization check message to an in-cloud application service system and receive a synchronization request message in response. Based at least in part on the synchronization request message, the on-premises application service system transmits data objects to the in-cloud application service system for synchronization. Additional example embodiments provide various example methods of managing synchronizations between on-premises application service systems and in-cloud application service systems that improve data security and reduce network traffic.

20 Claims, 27 Drawing Sheets

METHODS, APPARATUSES AND COMPUTER PROGRAM PRODUCTS FOR SYNCHRONIZING DATA OBJECTS BETWEEN AND AMONG APPLICATION SERVICE SYSTEMS

BACKGROUND

Applicant has identified many technical deficiencies and problems associated with synchronizing data in complex network computer systems.

BRIEF SUMMARY

In general, embodiments of the present disclosure provide methods, apparatus, systems, computing devices, and/or the like for improving data synchronization in application service systems.

In accordance with various embodiments of the present disclosure, an apparatus for synchronizing data between an on-premises application service system and an in-cloud application service system is provided. The apparatus comprises at least one processor and at least one non-transitory memory comprising program code. The at least one non-transitory memory and the program code configured to, with the at least one processor, cause the apparatus to at least: transmit, by the on-premises application service system, a synchronization check message to the in-cloud application service system, wherein the synchronization check message comprises an electronic request to obtain at least one synchronization request message; receive, by the on-premises application service system and from the in-cloud application service system, the at least one synchronization request message comprising at least one synchronization topic indicator and at least one synchronization schedule indicator; retrieve, by the on-premises application service system and from an on-premises data object repository associated with the on-premises application service system, at least one on-premises data object based at least in part on the at least one synchronization topic indicator of the at least one synchronization request message; transmit, by the on-premises application service system, a duplicate copy of the at least one on-premises data object to the in-cloud application service system based at least in part on the at least one synchronization schedule indicator of the at least one synchronization request message; and subsequent to transmitting the duplicate copy of the at least one on-premises data object, receive, by the on-premises application service system and from the in-cloud application service system, at least one synchronization completion success message.

In some embodiments, the at least one non-transitory memory and the program code are configured to, with the at least one processor, cause the apparatus to at least: receive, by the on-premises application service system, on-premises data object update metadata associated with the at least one on-premises data object stored in the on-premises data object repository associated with the on-premises application service system; generate, by the on-premises application service system and based at least in part on the on-premises data object update metadata, at least one synchronization update message comprising at least one update topic indicator; and add, by the on-premises application service system, the at least one synchronization update message to a processing queue object of the on-premises application service system.

In some embodiments, the processing queue object comprises a plurality of synchronization update messages. In some embodiments, the at least one non-transitory memory and the program code are configured to, with the at least one processor, cause the apparatus to process the plurality of synchronization update messages from the processing queue object by at least: transmitting the at least one synchronization update message to the in-cloud application service system; and subsequent to transmitting the at least one synchronization update message, updating the processing queue object.

In some embodiments, the in-cloud application service system comprises an inbound message queue table object and a message status table object. In some embodiments, the at least one non-transitory memory and the program code are configured to, with the at least one processor, cause the apparatus to at least: transmit, by the on-premises application service system, the at least one synchronization update message to the inbound message queue table object of the in-cloud application service system; and cause the in-cloud application service system to add a message processing status indicator to the message status table object corresponding to the at least one synchronization update message.

In some embodiments, the at least one non-transitory memory and the program code are configured to, with the at least one processor, cause the apparatus to at least: cause the in-cloud application service system to determine whether a time period indicator between a previous message processing time indicator and a current system time indicator satisfies a message processing time interval threshold; in response to determining that the time period indicator satisfies the message processing time interval threshold: cause the in-cloud application service system to retrieve the at least one synchronization update message from the inbound message queue table object; and cause the in-cloud application service system to update the message processing status indicator to indicate a processing status of the at least one synchronization update message.

In some embodiments, the at least one non-transitory memory and the program code are configured to, with the at least one processor, cause the apparatus to at least: cause the in-cloud application service system to determine whether an in-cloud data object repository associated with the in-cloud application service system comprises at least one in-cloud data object that corresponds to the at least one on-premises data object associated with the at least one synchronization update message.

In some embodiments, the at least one non-transitory memory and the program code are configured to, with the at least one processor, cause the apparatus to at least: in response to the in-cloud data object repository associated with the in-cloud application service system not comprising the at least one in-cloud data object that corresponds to the at least one on-premises data object, cause the in-cloud application service system to generate a second synchronization request message associated with the at least one on-premises data object; and cause the in-cloud application service system to store the second synchronization request message in an outbound message queue table object associated with the in-cloud application service system.

In some embodiments, the at least one non-transitory memory and the program code are configured to, with the at least one processor, cause the apparatus to at least: in response to the in-cloud data object repository associated with the in-cloud application service system comprising the at least one in-cloud data object that corresponds to the at least one on-premises data object, cause the in-cloud application service system to update the at least one in-cloud data object based at least in part on the at least one synchronization update message.

In some embodiments, the at least one non-transitory memory and the program code are configured to, with the at least one processor, cause the apparatus to at least: cause the in-cloud application service system to determine whether updating the at least one in-cloud data object is successful.

In some embodiments, the at least one non-transitory memory and the program code are configured to, with the at least one processor, cause the apparatus to at least: in response to the updating being successful, cause the in-cloud application service system to update the message processing status indicator to indicate a synchronization completion success message; and cause the in-cloud application service system to transmit the synchronization completion success message to the on-premises application service system.

In some embodiments, the at least one non-transitory memory and the program code are configured to, with the at least one processor, cause the apparatus to at least: in response to the updating being not successful, cause the in-cloud application service system to update the message processing status indicator to indicate a synchronization completion failure message; and cause the in-cloud application service system to transmit the synchronization completion failure message to the on-premises application service system.

In some embodiments, the in-cloud application service system is associated with an in-cloud data object repository and comprises an outbound message queue table object, wherein the at least one non-transitory memory and the program code are configured to, with the at least one processor, cause the apparatus to at least: cause the in-cloud application service system to receive in-cloud data object update metadata associated with at least one in-cloud data object stored in the in-cloud data object repository, wherein the at least one in-cloud data object corresponds to the at least one on-premises data object stored in the on-premises data object repository; cause the in-cloud application service system to generate, based at least in part on the in-cloud data object update metadata, a second synchronization request message; and cause the in-cloud application service system to add the second synchronization request message to the outbound message queue table object of the in-cloud application service system.

In some embodiments, the at least one non-transitory memory and the program code are configured to, with the at least one processor, cause the apparatus to at least: transmit, by the on-premises application service system, a second synchronization check message to the in-cloud application service system; and receive, by the on-premises application service system, the second synchronization request message in response to the second synchronization check message.

In some embodiments, the in-cloud application service system comprises a message status table object, wherein the at least one non-transitory memory and the program code are configured to, with the at least one processor, cause the apparatus to at least: prior to transmitting the second synchronization check message to the in-cloud application service system, cause the in-cloud application service system to add a message processing status indicator corresponding to the second synchronization request message to the message status table object.

In some embodiments, the at least one non-transitory memory and the program code are configured to, with the at least one processor, cause the apparatus to at least: subsequent to receiving the second synchronization request message: cause the in-cloud application service system to update the message processing status indicator to indicate a processing status of the second synchronization request message; and update the at least one on-premises data object based at least in part on the second synchronization request message.

In some embodiments, the at least one non-transitory memory and the program code are configured to, with the at least one processor, cause the apparatus to at least: cause the in-cloud application service system to determine whether a synchronization completion success message is received within a message acknowledgment time interval.

In some embodiments, the at least one non-transitory memory and the program code are configured to, with the at least one processor, cause the apparatus to at least: in response to the synchronization completion success message being received within the message acknowledgment time interval, cause the in-cloud application service system to update the message processing status indicator to indicate a success status.

In some embodiments, the at least one non-transitory memory and the program code are configured to, with the at least one processor, cause the apparatus to at least: in response to the synchronization completion success message not being received within the message acknowledgment time interval, cause the in-cloud application service system to determine whether a retry counter associated with the second synchronization request message satisfies a synchronization retry threshold.

In some embodiments, the at least one non-transitory memory and the program code are configured to, with the at least one processor, cause the apparatus to at least: in response to the retry counter satisfying the synchronization retry threshold, cause the in-cloud application service system to update the message processing status indicator to indicate a failure status.

In some embodiments, the at least one non-transitory memory and the program code are configured to, with the at least one processor, cause the apparatus to at least: in response to the retry counter not satisfying the synchronization retry threshold, cause the in-cloud application service system to retry transmitting the second synchronization request message to the on-premises application service system.

In accordance with various embodiments of the present disclosure, a computer-implemented method for synchronizing data between an on-premises application service system and an in-cloud application service system is provided. The computer-implemented method comprises transmitting, by the on-premises application service system, a synchronization check message to the in-cloud application service system, wherein the synchronization check message comprises an electronic request to obtain at least one synchronization request message; receiving, by the on-premises application service system and from the in-cloud application service system, the at least one synchronization request message comprising at least one synchronization topic indicator and at least one synchronization schedule indicator; retrieving, by the on-premises application service system and from an on-premises data object repository associated with the on-premises application service system, at least one on-premises data object based at least in part on the at least one synchronization topic indicator of the at least one synchronization request message; transmitting, by the on-premises application service system, a duplicate copy of the at least one on-premises data object to the in-cloud application service system based at least in part on the at least one synchronization schedule indicator of the at least one synchronization request message; and subsequent to transmitting the duplicate copy of the at least one on-premises data object, receiving, by the on-premises application service system and from the in-cloud application service system, at least one synchronization completion success message.

In accordance with various embodiments of the present disclosure, a computer program product for synchronizing data between an on-premises application service system and an in-cloud application service system is provided. The computer program product comprises at least one non-transitory computer-readable storage medium having computer-readable program code portions stored therein, the computer-readable program code portions comprising an executable portion configured to: transmit, by the on-premises application service system, a synchronization check message to the in-cloud application service system, wherein the synchronization check message comprises an electronic request to obtain at least one synchronization request message; receive, by the on-premises application service system and from the in-cloud application service system, the at least one synchronization request message comprising at least one synchronization topic indicator and at least one synchronization schedule indicator; retrieve, by the on-premises application service system and from an on-premises data object repository associated with the on-premises application service system, at least one on-premises data object based at least in part on the at least one synchronization topic indicator of the at least one synchronization request message; transmit, by the on-premises application service system, a duplicate copy of the at least one on-premises data object to the in-cloud application service system based at least in part on the at least one synchronization schedule indicator of the at least one synchronization request message; and subsequent to transmitting the duplicate copy of the at least one on-premises data object, receive, by the on-premises application service system and from the in-cloud application service system, at least one synchronization completion success message.

The above summary is provided merely for purposes of summarizing some example embodiments to provide a basic understanding of some aspects of the disclosure. Accordingly, it will be appreciated that the above-described embodiments are merely examples. It will be appreciated that the scope of the disclosure encompasses many potential embodiments in addition to those here summarized, some of which will be further described below.

BRIEF DESCRIPTION OF THE DRAWINGS

Figure 1:
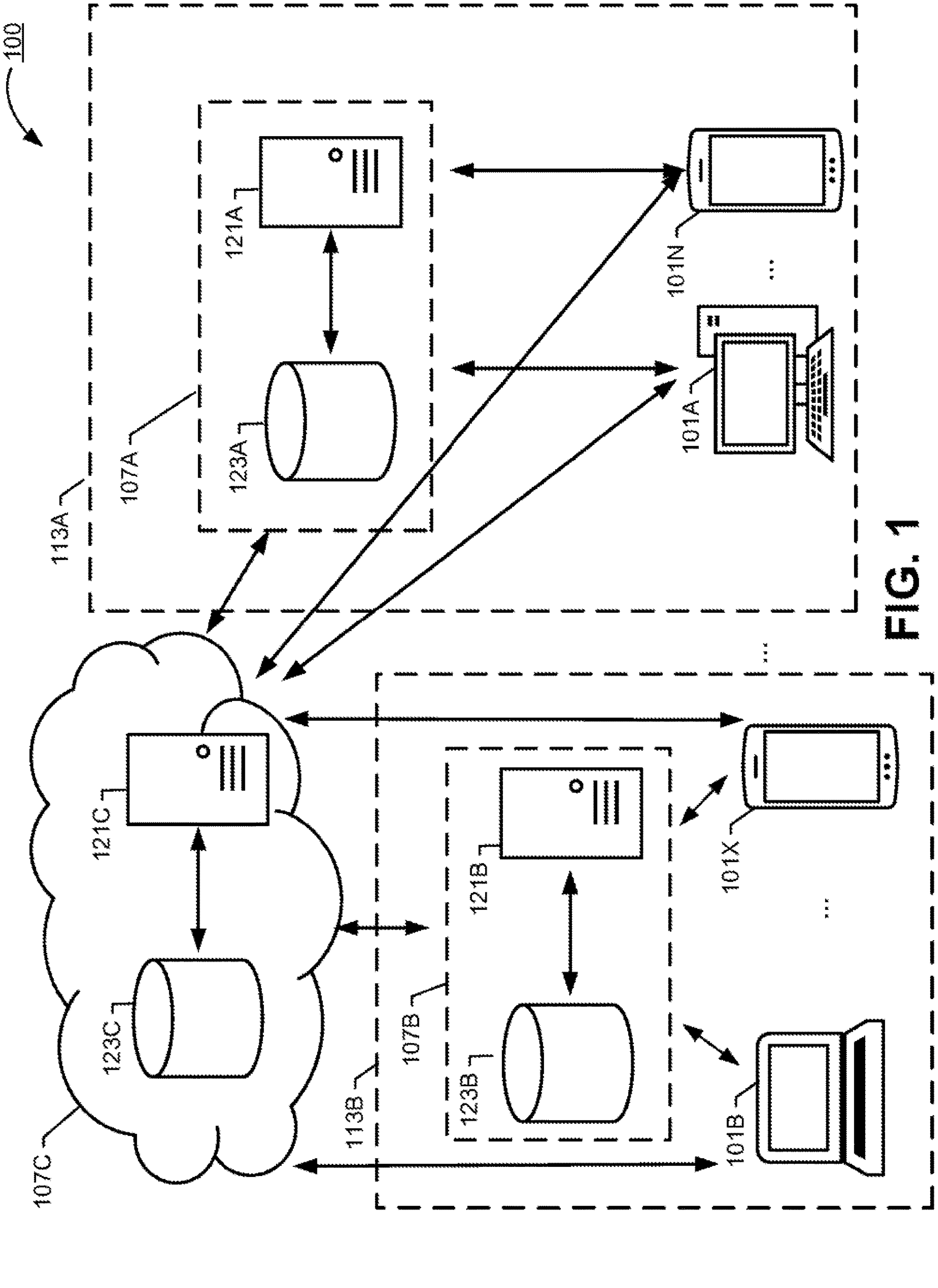
Figure 2:
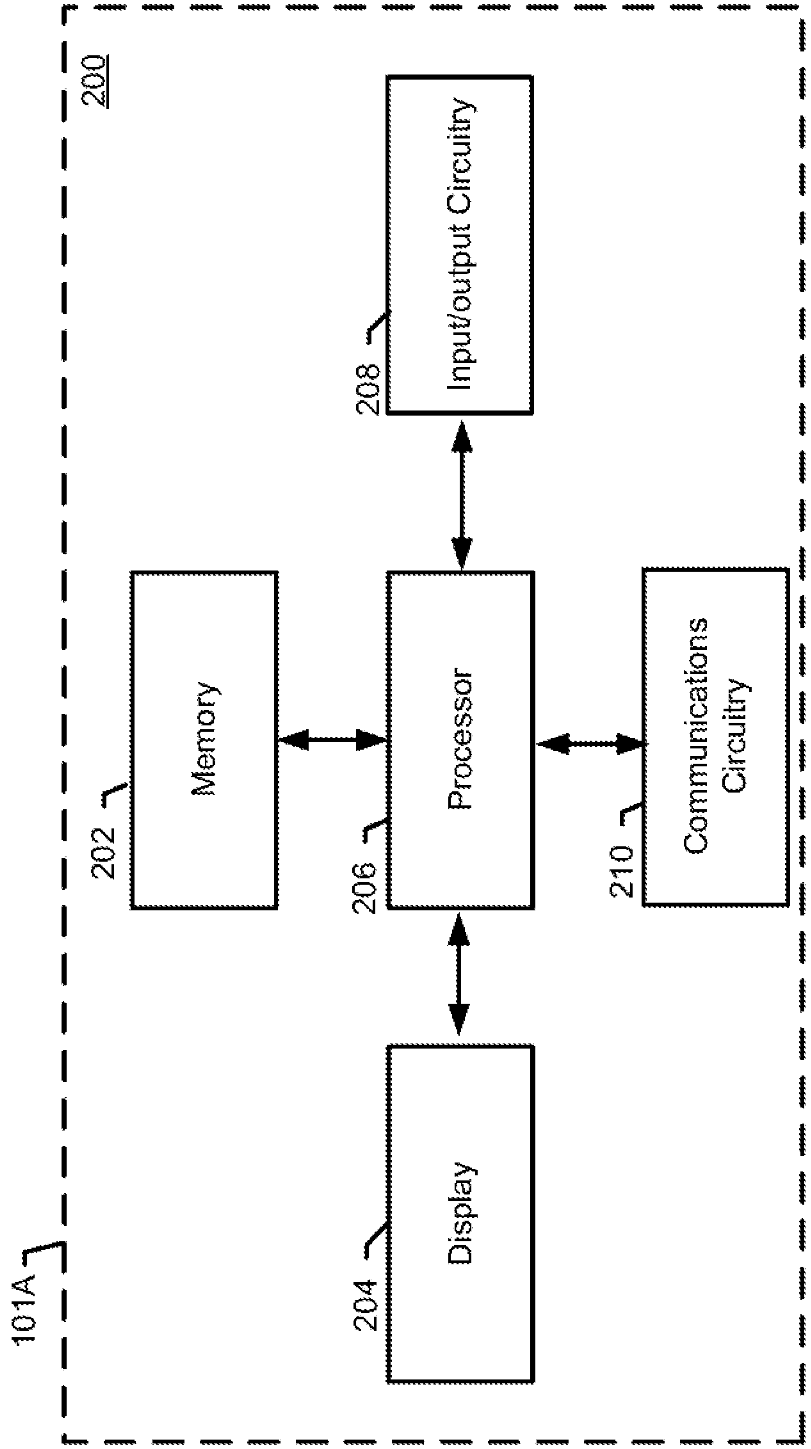
Figure 3:
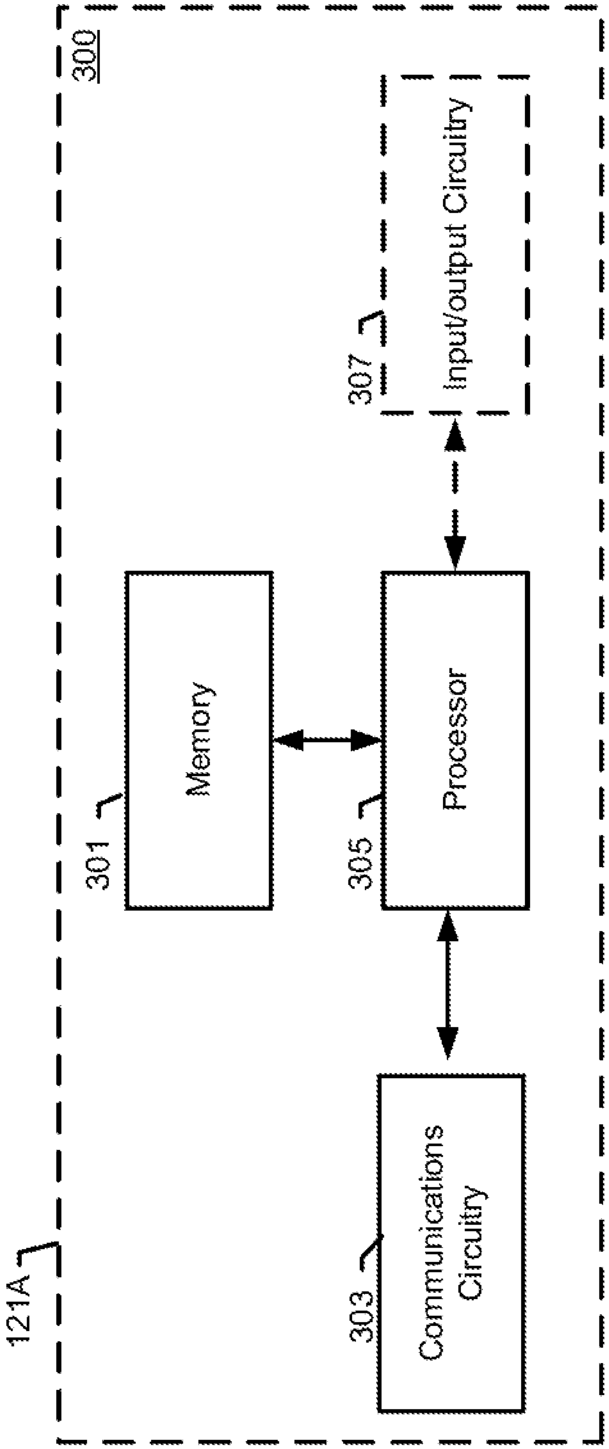
Figure 4:
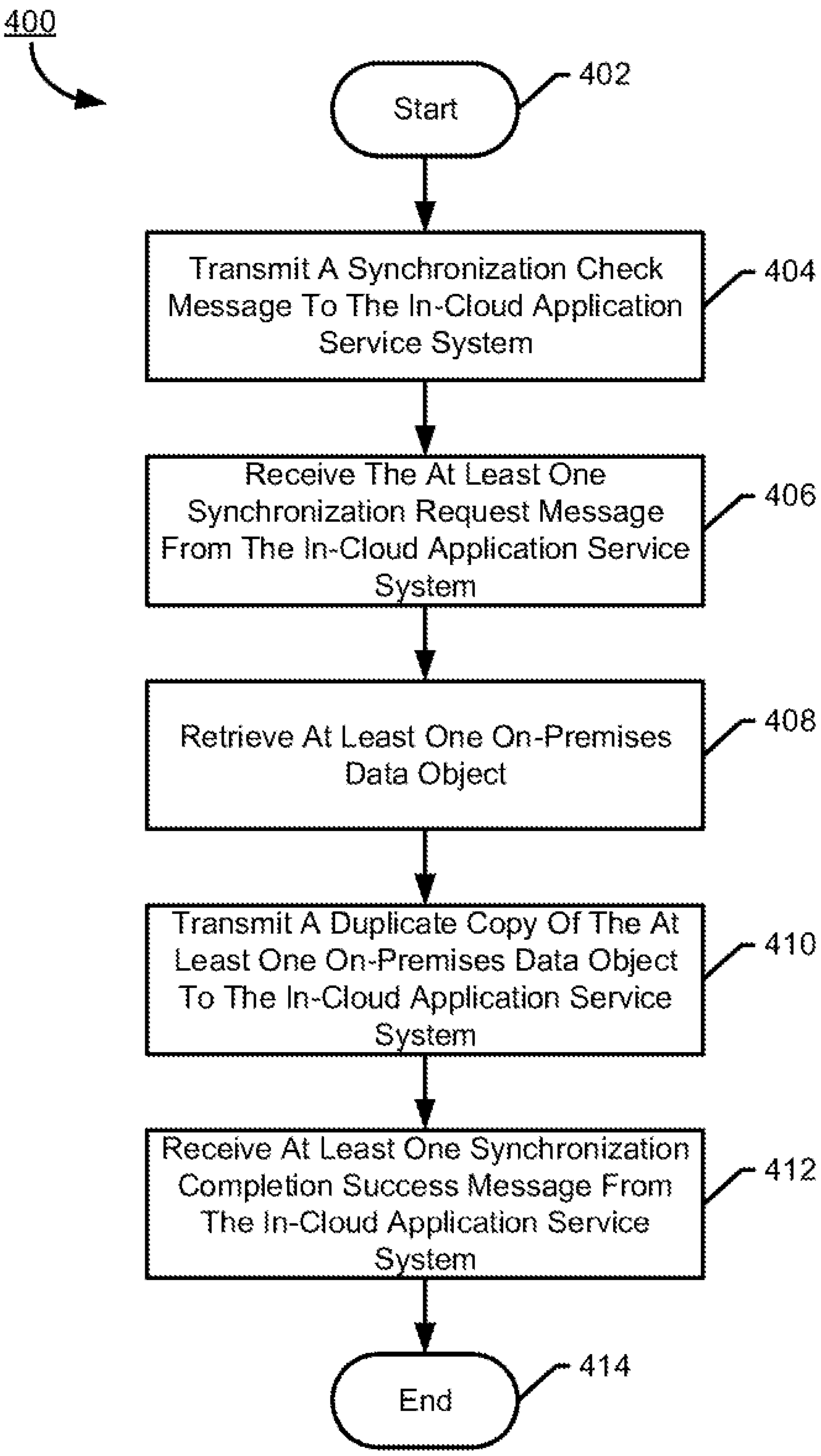
Figure 5A:
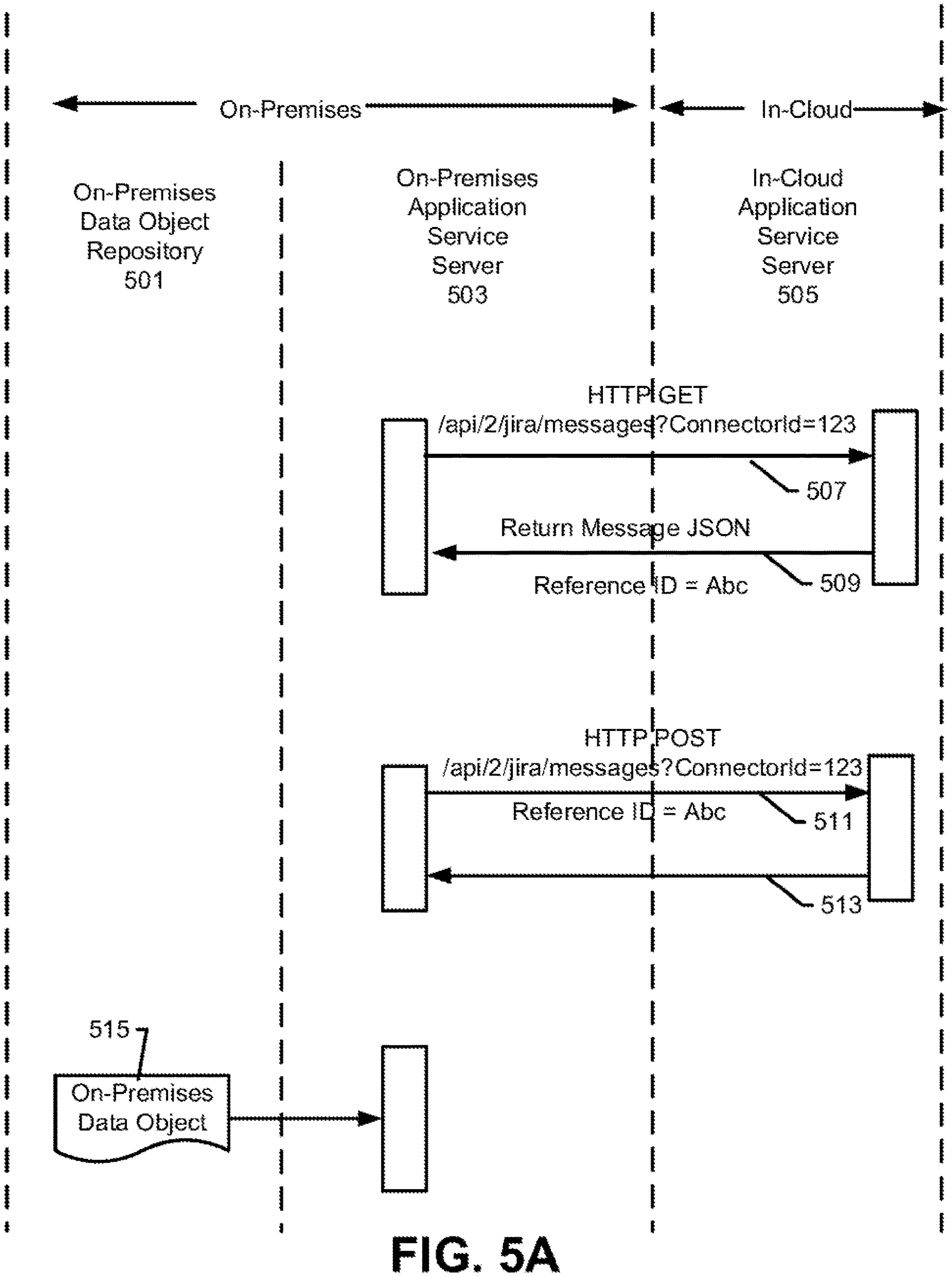
Figure 5B:
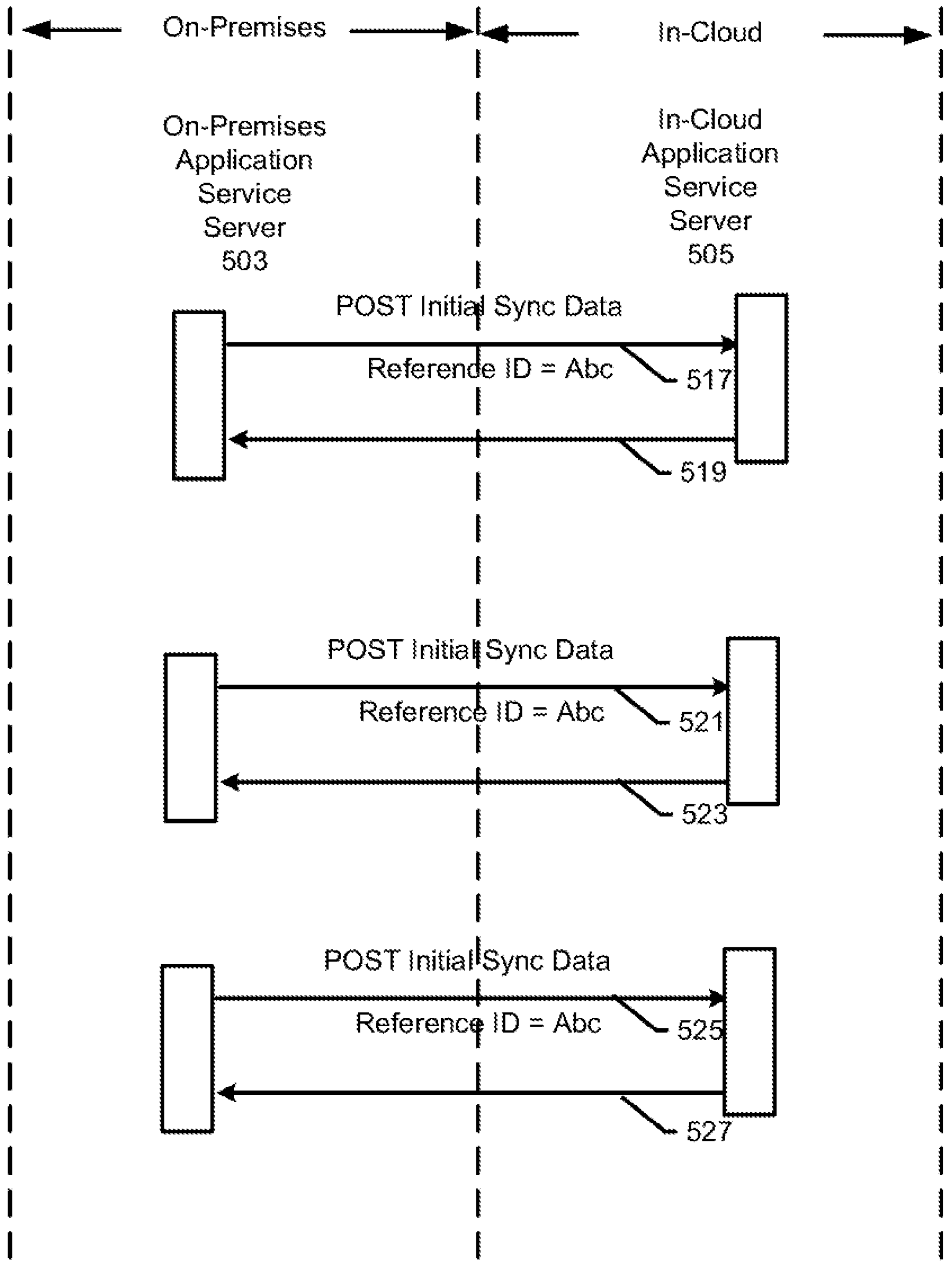
Figure 5C:
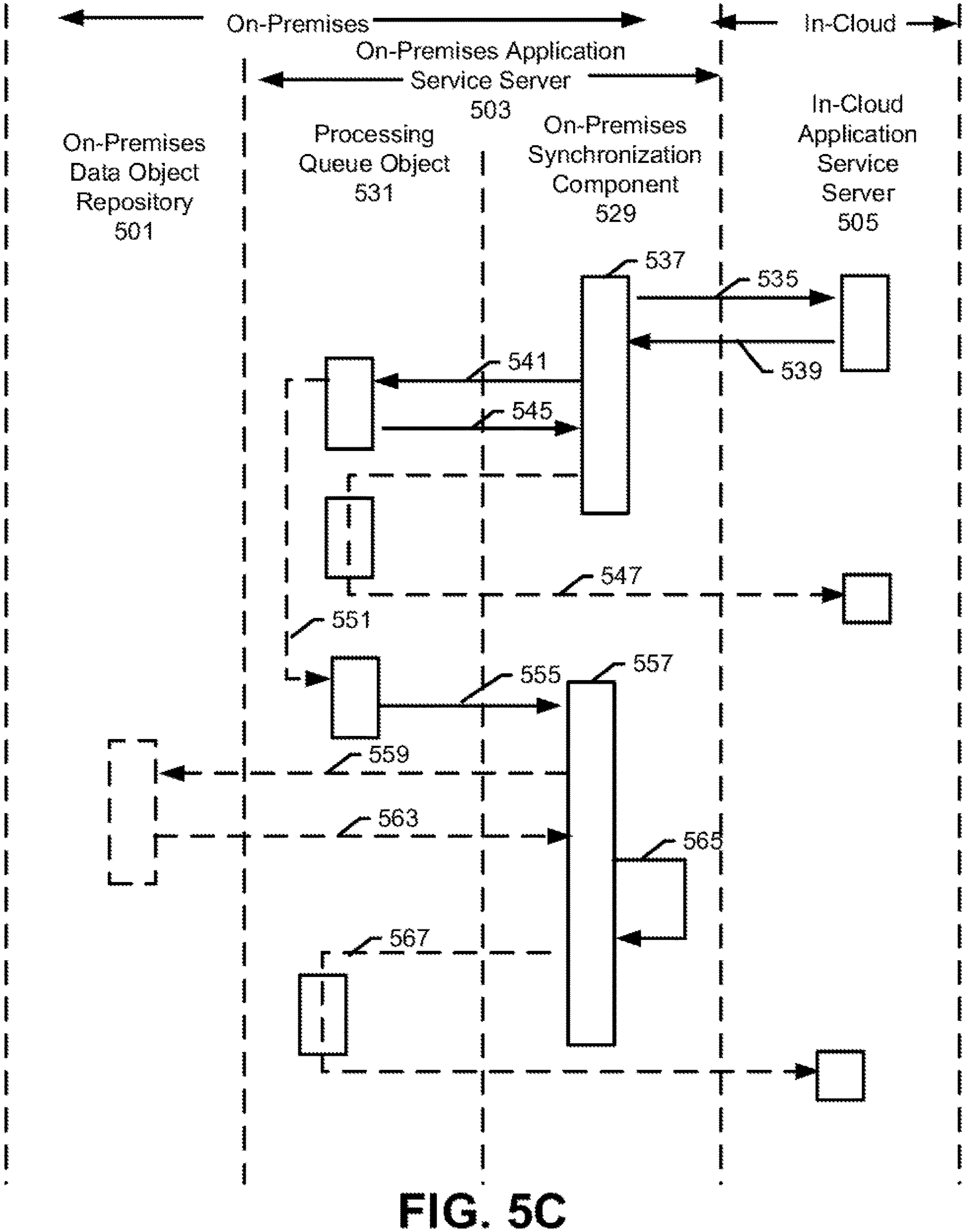
Figure 5D:
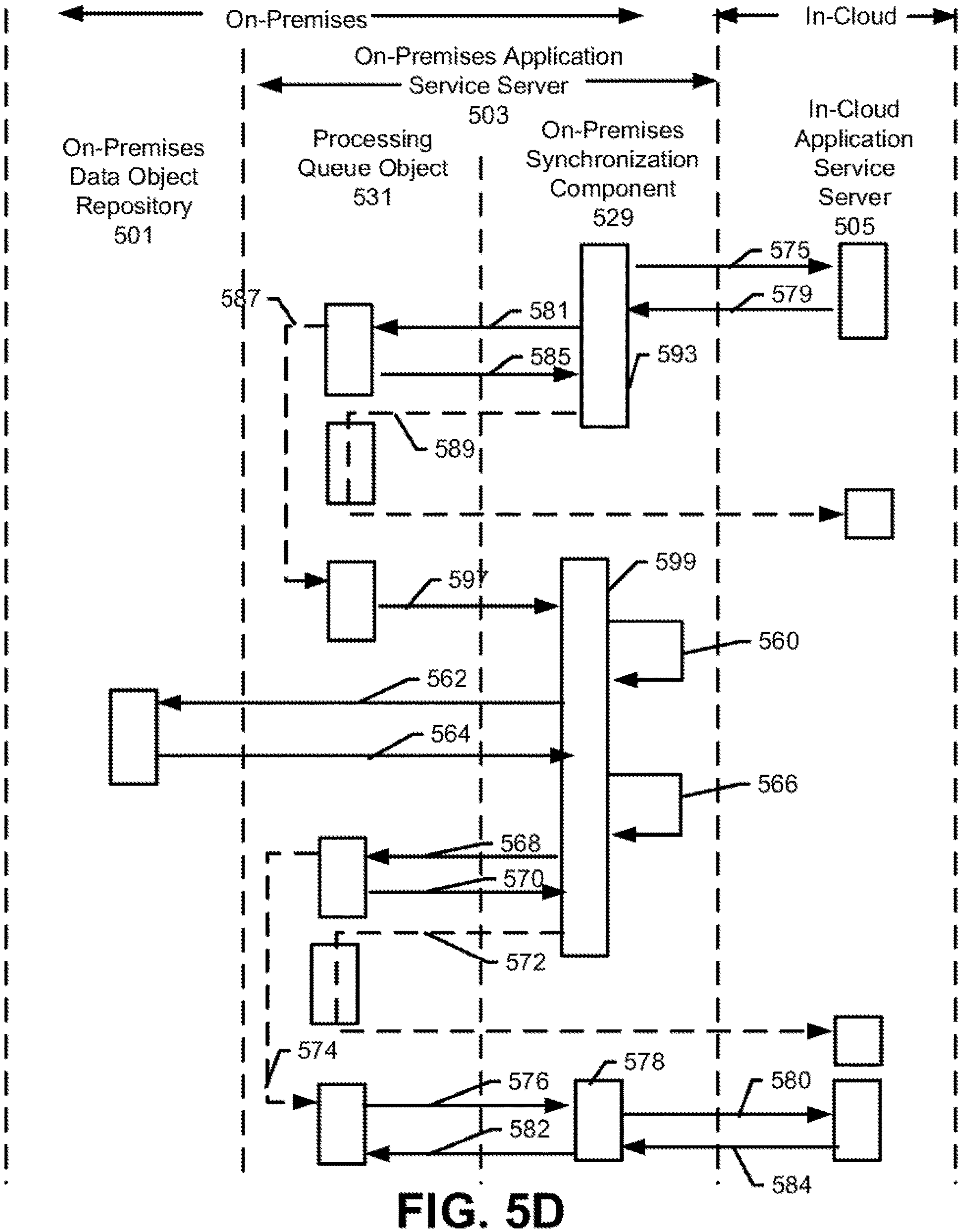
Figure 6A:
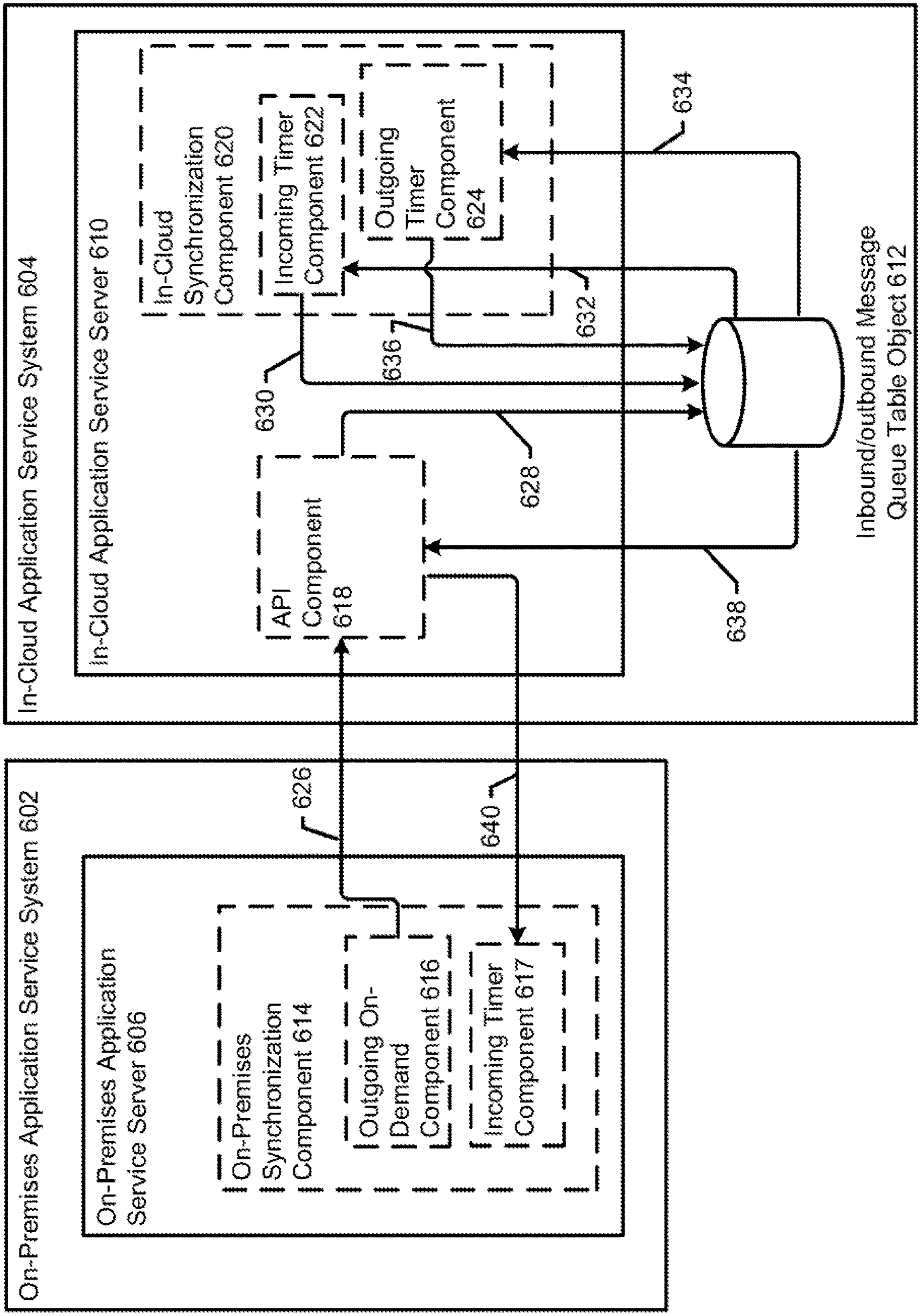
Figure 6B:
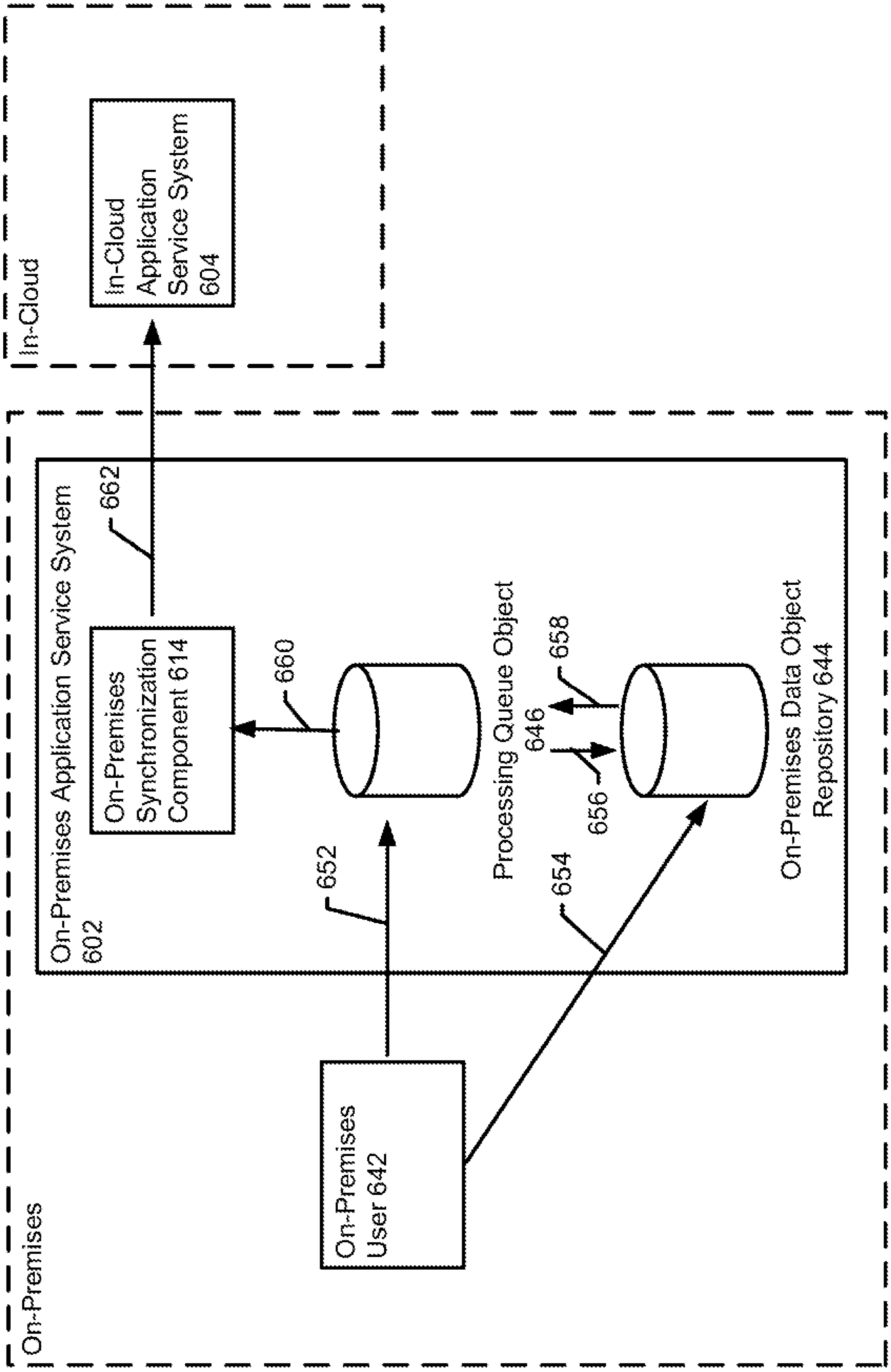
Figure 6C:
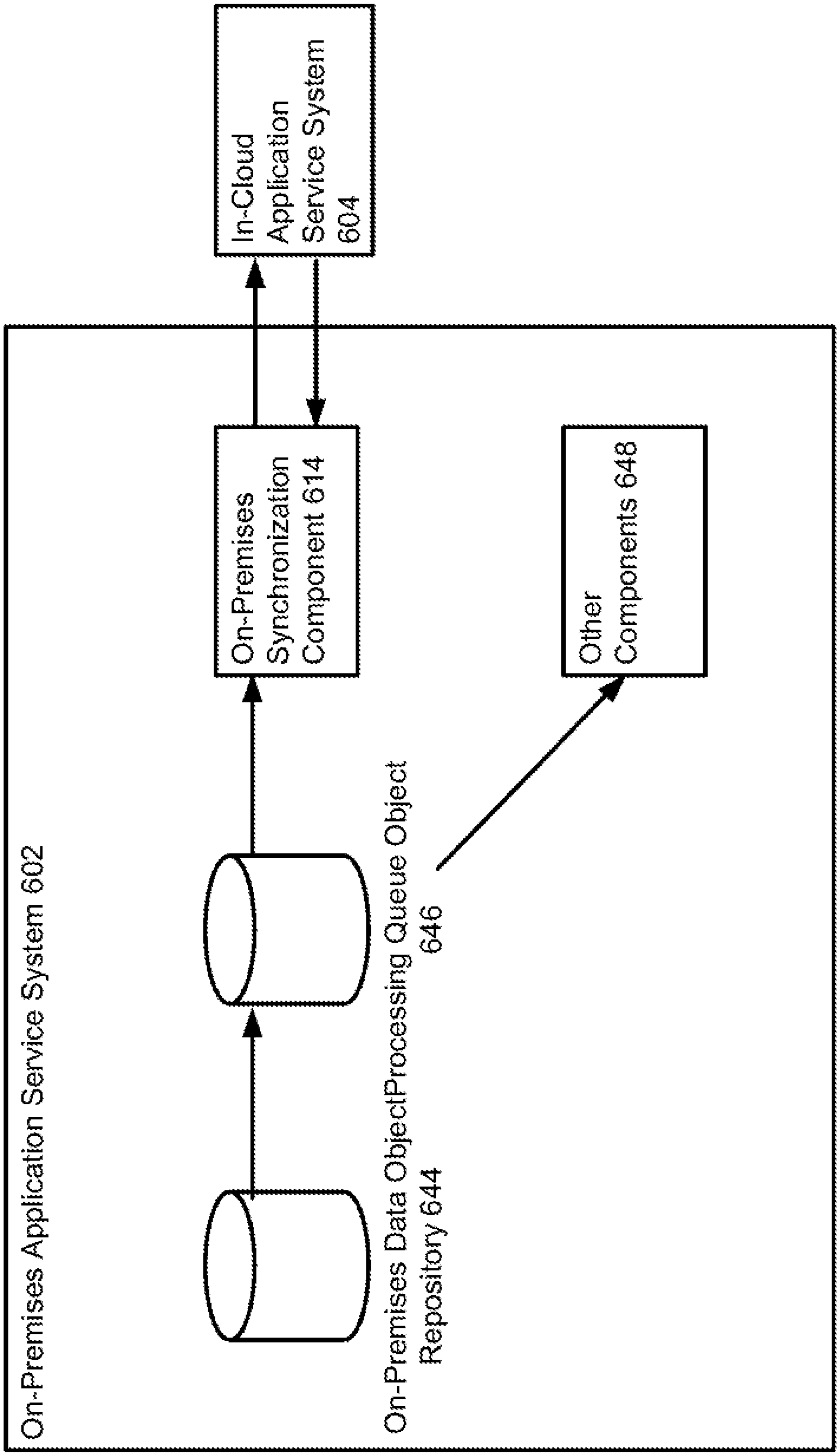
Figure 7:
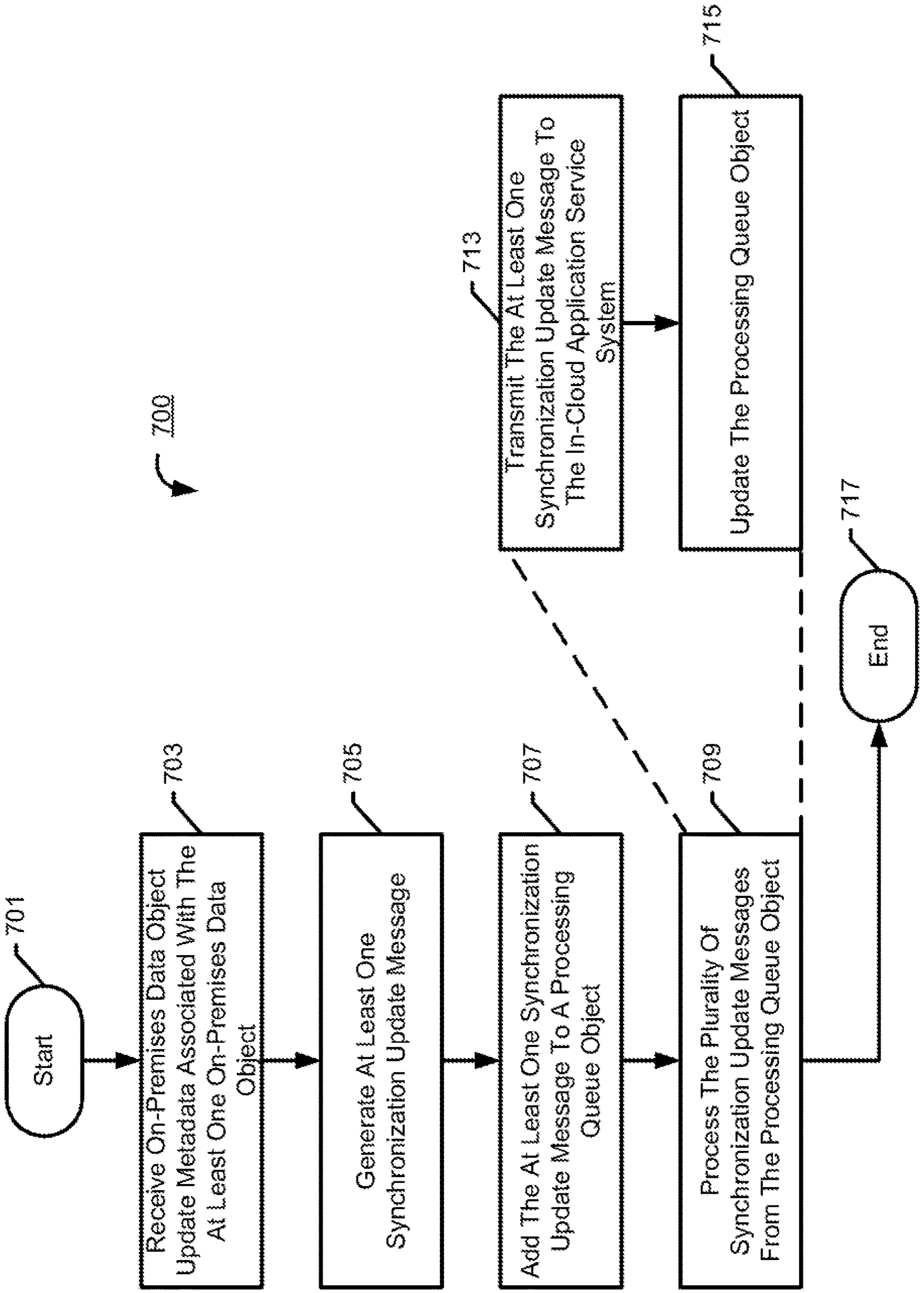
Figure 8:
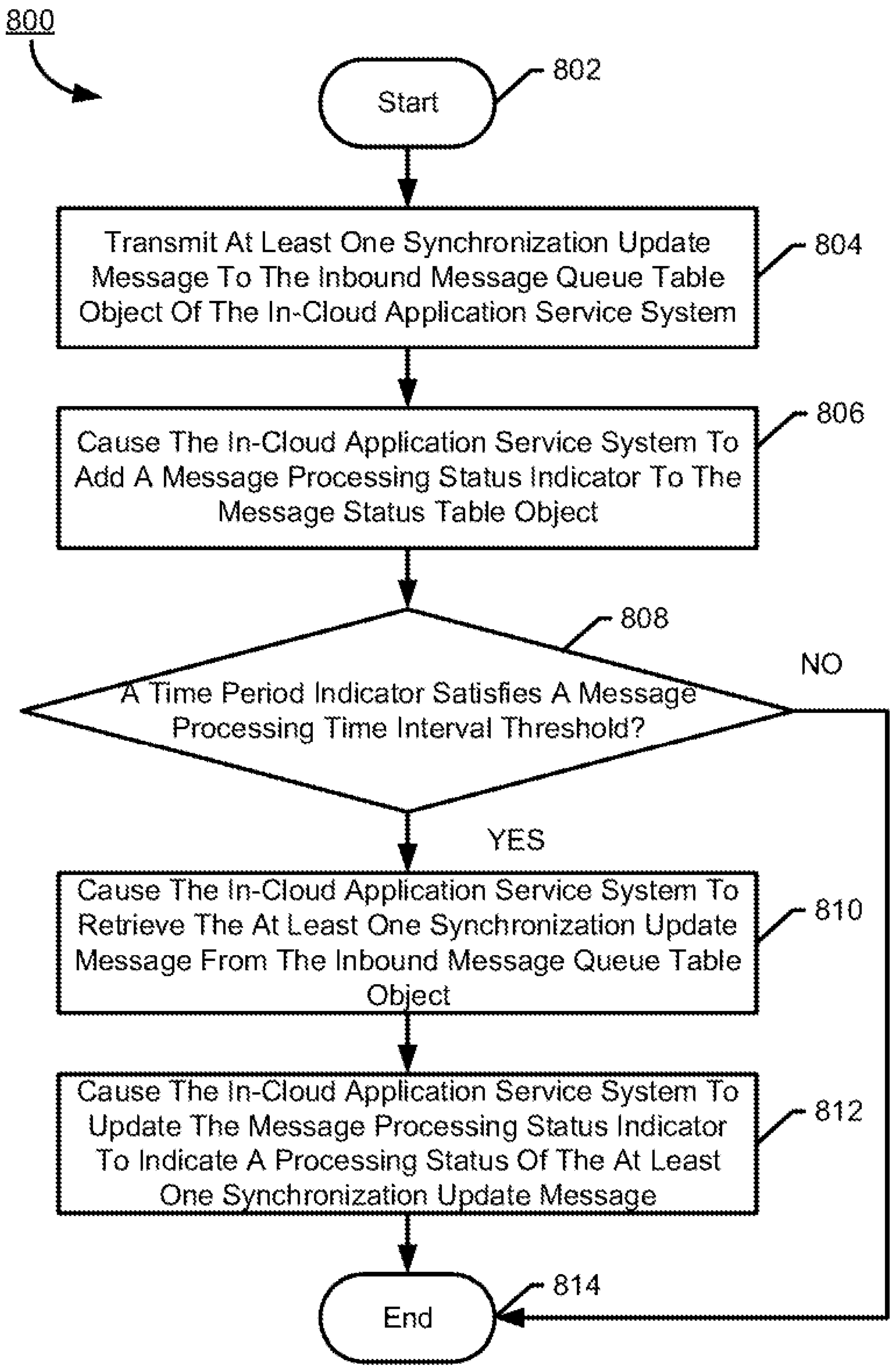
Figure 9A:
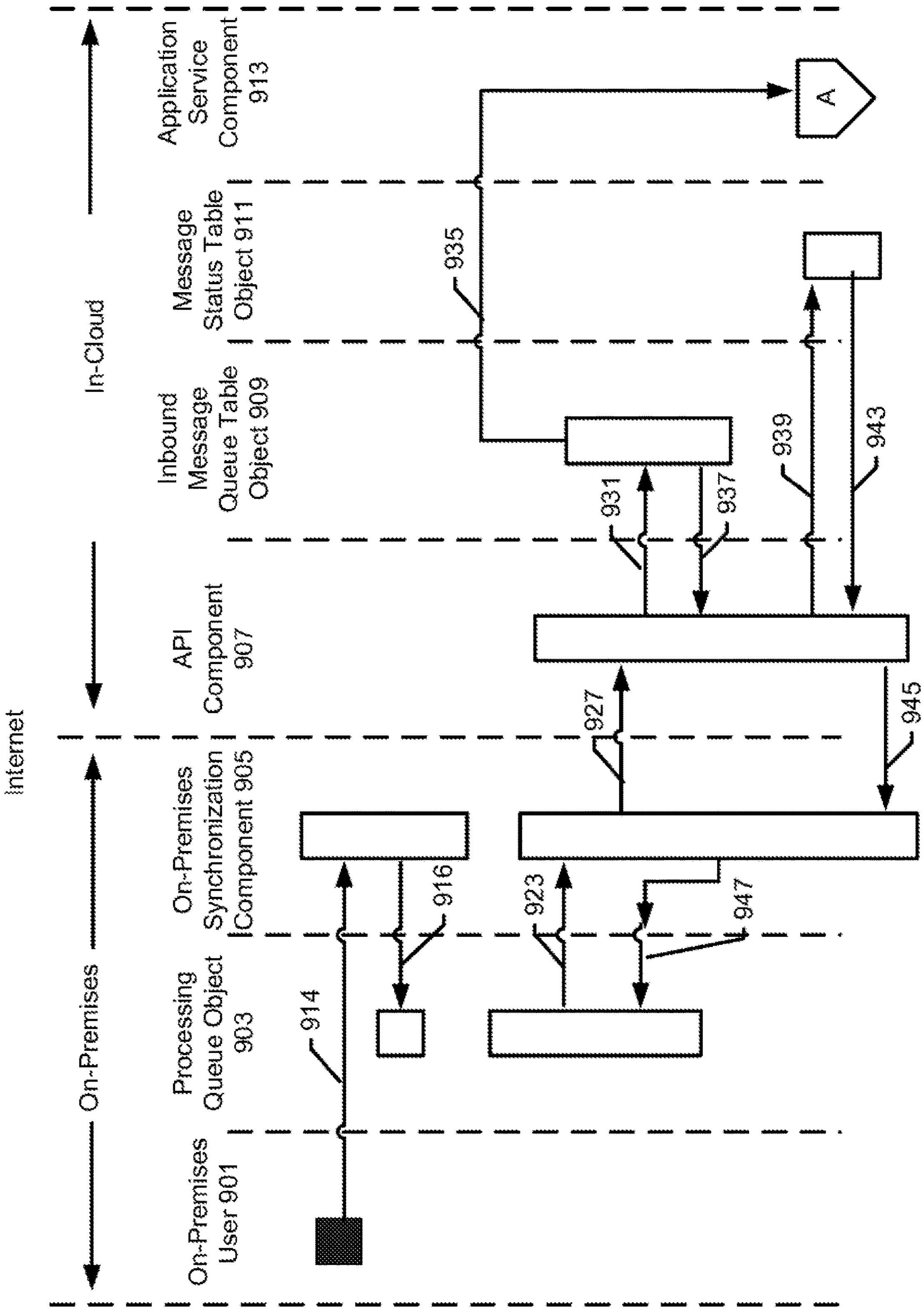
Figure 9B:
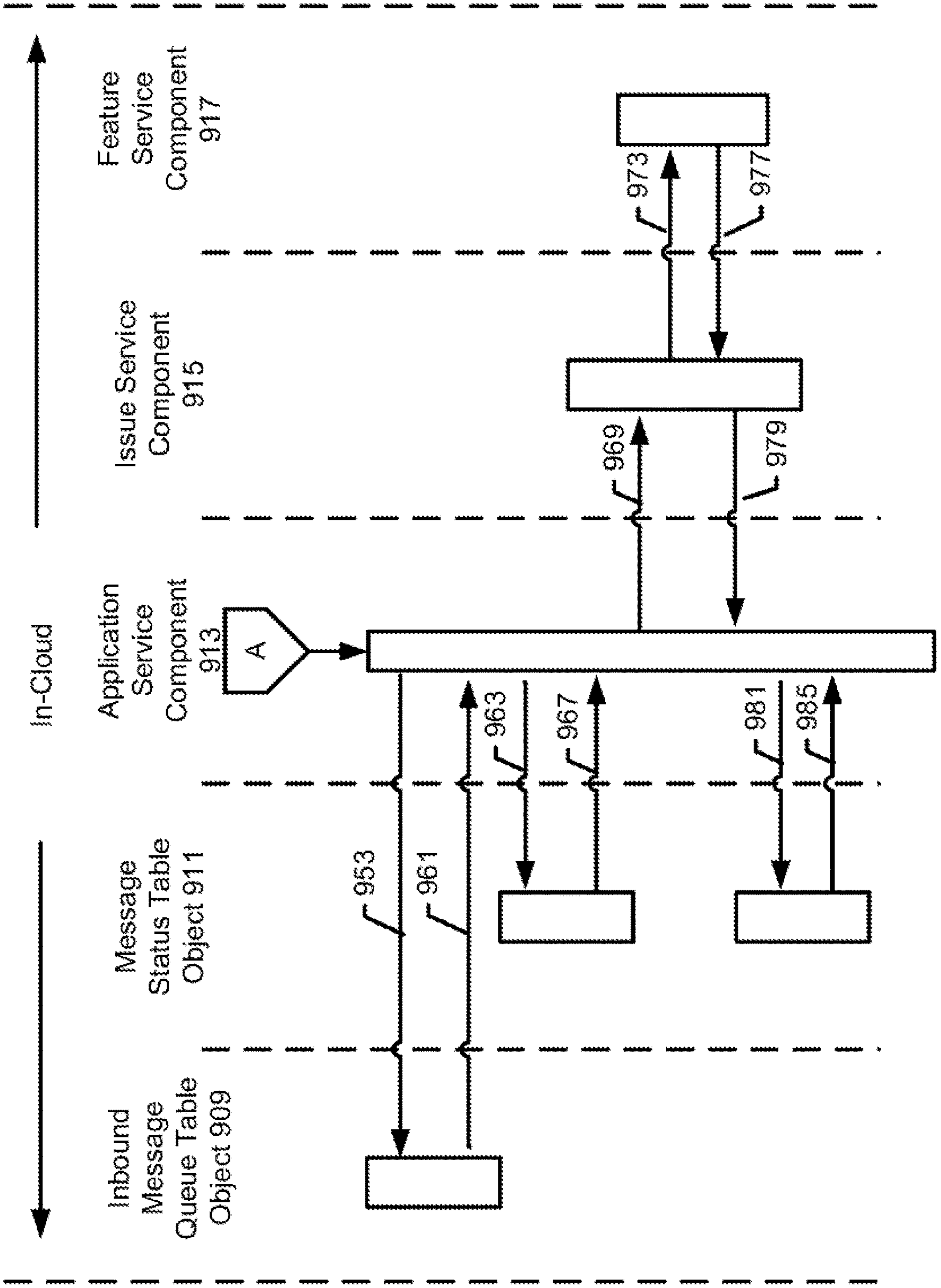
Figure 10A:
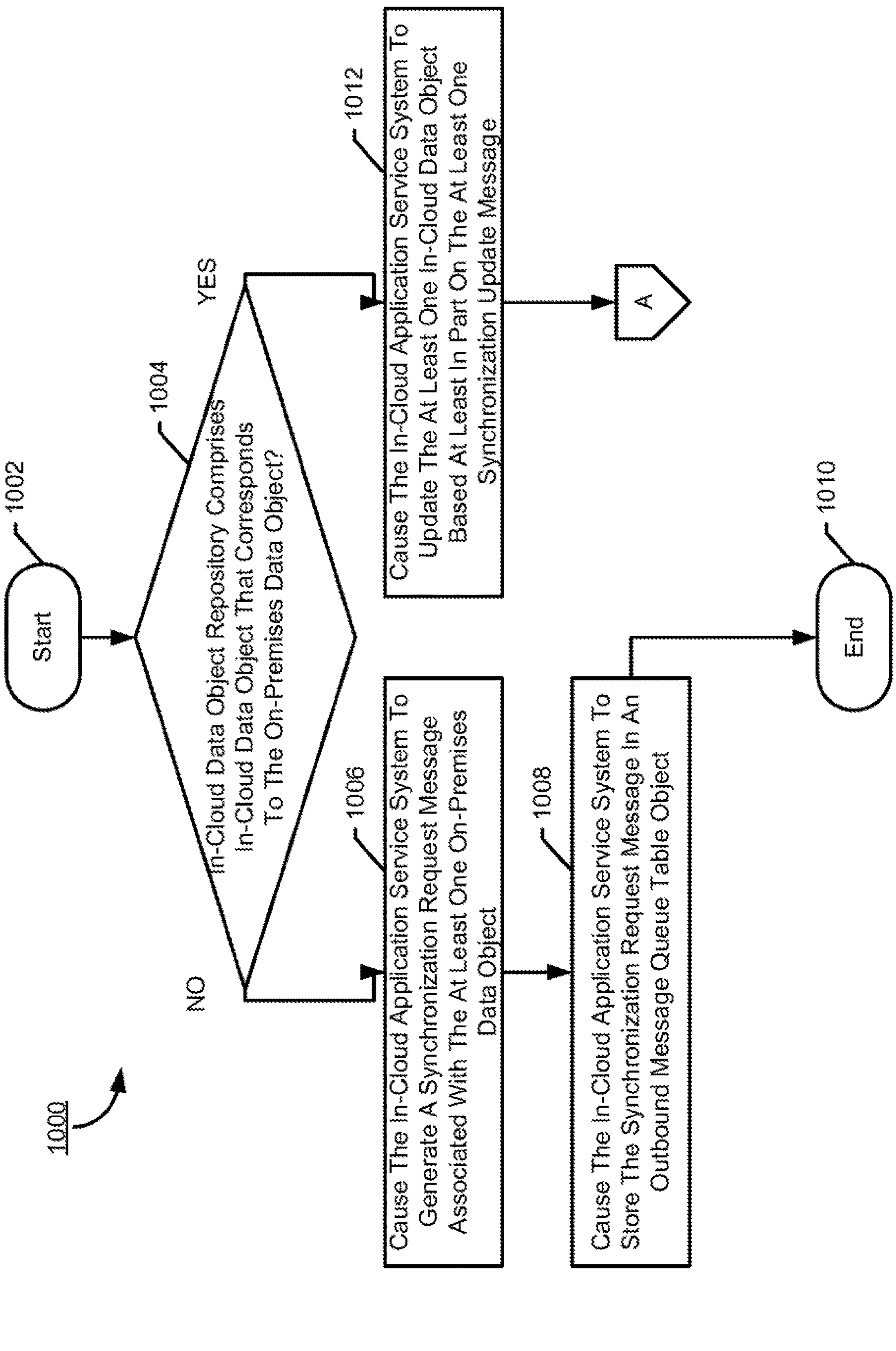
Figure 10B:
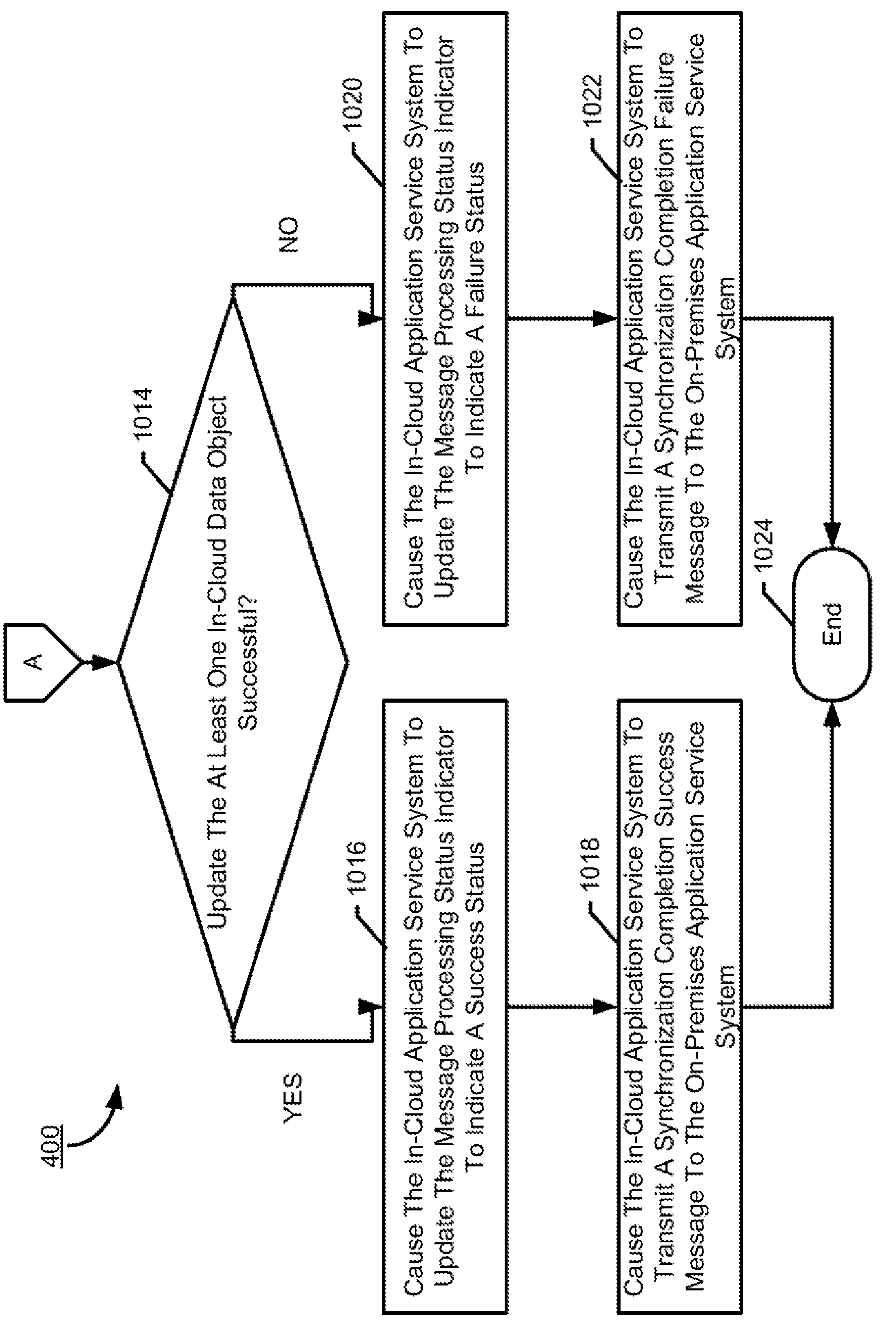
Figure 11:
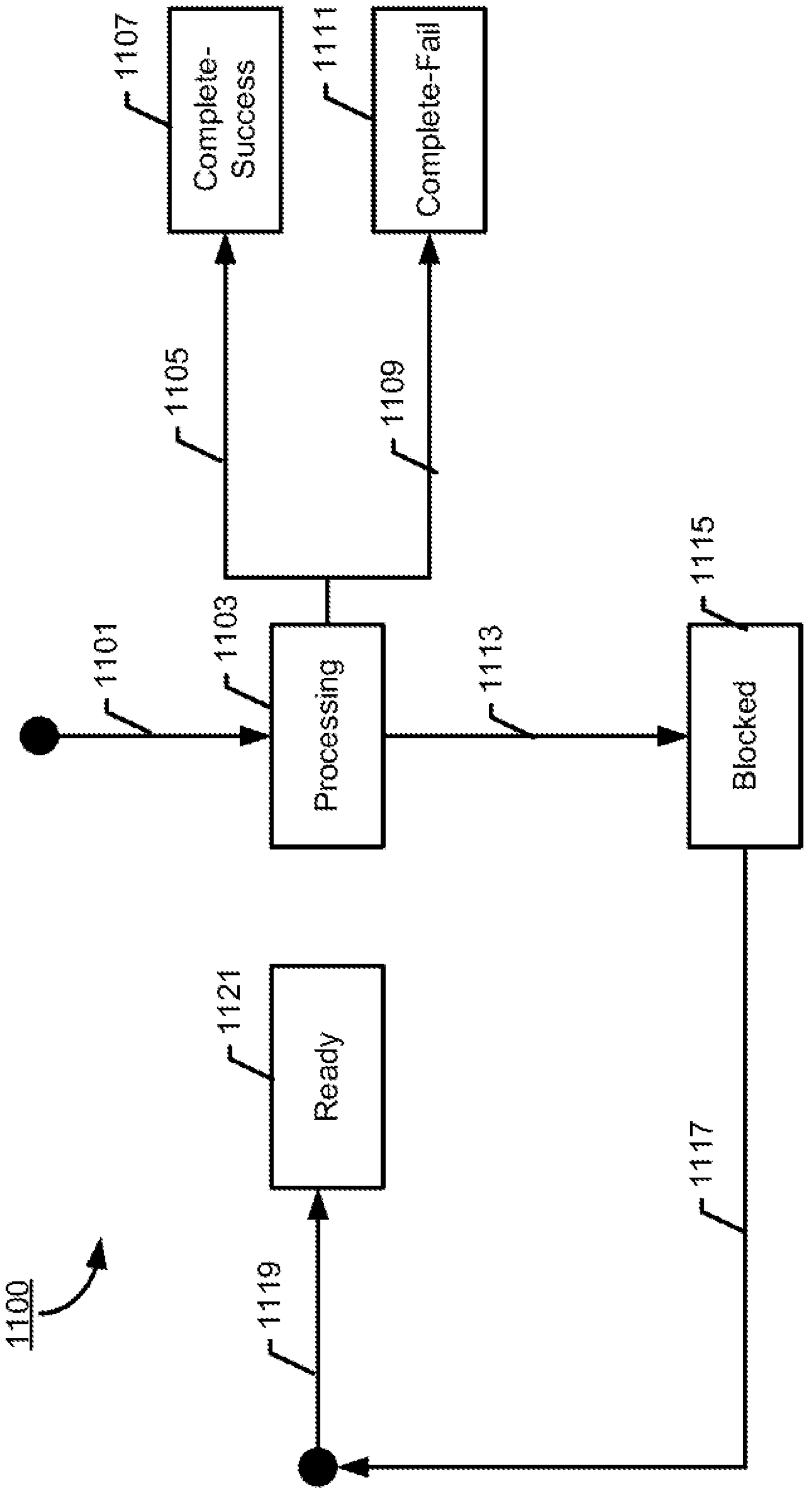
Figure 12:
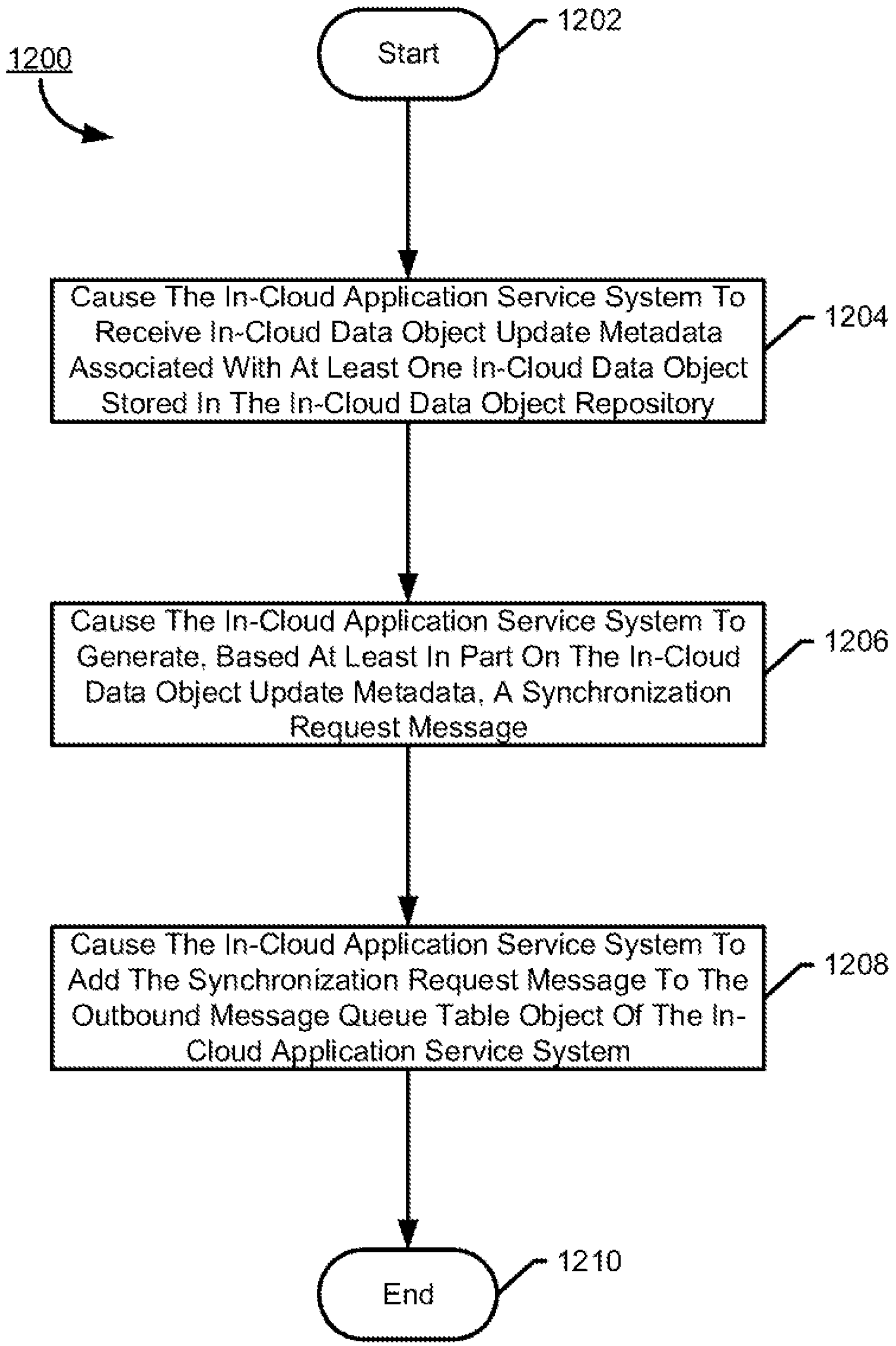
Figure 13A:
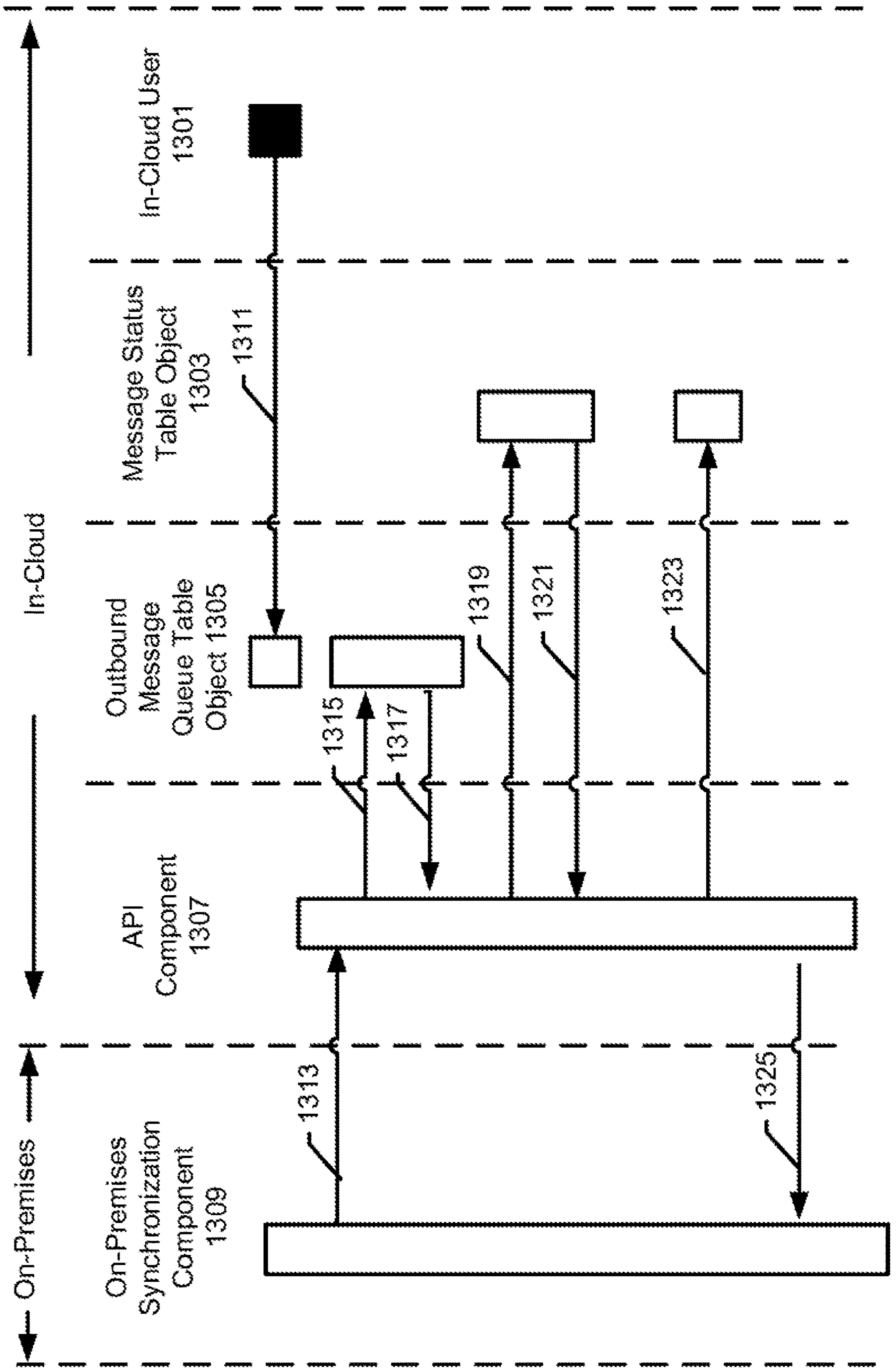
Figure 13B:
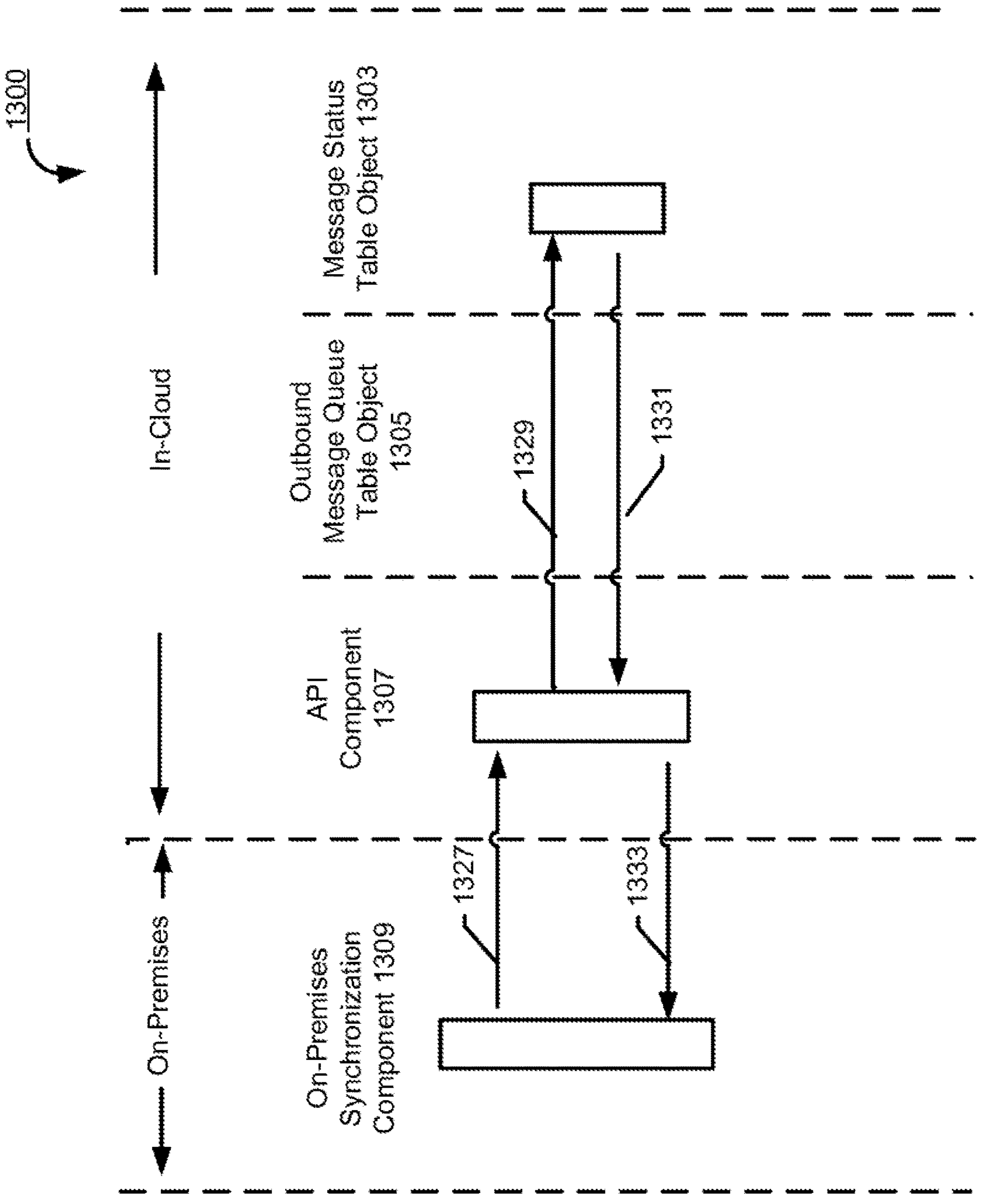
Figure 14A:
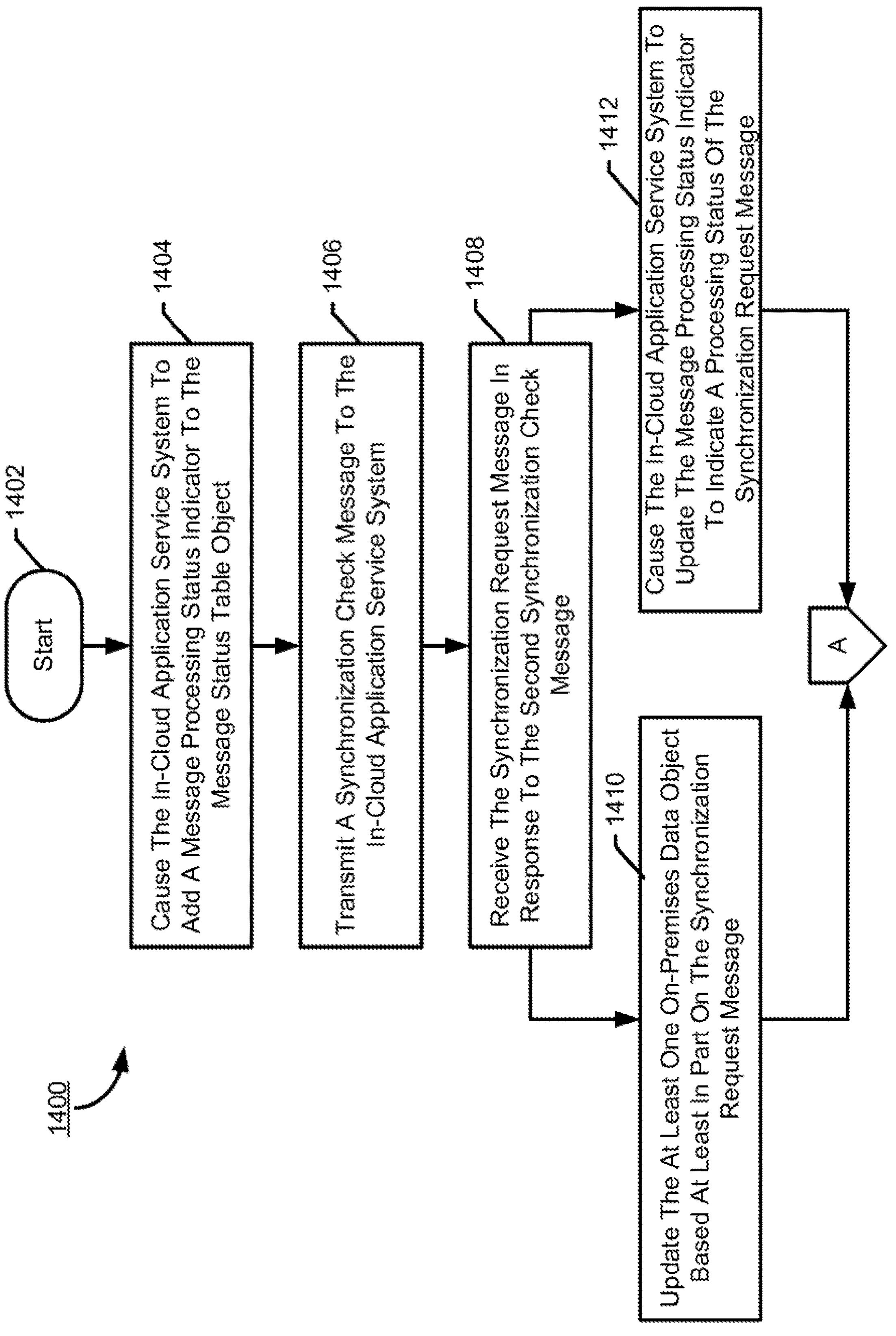
Figure 14B:
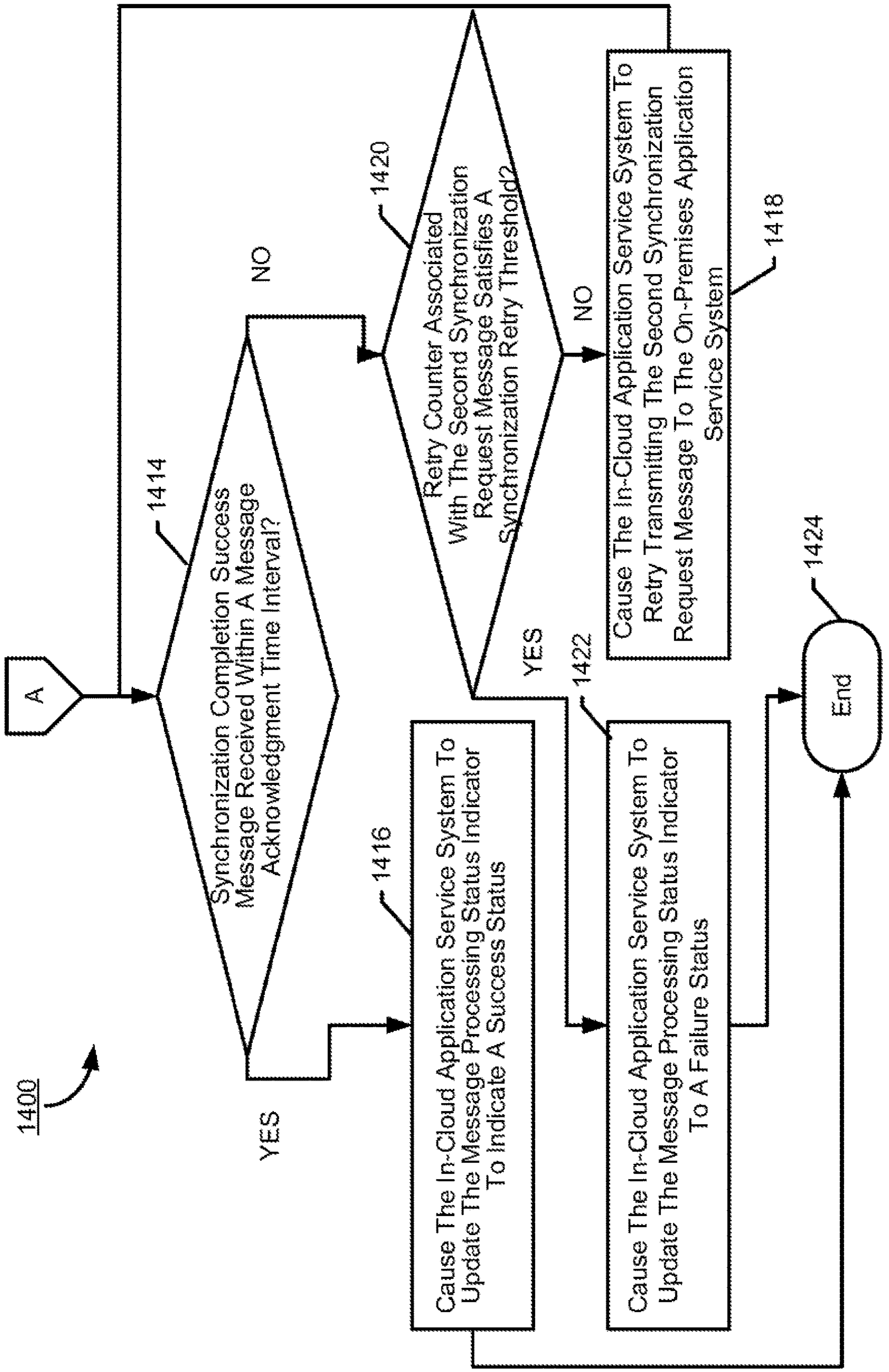
Figure 15:
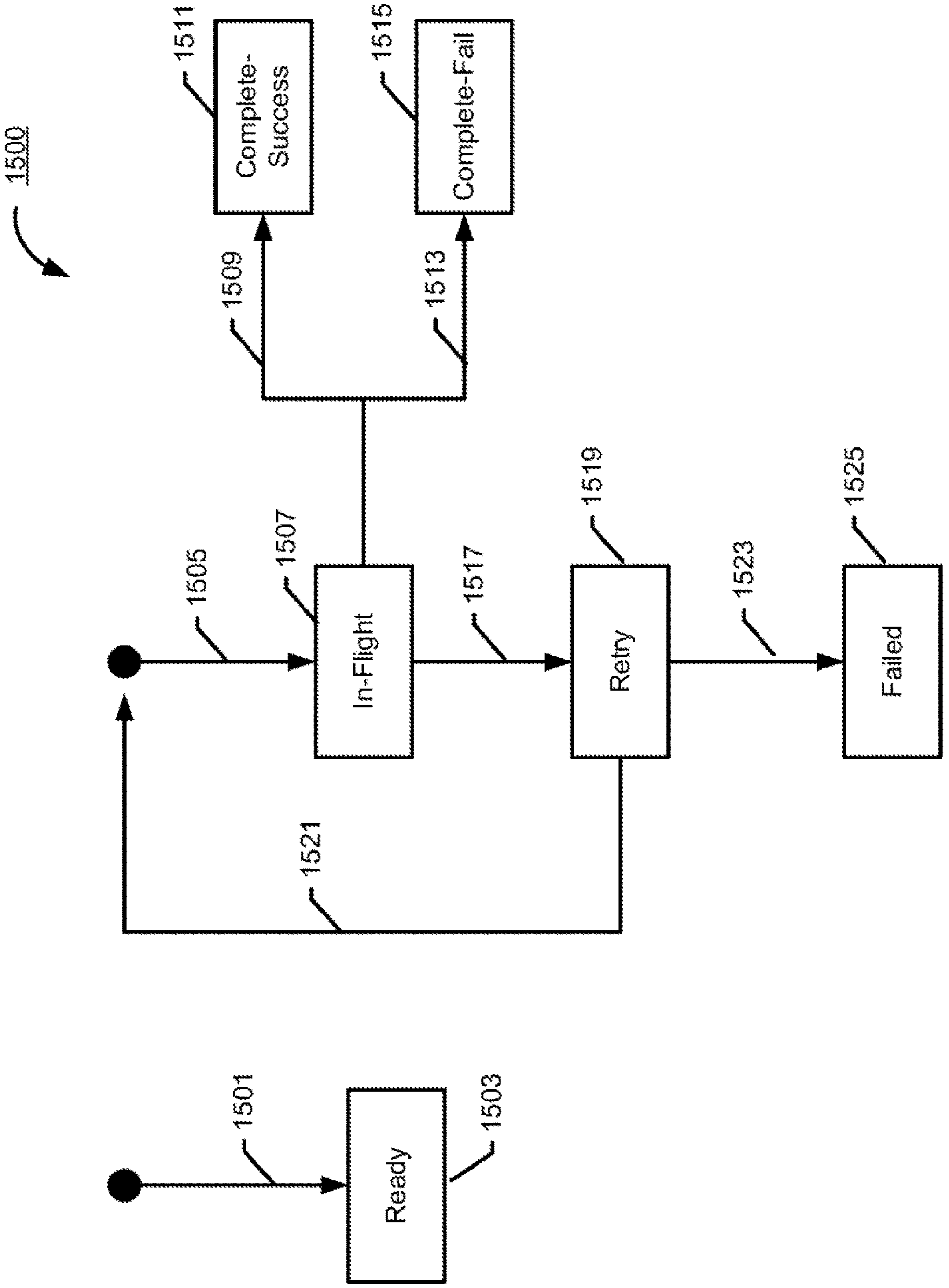
Figure 16A:
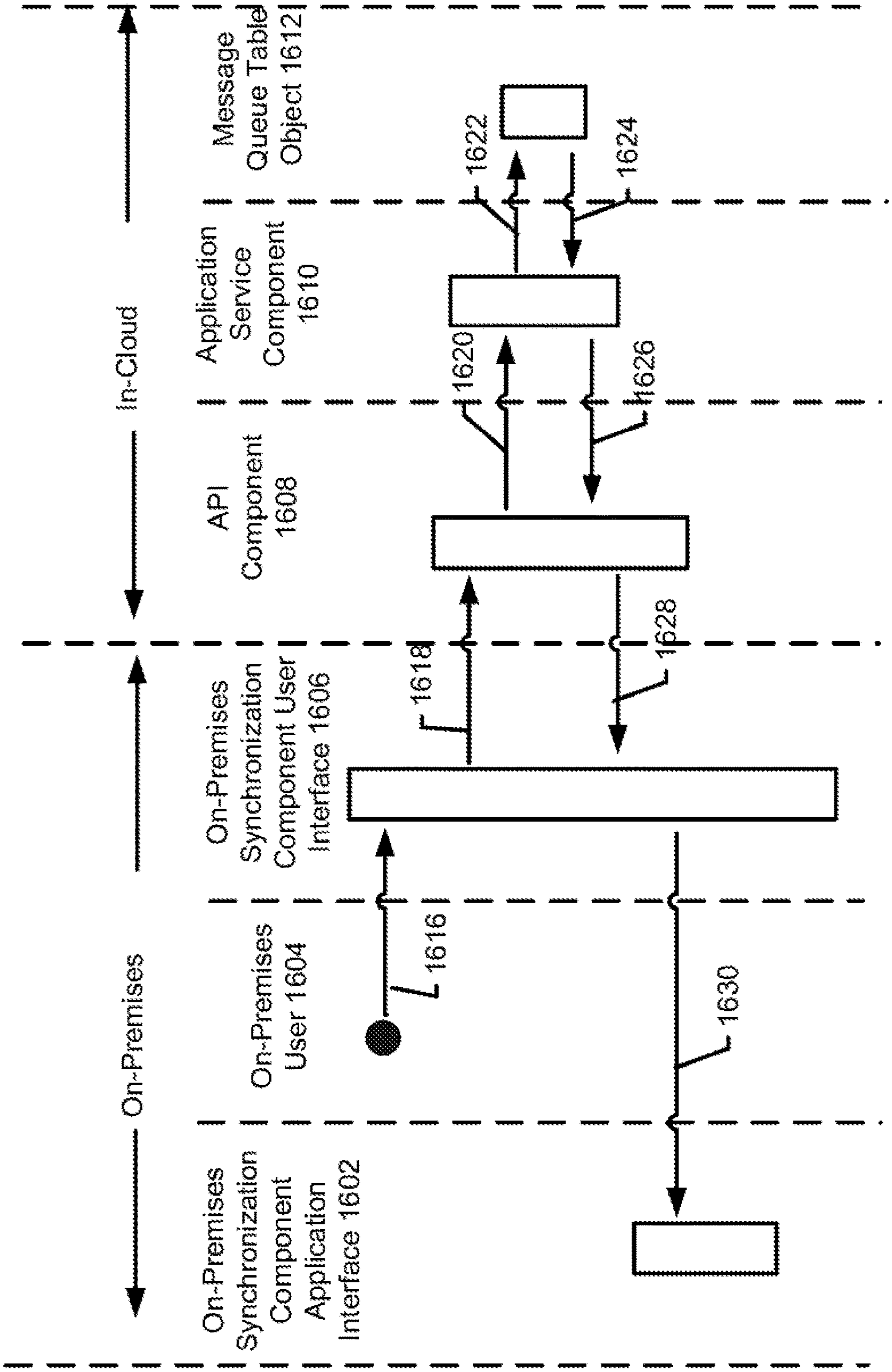
Figure 16B:
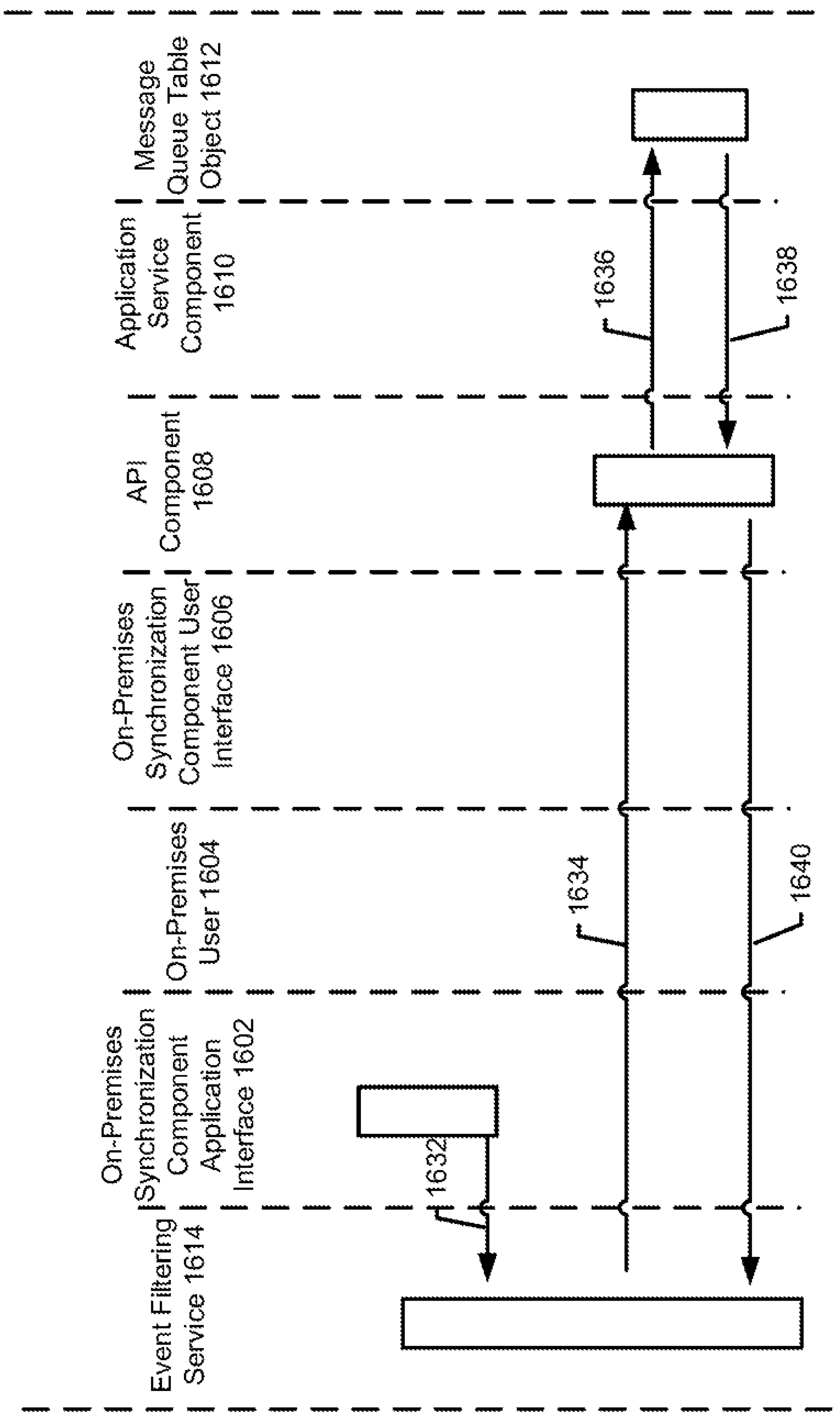
Figure 17:
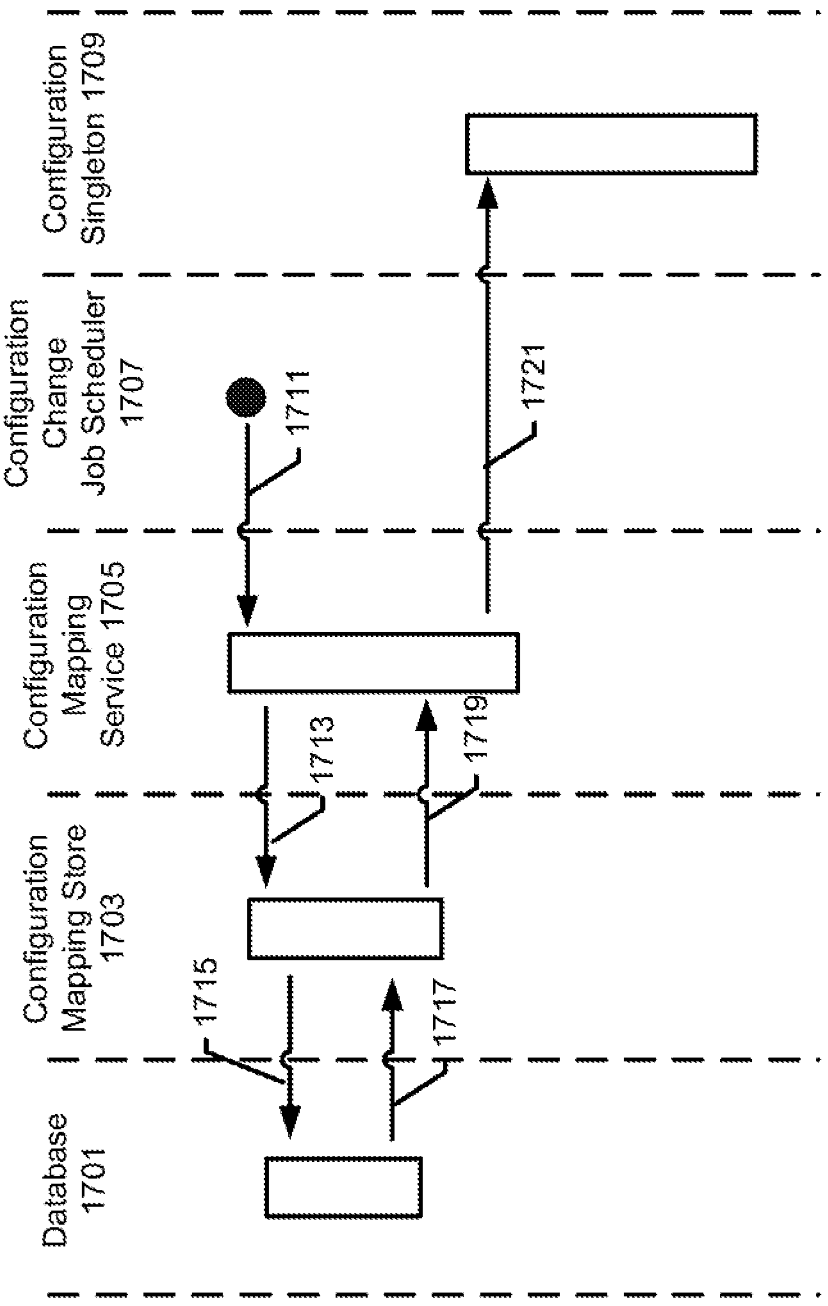

Having thus described some embodiments in general terms, references will now be made to the accompanying drawings, which are not necessarily drawn to scale, and wherein:

FIG. 1 is an example system architecture diagram illustrating an example software service platform in communication with other devices (such as client devices) in a data object synchronization environment in accordance with some embodiments of the present disclosure;

FIG. 2 is an example infrastructure diagram illustrating an example computing device (for example, an example client device) in accordance with some embodiments of the present disclosure;

FIG. 3 is an example infrastructure diagram illustrating an example computing device (for example, an example application service server) in accordance with some embodiments of the present disclosure;

FIG. 4 is an example flowchart illustrating an example method of synchronizing data between an on-premises application service system and an in-cloud application service system during an initial synchronization in accordance with some embodiments of the present disclosure;

FIG. 5A and FIG. 5B are example signal diagrams illustrating example data communications associated with synchronizing data between an on-premises application service system and an in-cloud application service system during an initial synchronization in accordance with some embodiments of the present disclosure;

FIG. 5C and FIG. 5D are example signal diagrams illustrating example data communications associated with synchronizing data between an on-premises application service system and an in-cloud application service system during an initial synchronization in accordance with some embodiments of the present disclosure;

FIG. 6A is an example signal diagram illustrating example data communications between an on-premises application service system and an in-cloud application service system in accordance with some embodiments of the present disclosure;

FIG. 6B is an example signal diagram illustrating example data communications between an on-premises application service system and an in-cloud application service system in accordance with some embodiments of the present disclosure;

FIG. 6C is an example signal diagram illustrating example data communications between an on-premises application service system and an in-cloud application service system in accordance with some embodiments of the present disclosure;

FIG. 7 is an example flowchart illustrating an example method of synchronizing data between an on-premises application service system and an in-cloud application service system in response to receiving on-premises data object update metadata associated with at least one on-premises data object in accordance with some embodiments of the present disclosure;

FIG. 8 is an example flowchart illustrating an example method of synchronizing at least one in-cloud data object that is stored in an in-cloud data object repository based on on-premises data object update metadata associated with the at least one on-premises data object stored in an on-premises data object repository in accordance with some embodiments of the present disclosure;

FIG. 9A and FIG. 9B are example signal diagrams illustrating data communications associated with synchronizing at least one in-cloud data object based on on-premises data object update metadata associated with the at least one on-premises data object in accordance with some embodiments of the present disclosure;

FIG. 10A and FIG. 10B are example flowcharts illustrating an example method of synchronizing an in-cloud data object repository that may not comprise any in-cloud data object that corresponds to an on-premises data object associated with on-premises data object update metadata in accordance with some embodiments of the present disclosure;

FIG. 11 illustrates an example message status diagram illustrating example processing statuses associated with example messages in accordance with some embodiments of the present disclosure;

FIG. 12 is an example flowchart illustrating an example method of synchronizing data between an on-premises application service system and an in-cloud application service system in response to receiving in-cloud data object update metadata associated with at least one in-cloud data object in accordance with some embodiments of the present disclosure;

FIG. 13A and FIG. 13B are example signal diagrams illustrating example data communications associated with synchronizing data between an on-premises application service system and an in-cloud application service system in response to receiving in-cloud data object update metadata in accordance with some embodiments of the present disclosure;

FIG. 14A and FIG. 14B are example flowcharts illustrating an example method of managing synchronization statuses of an on-premises application service system and an in-cloud application service system in response to receiving in-cloud data object update metadata associated with at least one in-cloud data object in accordance with some embodiments of the present disclosure;

FIG. 15 illustrates an example message status diagram illustrating example processing statuses associated with example messages in accordance with some embodiments of the present disclosure;

FIG. 16A and FIG. 16B are example signal diagrams illustrating example data communications associated with synchronizing data between an on-premises application service system and an in-cloud application service system in accordance with some embodiments of the present disclosure; and FIG. 17 is an example signal diagram illustrating example data communications associated with synchronizing data between an on-premises application service system and an in-cloud application service system in accordance with some embodiments of the present disclosure.

DETAILED DESCRIPTION OF VARIOUS EMBODIMENTS

Various embodiments of the present disclosure are described more fully hereinafter with reference to the accompanying drawings, in which some, but not all embodiments of the disclosure are shown. Indeed, the disclosure may be embodied in many different forms and should not be construed as limited to the embodiments set forth herein. Rather, these embodiments are provided so that this disclosure will satisfy applicable legal requirements. The term “or” is used herein in both the alternative and conjunctive sense, unless otherwise indicated. The terms “illustrative,” “example,” and “exemplary” are used to be examples with no indication of quality level. Like numbers refer to like elements throughout.

The term “comprising” means “including but not limited to,” and should be interpreted in the manner it is typically used in the patent context. Use of broader terms such as “comprises,” “includes,” and “having” should be understood to provide support for narrower terms such as “consisting of,” “consisting essentially of,” and “comprised substantially of.”

The phrases “in one embodiment,” “according to one embodiment,” “in some examples,” “for example,” and the like generally mean that the particular feature, structure, or characteristic following the phrase may be included in an embodiment of the present disclosure, and may be included in more than one embodiment of the present disclosure (importantly, such phrases do not necessarily refer to the same embodiment).

Overview

Various embodiments of the present disclosure relate generally to dynamically synchronizing data between and among different application service systems (including, but not limited to, between and among “on-premises” application service systems that are located within a local computer network of an end user/organization and “in-cloud” application service systems that are located outside the local computer network of the end user/organization). For example, various embodiments of the present disclosure may programmatically generate and transmit synchronization check messages, receive synchronization request messages, and transmit data objects for synchronization based on the synchronization request messages.

In an application service system, computing resources are interconnected with one another to handle one or more computing/processing tasks such as, but not limited to, generating data, storing data, transmitting data, and/or the like. In some examples, one or more computing resources in an example application service system may be in hardware forms such as, but not limited to, one or more computing devices (such as, but not limited to, servers), one or more data object repositories (such as, but not limited to, databases), one or more central processing units (CPUs), one or more memory units (such as, but not limited to, random-access memories, hard disk drives), one or more relays, one or more routers, and/or the like. In some examples, one or more computing resources in an example application service system may be in software forms, such as, but not limited to, one or more application software, one or more web applications, and/or the like. In some embodiments, one or more computing resources in an example application service system may be in the form of one or more computer networks. In some embodiments, one or more computing resources in an example application service system may be in other forms.

As described above, examples of application service systems may include, but not limited to, on-premises application service systems and in-cloud application service systems.

An application service system is an on-premises application service system when some or all of the computing resources of said application service system are located within a local computer network that is owned, operated, and/or managed by an end user or an end user organization of the said application service system. In some examples, computing resources of an on-premises application service system are accessible by users within the organization, and are not accessible by users from other organizations.

For example, application service servers associated with an on-premises application service system may be interconnected with one another to form at least a part of a local computer network that is owned, operated, and/or managed by an end user or an end user organization of the on-premises application service system. In some examples, the local computer network may be managed by a network administrator of the organization. Additionally, or alternatively, data objects that are generated and/or received by the on-premises application service system are stored in local data object repositories within the local computer network associated with the end user/organization. Additionally, or alternatively, one or more software applications and/or one or more web applications of the on-premises application service system may be installed locally on computers or servers that are owned, operated, and/or managed by an end user or an end user organization (for example, by a network administrator of the organization).

In contrast with on-premises application service systems, many application service systems are “in-cloud” or “outside of premises.” An application service system is an in-cloud application service system if computing resources of the application service system are at least partially or completely located outside the local computer network that is owned, operated, and/or managed by an end user or an end user organization. In some examples, computing resources of an in-cloud application service system are accessible and/or shared by different organizations and/or by users from different organizations.

For example, one or more software applications and/or one or more web applications of an in-cloud application service system may be installed on computers or servers that are not owned, operated, and/or managed by an end user or an end user organization of the application service system. In some examples, software applications of the in-cloud application service system may be installed in a cloud platform that is owned, operated, and/or managed by the provider of the application service system and/or by a third-party cloud service provider. Additionally, or alternatively, data objects that are generated and/or received by an on-premises application service system are stored in data object repositories outside any computer networks that are owned, operated, and/or managed by an end user/organization.

An organization may implement both on-premises application service systems and in-cloud application service systems. As an example, an organization may utilize both an on-premises application service system and an in-cloud application service system for issue tracking and project management in the organization. In this example, the organization comprises multiple individuals/teams. Each individual/team may be assigned to one or more issues or projects, and individuals and teams may work jointly to achieve goals of the organization. In this example, the on-premises application service system may be utilized by the organization to manage issues and projects at an individual/team level, and the in-cloud application service system may be utilized by the organization to manage issues and projects at the organization level (for example, across hundreds/thousands of users/teams within the organization).

In many instances, on-premises application service systems and in-cloud application service systems are required to communicate with and/or exchange data and/or information with one another to complete computing/processing tasks.

Continuing from the issue tracking and project management example above, the on-premises application service system and the in-cloud application service system need to synchronize data objects that are generated by each application service system. For example, the on-premises application service system may generate a data object that reflects a particular issue/project handled by a particular team of the organization. This particular issue/project is also part of a broader issue/project that the organization tracks, and the in-cloud application service system separately comprises a data object that corresponds to this particular issue/project handled by this particular team. When this particular team edits the data object stored in the on-premises application service system (for example, to reflect a new status of the issue/project), the corresponding data object of the in-cloud application service system needs to be updated accordingly (for example, to reflect a new status).

As illustrated in the example above, data and/or information associated with on-premises application service systems and data and/or information associated with in-cloud application service systems need to be synchronized so that edits/updates of data objects associated with one of the application service systems are provided to other application service systems.

However, many systems and methods for synchronizing data and/or information of on-premises application service systems and in-cloud application service systems are faced with technical difficulties and plagued by technical limitations.

As described above, on-premises application service systems are located within local computer networks, and often need to communicate/exchange data and information with computing systems outside of the local computer networks (e.g. an in-cloud application service system) through one or more network gateways of the local computer network.

In many examples, an end user or a network administrator of an end organization may control/manage the network gateways of the computer network, and may restrict and/or limit data and/or information that travels through the network gateways into the local computer network.

For example, the end user or the network administrator may define network communication and/or security protocols that can restrict and/or limit the source of network traffic that enters into the local computer network through the network gateway, and/or the amount of network traffic that travels through the network gateways. In some examples, the network communication and/or security protocols may only open the network gateways to certain computer systems at certain network addresses outside the local computer network that are approved by the end user or the network administrator of the end user organization.

However, many in-cloud application service systems have dynamically configured network addresses. For example, the network addresses of an in-cloud application service server may be dynamically generated based on, for example but not limited to, the current data volume in the cloud so as to provide flexibility and scalability. It can be impractical to request the end user or the network administrator to approve receiving data and/or information from an in-cloud application service system each time its network address is changed, as such changes can happen frequently.

Some methods may change communication and/or security protocols of the local computer network so that the local computer network is open to receive data and/or information from any computing systems located outside of the computer network. While such methods may allow in-cloud application service systems to circumvent network gateways of the local computer network, internal network traffic within the computer network becomes exposed to the public, and computing systems that are located within the local computer network become susceptible to network attacks and computer viruses, thereby sacrificing network security and organization privacy.

When in-cloud application service systems cannot provide data and/or information to on-premises application service systems through the local computer network, the on-premises application service systems rely on data/information that can be out of date, affecting performance and limiting functionalities of on-premises application service systems.

Additionally, to conduct synchronization, many example methods may push data and/or information related updates and edits of data objects in real-time from on-premises application service systems to in-cloud application service systems, and vice versa. However, such methods can cause network traffic congestion and processing resource exhaustion.

For example, each time data objects stored in a data object repository of an in-cloud application service system is updated and/or edited, such methods require the in-cloud application service system to push data and/or information related to the updates or edits to on-premises application service systems in real-time, creating a unnecessarily significant amount of network traffic to local computer networks and an overwhelming burden on local computer networks to manage such network traffic.

Example embodiments of the present disclosure overcome the above-referenced technical challenges, limitations, and difficulties while providing various technical benefits.

For example, to synchronize data from an on-premises application service system to an in-cloud application service system, various embodiments of the present disclosure enable the on-premises application service system to initiate and transmit synchronization check messages to the in-cloud application service systems. In such an example, because the on-premises application service system initiates electronic communications with the in-cloud application service system through the network gateway of the local computer network, the network gateway of the local computer network allows the in-cloud application service system to respond to the synchronization check messages with synchronization request messages through the network gateway and without the need for approval by the end user or the network administrators. As such, various embodiments of the present disclosure enable data communications between on-premises application service systems and in-cloud application service systems, overcome technical limitations due to the on-premises application service system being located with a local computer network without sacrificing network security of the local computer network, and provide technical improvements and advancement on computer related technology.

In addition, various embodiments of the present disclosure reduce network congestion and prevent processing resource exhaustion. Continuing from the example above, the synchronization check message received from the in-cloud application service system may comprise at least one synchronization schedule indicator, which may define a schedule for synchronizing data objects between an on-premises application service system and the in-cloud application service system. Additionally, or alternatively, the synchronization check message received from the in-cloud application service system may comprise at least one synchronization topic indicator, which may define the content for synchronization (e.g. what data object needs to be synchronized). Based at least in part on the at least one synchronization schedule indicator and the at least one synchronization topic indicator, the on-premises application service system may prepare data objects to be synchronized with the in-cloud application service systems, and may transmit duplicates of the data objects to the in-cloud application service system.

Further, in many instances, on-premise solutions are associated with restricted networks. In such instances, a network connection cannot be initialized from outside the network, only from within the network. On-premise software may not be updated as frequently as necessary to keep up with changes, performance requirements, and/or the like. Various embodiments of the present disclosure overcome such technical challenges and problems by localizing the on-premise components to minimal pieces, placing more complicated logic in the cloud that provides more ability to control and/or update software.

As such, example embodiments of the present disclosure overcome technical challenges and difficulties faced by the application service systems, and provide various technical advantages and benefits, details of which are described herein.

Definitions

As used herein, the terms "data," "content," "digital content," "digital content object," "information," and similar terms may be used interchangeably to refer to data capable of being transmitted, received, and/or stored in accordance with examples of the present disclosure. Thus, use of any such terms should not be taken to limit the spirit and scope of examples of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like (sometimes referred to herein as a "network"). Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

In the present disclosure, the term "circuitry" should be understood broadly to include hardware and, in some examples, software for configuring the hardware. With respect to components of the apparatus, the term "circuitry" as used herein should therefore be understood to include particular hardware configured to perform the functions associated with the particular circuitry as described herein. For example, in some examples, "circuitry" may include processing circuitry, storage media, network interfaces, input/output devices, and the like.

In the present disclosure, the terms "set" or "subset" refer to a collection of zero or more elements.

In the present disclosure, the term "application service system" refers to a software platform and associated hardware that are configured to support and maintain various data services and/or data exchanges among various devices. Examples of data services that are supported and/or maintained by an application service system include, but not limited to, data computing, data management, data monitoring, data storage, data migration, data development, data analytics, data deployment, and/or the like.

In some embodiments, an application service system may comprise one or more internal computing devices, such as, but not limited to, one or more application service servers, one or more data object repositories, and/or the like. For example, an example application service system may establish sufficient data communication protocols in association with one or more application service servers and one or more data object repositories, such that one or more data objects stored in the one or more data object repositories may be retrieved by the one or more application service servers and provided to one or more other application service servers and/or one or more client devices.

In the present disclosure, the term "data object" refers to a data structure that represents one or more functionalities and/or characteristics associated with data and/or information. In some embodiments, a data object may be associated with one or more software (for example, one or more computer programs, one or more software program modules, and/or the like) and/or one or more hardware (for example, one or more servers and/or one or more client devices). For example, a data object may store data and/or information associated with one or more computer programs, and/or provide a functional unit for one or more computer programs. A user who operates a client device that is executing the one or more computer programs may provide user input associated with the data object, and the user input may comprise an electronic selection of a data object, an electronic request to modify, manipulate, change a data object, and/or the like. In some embodiments, data items in an example data object may include metadata. The term "metadata" refers to one or more parameters, one or more data fields, or the like that describe or are associated with one or more attributes of a data object.

In the present disclosure, the term "data object identifier" refers to an identifier that uniquely indicates, identifies or flags a data object from other data objects. In some embodiments, the data object identifier may be in the form of text string(s), numerical character(s), alphabetical character(s), alphanumeric code(s), American Standard Code for Information Interchange (ASCII) character(s), and/or the like.

In various embodiments of the present discourse, various data objects can be categorized based on various data object types and/or various data object structures. In some embodiments, examples of types associated with data objects may include, but not limited to, issue data object type, project data object type, and/or the like, which may be defined based on data and/or information represented by the corresponding data object.

For example, a data object of an "issue data object type" (also described as an "issue data object" herein) refers to a type of data object that represents an organized set of data and/or information in an application service system that is associated with an individual piece of a task that must be completed. For example, an issue data object may be associated with an issue-based (or project-based) collaborative task management system that operates in an application service system. In this example, the issue data object may represent and/or comprise data and/or information such as, but not limited to, a to-do item, a software application bug that needs to be fixed, a virtual IT help-desk ticket, a leave request form, among many other possibilities.

In the present disclosure, the term "issue data object type identifier" refers to an identifier that indicates, identifies or flags a data object as an issue data object. In some embodiments, the issue data object type identifier may be in the form of text string(s), numerical character(s), alphabetical character(s), alphanumeric code(s), ASCII character(s), and/or the like.

In some embodiments, a data object is of a "project data object type" (also described as a "project data object" herein) refers to a type of data object that represents an organized set of issue data objects. For example, a project data object may be associated with an issue-based (or project-based) collaborative task management system that operates in an application service system. In this example, the project data object may represent and/or comprise data and/or information such as, but not limited to, a project, a software application, a virtual IT help-desk, among many other possibilities.

In the present disclosure, the term "project data object type identifier" refers to an identifier that indicates, identifies, or flags a data object as a project data object. In some embodiments, the project data object type identifier may be in the form of text string(s), numerical character(s), alphabetical character(s), alphanumeric code(s), ASCII character(s), and/or the like.

Additionally, various data objects can be categorized based on the type of the data object repository that stores the data objects and/or the type of application service system that is associated with the data object.

As described above, various embodiments of the present disclosure provide technical improvements on computer related technologies by, for example, but not limited to, improving the safety and security when synchronizing data objects between different application service systems. For example, an example of data object synchronization may involve at least two application service systems: an on-premises application service system and an in-cloud application service system. In some embodiments, each of the on-premises application service system and the in-cloud application service system is associated with one or more data object repositories, and various embodiments of the present disclosure provide technical improvements on synchronizing data objects between and among different data object repositories, details of which are described herein.

In the present disclosure, the term "on-premises data object repository" refers to a type of data object repository that is located within a local computer network that is owned, operated, and/or managed by an end user or an end user organization of an application service system. In some embodiments, an on-premises data object repository comprises or stores data objects that include latest data and/or information (for example, include the most recent update of the data object, the latest edits on the data object, and/or the like) for the purpose of an initial synchronization with another data object repository (such as, but not limited to, an in-cloud data object repository). For example, data objects stored in the on-premises data object repository may be duplicated and transmitted to the in-cloud data object repository during the initial synchronization, details of which are described herein.

In the present disclosure, the term "on-premises data object" refers to data objects stored in the on-premises data object repository.

In some embodiments, the term "on-premises application service system" refers to a type of application service system that comprises an on-premises data object repository and/or an on-premises service server, is in electronic communication with the on-premises data object repository and/or the on-premises service server, and/or is associated with the on-premises data object repository and/or the on-premises service server. In some embodiments, on-premises data objects stored in an example on-premises data object repository are associated with the on-premises application service system. For example, the on-premises application service system may generate the one or more on-premises data objects, update the one or more on-premises data objects, store the one or more on-premises data objects in the on-premises data object repository, retrieve the one or more on-premises data objects from the on-premises data object repository, and/or the like.

In some examples, an example on-premises data object repository may be internal to the on-premises application service system, such that the on-premises application service system may electronically communicate with the on-premises data object repository directly and without through any intervening computing devices. As another example, the example on-premises data object repository may be external to the on-premises application service system, and may electronically communicate with the example on-premises data object repository through intervening computing device(s) and/or network(s).

In the present disclosure, the term "in-cloud data object repository" refers to a type of data object repository that is located outside a local computer network that is owned, operated, and/or managed by an end user or an end user organization of an application service system. In some embodiments, an in-cloud data object repository comprises or stores data objects that do not include latest data and/or information (for example, do not include the most recent update of the data object, do not include the latest edits on the data object, and/or the like), and/or data objects that are in need for updates through an initial synchronization. For example, the in-cloud data object repository may receive duplicates of data objects from an on-premises data object repository during the initial synchronization, details of which are described herein.

In the present disclosure, the term "in-cloud data object" refers to data objects stored in an in-cloud data object repository.

In some embodiments, the term "in-cloud application service system" refers to a type of application service system that comprises an in-cloud data object repository and/or an in-cloud application service server, is in electronic communication with the in-cloud data object repository and/or the in-cloud application service server, and/or is associated with the in-cloud data object repository and/or the in-cloud application service server. In some embodiments, in-cloud data objects stored in an example in-cloud data object repository are associated with the in-cloud application service system. For example, the in-cloud application service system may generate the one or more in-cloud data objects, update the one or more in-cloud data objects, store the one or more in-cloud data objects in the in-cloud data object repository, retrieve the one or more in-cloud data objects from the in-cloud data object repository, and/or the like.

In some examples, an example in-cloud data object repository may be internal to the in-cloud application service system, such that the in-cloud application service system may electronically communicate with the in-cloud data object repository directly and without through any intervening computing devices. As another example, the example in-cloud data object repository may be external to the in-cloud application service system, and may electronically communicate with the example in-cloud data object repository through intervening computing device(s) and/or network(s).

In some embodiments, subsequent to the initial synchronization, edits and changes may be applied to on-premises data objects stored in the on-premises data object repository, and such edits and changes may be synchronized with the corresponding in-cloud data objects stored in the in-cloud data object repository, details of which are described herein. In some embodiments, subsequent to the initial synchronization, edits and changes may be applied to in-cloud data objects stored in the in-cloud data object repository, and such edits and changes may be synchronized with the corresponding on-premises data objects stored in the on-premises data object repository, details of which are described herein.

In the present disclosure, the term "synchronization check message" refers to a type of electronic request, electronic demand and/or electronic inquiry that can be transmitted to an in-cloud application service system by an on-premises application service system and comprises, represents, and/or is associated with a request to obtain synchronization request messages from an in-cloud application service system.

In the present disclosure, the term "synchronization request message" refers to a type of electronic request, electronic demand and/or electronic inquiry that is generated by an in-cloud application service system to an on-premises application service system and comprises, represents, and/or is associated with a request from the in-cloud application service system to update data objects stored in an in-cloud data object repository associated with the in-cloud application service system or update data objects stored in an on-premises data object repository associated with an on-premises application service system.

For example, the synchronization request message may indicate an electronic request by the in-cloud application service system to add data objects to the in-cloud data object repository and/or update in-cloud data objects stored in the in-cloud data object repository based on the on-premises data objects stored in the on-premises data object repository, details of which are described herein.

Additionally, or alternatively, the synchronization request message may indicate an electronic request by the in-cloud application service system to add data objects to the on-premises data object repository and/or update on-premises data objects stored in the on-premises data object repository based on the in-cloud data objects stored in the in-cloud data object repository, details of which are described herein.

In the present disclosure, the term "synchronization schedule indicator" refers to a type of indicator that is associated with and/or a part of a synchronization request message that indicates a schedule for synchronizing data objects stored in different data object repository (for example, synchronizing data objects from an on-premises data object repository to data objects stored in an in-cloud data object repository). For example, the synchronization schedule indicator may specify a time, a frequency, and/or a time interval for an on-premises application service system to transmit duplicates of on-premises data objects stored in the on-premises data object repository to an in-cloud application service system so that the in-cloud application service system can synchronize the in-cloud data objects stored in the in-cloud data object repository based on the on-premises data objects, details of which are described herein. As an example, the synchronization schedule indicator may specify that on-premises application service system should transmit duplicates of the on-premises data objects stored in the on-premises data object repository on at 0:0:0 (EST) on Sep. 1, 2021 to the in-cloud application service system for synchronization.

In the present disclosure, the term "synchronization topic indicator" refers to a type of indicator that is associated with and/or a part of a synchronization request message that indicates a topic, a content, and/or a requirement for synchronizing/updating data objects stored in different data object repository (for example, synchronizing data objects from an on-premises data object repository to data objects stored in an in-cloud data object repository). For example, the synchronization topic indicator may specify duplicates of what on-premises data objects stored in the on-premises data object repository should be provided to an in-cloud application service system so that, for example, the in-cloud application service system can synchronize/update the in-cloud data objects stored in the in-cloud data object repository based on the on-premises data objects, and/or the on-premises application service system can synchronize/update the on-premises data objects stored in the on-premises data object repository based on the in-cloud data objects, details of which are described herein. As an example, the synchronization topic indicator may specify that on-premises data objects that are generated in the past 3 days should be synchronized with the in-cloud data objects stored in the in-cloud data object repository.

In the present disclosure, the term "on-premises data object update metadata" refers a type of metadata that indicates one or more edits, updates, and/or changes associated with an on-premises data object stored in the on-premises data object repository. For example, a user operating a client device may provide one or more user inputs that comprises edits or changes to one or more on-premises data objects. In this example, the client device may generate on-premises data object update metadata based on these user inputs, and may transmit the on-premises data object update metadata to the on-premises application service system. Examples of edits, updates, and/or changes include, but not limited to, creating a data object (such as, but not limited to, issue data objects, project data, and/or the like), detecting a data object (such as, but not limited to, issue data objects, project data, and/or the like), updating a data object (such as, but not limited to, issue data objects, project data, and/or the like), archiving a data object (such as, but not limited to, issue data objects, project data, and/or the like), restoring a data object (such as, but not limited to, issue data objects, project data, and/or the like), and/or the like.

In the present disclosure, the term "in-cloud data object update metadata" refers a type of metadata that indicates one or more edits, updates, and/or changes associated with an in-cloud data object stored in the in-cloud data object repository. For example, a user operating a client device may provide one or more user inputs that comprises edits or changes to one or more in-cloud data objects. In this example, the client device may generate in-cloud data object update metadata based on these user inputs, and may transmit the in-cloud data object update metadata to the in-cloud application service system. Examples of edits, updates, and/or changes include, but not limited to, creating a data object (such as, but not limited to, issue data objects, project data, and/or the like), detecting a data object (such as, but not limited to, issue data objects, project data, and/or the like), updating a data object (such as, but not limited to, issue data objects, project data, and/or the like), archiving a data object (such as, but not limited to, issue data objects, project data, and/or the like), restoring a data object (such as, but not limited to, issue data objects, project data, and/or the like), and/or the like.

In the present disclosure, the term "synchronization update message" refers to a type of electronic message and/or electronic notification that is generated by an on-premises application service system or an in-cloud application service system and comprises, represents, and/or is associated with one or more updates or edits of data objects stored in a corresponding data object repository. For example, the on-premises application service system may receive on-premises data object update metadata as described above, and may generate a synchronization update message that comprises, represents, and/or is associated with edits, updates, and/or changes to on-premises data objects stored in the on-premises data object repository, and may transmit the synchronization update message to an in-cloud application service system, details of which are described herein.

In the present disclosure, the term "update topic indicator" refers to a type of indicator that is associated with and/or a part of a synchronization update message that indicates a topic and/or a content associated with edits, updates, and/or changes to data objects stored in a data object repository. For example, the update topic indicator associated with a synchronization update message generated by an on-premises application service system may specify what and/or how on-premises data objects stored in the on-premises data object repository have been edited, updated, and/or changed. As an example, the synchronization topic indicator associated with a synchronization update message generated by an in-cloud application service system may specify what and/or how in-cloud data objects stored in the in-cloud data object repository have been edited, updated, and/or changed.

In accordance with various embodiments of the present disclosure, the on-premises application service system and the in-cloud application service system may each generate, install, comprise, and/or execute one or more data objects that facilities synchronizing data objects stored in different data object repositories. Similar to those described above, such data objects may be associated with one or more software (for example, one or more computer programs, one or more software program modules, and/or the like) and/or one or more hardware (for example, one or more servers and/or one or more client devices).

For example, an example on-premises application service system in accordance with various embodiments of the present disclosure may comprise a processing queue object.

In the present disclosure, the term "processing queue object" refers to a type of data object that is in a data structure for storing one or more messages received or generated by the on-premises application service system, such as, but not limited to, synchronization update messages received from an in-cloud application service system and/or generated by the on-premises application service system as described above. For example, the processing queue object may collect synchronization update messages that are received by the on-premises application service system, and may arrange the synchronization update messages based on the time upon which they are received. In some embodiments, the on-premises application service system may retrieve each synchronization update message from the processing queue object to process the synchronization update message, details of which are described herein. In some embodiments, an example processing queue object in accordance with various embodiments of the present disclosure may be in a tabular format or a list format. In some embodiments, an example processing queue object in accordance with various embodiments of the present disclosure may be in other format(s).

Additionally, or alternatively, an example in-cloud application service system in accordance with various embodiments of the present disclosure may comprise an inbound message queue table object, an outbound message queue table object, and/or a message status table object.

In the present disclosure, the term "inbound message queue table object" refers to a type of data object that is in a data structure for storing one or more messages received by the in-cloud application service system, such as, but not limited to, synchronization check messages and/or synchronization update messages from an on-premises application service system as described above. For example, the inbound message queue table object may collect synchronization update messages that are received by the in-cloud application service system, and may arrange the synchronization update messages based on the time upon which they are received. In some embodiments, the in-cloud application service system may retrieve each synchronization update message from the inbound message queue table object to process the synchronization update message, details of which are described herein. In some embodiments, an example inbound message queue table object in accordance with various embodiments of the present disclosure may be in a tabular format or a list format. In some embodiments, an example inbound message queue table object in accordance with various embodiments of the present disclosure may be in other format(s).

In the present disclosure, the term "outbound message queue table object" refers to a type of data object that is in a data structure for storing one or more messages generated by the in-cloud application service system and for transmission to an on-premises application service system, such as, but not limited to, synchronization request messages and/or synchronization update messages for the on-premises application service system as described above. For example, the outbound message queue table object may collect synchronization request messages and/or synchronization update messages that are generated by the in-cloud application service system, and may arrange the synchronization request messages and/or synchronization update messages based on the time upon which they are generated. In some embodiments, the in-cloud application service system may transmit one or more synchronization request messages and/or synchronization update messages from the outbound message queue table object to an on-premises application service system, details of which are described herein. In some embodiments, an example outbound message queue table object in accordance with various embodiments of the present disclosure may be in a tabular format or a list format. In some embodiments, an example outbound message queue table object in accordance with various embodiments of the present disclosure may be in other format(s).

In the present disclosure, the term "message status table object" refers to a data object that records, stores, and/or indicates the status of messages that are received by or generated by an in-cloud application service system. Examples of such messages include, but not limited to, synchronization check message, synchronization request messages and/or synchronization update messages as described above. In some embodiments, an example message status table object in accordance with various embodiments of the present disclosure may be in a tabular format or a list format. In some embodiments, an example message status table object in accordance with various embodiments of the present disclosure may be in other format(s).

For example, the in-cloud application service system may generate one or more message processing status indicators and store these message processing status indicators in the message status table object. In the present disclosure, the term "message processing status indicator" refers to a type of indicator that indicates a processing status of a message (e.g. a synchronization request messages, a synchronization update message, and/or the like). Examples of processing status of a message may include, but not limited to, an "in-flight" status indicating that a corresponding message has been transmitted to or received by a corresponding application service system to which the corresponding message was generated for, a "success" status indicating that a corresponding message has been successfully processed by the corresponding application service system (for example, successfully synchronizing the data objects), a "retry" status indicating that a corresponding message is re-submitted to or re-processed by the corresponding application service system (for example, retrying synchronizing the data objects), a "failure" status indicating that the corresponding application service system has failed to process the corresponding message, and/or the like.

In some embodiments, the in-cloud application service system may generate a message processing status indicator for each synchronization request message that is generated by the in-cloud application service system, may generate a message processing status indicator for each synchronization update message that is generated by the in-cloud application service system, and/or may generate a message processing status indicator for each synchronization update message that is received by the in-cloud application service system and from an on-premises application service system, details of which are described herein.

In the present disclosure, the term "synchronization completion failure message" refers to an electronic message and/or an electronic notification indicating that a synchronization of one or more data objects is not successful. In the present disclosure, the term "synchronization completion success message" refers to an electronic message and/or an electronic notification indicating that a synchronization of one or more data objects is successful.

In the present disclosure, the terms "system time," "current system time," and "current system time indicator" refers to a type of indicator that comprises, represents, describes, indicates, and/or is associated with a current time in the format of a time point, a timestamp, and/or a time code. For example, the current time indicator may be determined based at least in part on an example data object synchronization platform's notion of the current time and date so that various services of the example data object synchronization platform can calibrate their respective clocks and otherwise access a common time. The current time is typically measured by a system clock or by a network associated device that is designated as the system clock. For example, an example data object synchronization platform may utilize a time server that reads the actual time from a reference clock (e.g. a connected radio clock, an atomic clock, another time server on the network or the Internet) and distributes the time data to other components of the an example data object synchronization platform. In some embodiments, the current time indicator may comprise one or more alphabetical characters, one or more numerical characters, one or more alphanumeric characters, one or more ASCII texts, one or more pointers, one or more memory addresses, and/or the like.

In the present disclosure, the term "message acknowledgment time interval" refers to a predetermined threshold time period between a first time point when a first message is received or retrieved by an application service system for processing and a second time point when a second message is received from the application service system indicating that processing has been successful (e.g. receiving a synchronization completion success message from the application service system indicating that a synchronization of data objects has been successful). For example, if a synchronization completion success message has not been received by the in-cloud application service system within the message acknowledgment time interval, the in-cloud application service system may determine that the synchronization of data objects need to be retried, details of which are described herein.

In the present disclosure, the term "retry counter" refers to a numeric counter that indicates a number of times that an in-cloud application service system or an on-premises application service system has retried synchronizing one or more data objects. For example, the retry counter may indicate a number of times that an in-cloud application service system has retried transmitting a synchronization request message to the on-premises application service system, details of which are described herein.

In the present disclosure, the term "synchronization retry threshold" refers to a predetermined threshold number of retries before the in-cloud application service system or the on-premises application service system determines that it has failed to synchronize one or more data objects.

In the present disclosure, the term "message processing time interval" refers to a predetermined threshold time frequency for the in-cloud application service system to process synchronization update messages from the inbound message queue table object.

In the present disclosure, the term "previous message processing time indicator" refers to a time point when the in-cloud application service system last processed a synchronization update message from the inbound message queue table object.

Example System Architecture for Implementing Embodiments of the Present Disclosure Methods, apparatuses, and computer program products of the present disclosure may be embodied by any of a variety of devices. For example, the method, apparatus, and computer program product of an example embodiment may be embodied by a networked device (e.g., a network service server and/or a client device) configured to communicate with one or more devices. Additionally, or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

FIG. 1 illustrates an example data object synchronization environment 100 within which embodiments of the present disclosure may operate. In the example shown in FIG. 1, the data object synchronization environment 100 may comprise one or more application service systems (such as, but not limited to, the application service system 107A, the application service system 107B, the application service system 107C) in electronic communication with one or more client devices (such as, but not limited to, client devices 101A, 101B, 101N, 101X, . . . ) via, for example, one or more local computer networks and/or one or more remote communication networks. In some embodiments, users may access the application service systems via the one or more local computer networks and/or one or more remote communication networks and using the one or more client devices.

In some embodiments, the client devices 101A, 101B, 101N, 101X, . . . may be computing devices as described herein, including, but not limited to, desktop computers, laptop computers, smartphones, netbooks, tablet computers, wearables, and the like. In some embodiments, some of the client devices 101A, 101B, 101N, 101X, . . . may be associated with an organization that is different from the organization associated with other client devices. For example, the client devices 101A, 101N, . . . are associated with a first organization 113A, and the client devices 101B, 101X, . . . are associated with a second organization 113B.

In the example shown in FIG. 1, the data object synchronization environment 100 comprises one or more application service systems (such as, but not limited to, the application service system 107A, the application service system 107B, the application service system 107C). In some embodiments, each of the one or more application service systems may comprise one or more application service servers and one or more data object repositories.

As described above, the application service systems may comprise one or more on-premises application service systems that are located within a local computer network of an end user/organization. In the example shown in FIG. 1, the application service system 107A is an on-premises application service system that is located within the local computer network associated with the first organization 113A. The application service system 107A comprises an application service server 121A (for example, an on-premises application service server) and a data object repository 123A (for example, an on-premises data object repository). In some embodiments, the client devices (for example, client devices 101A and 101N) may include various hardware or firmware designed to interface with the on-premises application service systems (such as, but not limited to, the application service system 107A). In some embodiments, the local computer network of the first organization 113A may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, the local computer network may include an 802.11, 802.16, 802.20, and/or WiMax network, and/or the like.

Similarly, the application service system 107B is an on-premises application service system that is located within the local computer network associated with the second organization 113B. The application service system 107B comprises an application service server 121B (for example, an in-cloud application service server) and a data object repository 123B (for example, an in-cloud data object repository). In some embodiments, the client devices (for example, client devices 101B and 101X) may include various hardware or firmware designed to interface with on-premises application service systems (such as, but not limited to, the application service system 107B). In some embodiments, the local computer network of the second organization 113B may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, the local computer network may include an 802.11, 802.16, 802.20, and/or WiMax network, and/or the like.

Further, as described above, the application service systems may comprise one or more in-cloud application service systems that are located outside the local computer network that is owned, operated, and/or managed by an end user or the end user organization. In the example shown in FIG. 1, the application service system 107C is an in-cloud application service system. The application service system 107C comprises an application service server 121C (for example, an in-cloud application service server) and a data object repository 123C (for example, an in-cloud data object repository). In some embodiments, the client devices (for example, but not limited to, client devices 101A, 101B, 101N, 101X, . . . ) may interact with in-cloud application service systems (such as, but not limited to, the application service system 107C) via a web browser or through a web application that runs in a web browser. In some embodiments, the client devices (for example, but not limited to, client devices 101A, 101B, 101N, 101X, . . . ) may interact with in-cloud application service systems (such as, but not limited to, the application service system 107C) via their respective local computer networks and through one or more remote communication networks. For example, the remote communication network may include a public network (such as the Internet), and may utilize a variety of networking protocols including, but not limited to, TCP/IP based networking protocols. For instance, the networking protocol may be customized to suit the needs of the in-cloud application service systems (such as, but not limited to, the application service system 107C) and/or the client devices (for example, but not limited to, client devices 101A, 101B, 101N, 101X, . . . ). In some embodiments, the protocol is a custom protocol of JSON objects sent via a Web Socket channel. In some embodiments, the protocol is JSON over RPC, JSON over REST/HTTP, and the like.

In some embodiments, each application service server in an application service system is in electronic communication with one or more data object repositories of the application service system, such that the application service server may retrieve data objects from the data object repositories, store data objects to the data object repositories, and/or update data objects in the data object repositories. In example shown in FIG. 1, the application service server 121A of the application service system 107A is in electronic communication with the data object repository 123A of the application service system 107A, and may retrieve data objects from the data object repository 123A, store data objects to the data object repository 123A, and/or update data objects in the data object repository 123A. Additionally, or alternatively, the application service server 121B of the application service system 107B is in electronic communication with the data object repository 123B of the application service system 107B, and may retrieve data objects from the data object repository 123B, store data objects to the data object repository 123B, and/or update data objects in the data object repository 123B. Additionally, or alternatively, the application service server 121C of the application service system 107C is in electronic communication with the data object repository 123C of the application service system 107C, and may retrieve data objects from the data object repository 123C, store data objects to the data object repository 123C, and/or update data objects in the data object repository 123C.

In some embodiments, each application service system is in electronic communication with another application service system to synchronize data objects stored in their corresponding data object repositories. For example, on-premises application service systems may be in electronic communication with in-cloud application service systems to synchronize data objects stored in their corresponding data object repositories, and/or in-cloud application service systems may be in electronic communication with on-premises application service systems to synchronize data objects stored in their corresponding data object repositories.

For example, as shown in FIG. 1, the application service system 107A (for example, an on-premises application service system) is electronic communication with the application service system 107C (for example, an in-cloud application service system). In such an example, the application service system 107A may perform data object synchronization operations with the application service system 107C, so that data objects stored in the data object repository 123A of the application service system 107A are synchronized to the data object repository 123C of the application service system 107C. For example, duplicates of data objects stored in the data object repository 123A and/or edits, changes, and/or updates of data objects stored in the data object repository 123A are provided to the application service system 107C so that application service system 107C (for example, the application service server 121C) may communicate with and update the data object repository 123C based on the data objects stored in the data object repository 123A and/or edits, changes, and/or updates of data objects stored in the data object repository 123A.

Additionally, or alternatively, as shown in FIG. 1, the application service system 107B (for example, an on-premises application service system) is electronic communication with the application service system 107C (for example, an in-cloud application service system). In such an example, the application service system 107B may perform data object synchronization operations with the application service system 107C, so that data objects stored in the data object repository 123B of the application service system 107B are synchronized to the data object repository 123C of the application service system 107C. For example, duplicates of data objects stored in the data object repository 123B and/or edits, changes, and/or updates of data objects stored in the data object repository 123B are provided to the application service system 107C so that application service system 107C (for example, the application service server 121C) may communicate with and update the data object repository 123C based on the data objects stored in the data object repository 123B and/or edits, changes, and/or updates of data objects stored in the data object repository 123B.

Additionally, or alternatively, as shown in FIG. 1, the application service system 107C (for example, an in-cloud application service system) is electronic communication with the application service system 107A and/or the application service system 107B (for example, on-premises application service systems). In such an example, the application service system 107C may perform data object synchronization operations with the application service system 107A and/or the application service system 107B, so that data objects stored in the data object repository 123C of the application service system 107C are synchronized to the data object repository 123A of the application service system 107A and/or to the data object repository 123B of the application service system 107B. For example, edits, changes, and/or updates of data objects stored in the data object repository 123C are provided to the application service system 107A so that application service system 107A (for example, the application service server 121A) may communicate with and update the data object repository 123A based on the data objects stored in the data object repository 123C and/or edits, changes, and/or updates of data objects stored in the data object repository 123C.

In some embodiments, a client device (for example, the client devices 101A, 101B, 101N, 101X, . . . ) may transmit data object update metadata to one or more application service systems (for example, one or more on-premises application service systems and/or one or more in-cloud application service systems). The data object update metadata may comprise one or more edits, updates, and/or changes associated with one or more data objects stored in a corresponding data object repository.

Continuing from the example above, the data object repository 123A of the application service system 107A may be an on-premises data object repository that stores on-premises data objects as defined herein, and a client device (for example, the client device 101A, the client device 101N, . . . ) may transmit on-premises data object update metadata to the data object repository 123A that includes one or more edits, updates, and/or changes associated with one or more on-premises data objects stored in the data object repository 123A. In response to receiving the on-premises data object update metadata, the application service system 107A may generate at least one synchronization update message in addition to updating the one or more on-premises data objects stored in the data object repository 123A based on the on-premises data object update metadata. The application service system 107A may transmit the at least one synchronization update message to the application service system 107C (for example, in-cloud application service system), and cause the application service system 107C to update the data objects stored in the data object repository 123C (for example, in-cloud data object repository) so that data objects stored in the data object repository 123A of the application service system 107A and data objects stored in the data object repository 123C of the application service system 107C are in sync. Additional details are described herein.

Additionally, the data object repository 123B of the application service system 107B may be an on-premises data object repository that stores on-premises data objects as defined herein, and a client device (for example, the client device 101B, the client device 101X, . . . ) may transmit on-premises data object update metadata to the data object repository 123B that includes one or more edits, updates, and/or changes associated with one or more on-premises data objects stored in the data object repository 123B. In response to receiving the on-premises data object update metadata, the application service system 107B may generate at least one synchronization update message in addition to updating the one or more on-premises data objects stored in the data object repository 123B based on the on-premises data object update metadata. The application service system 107B may transmit the at least one synchronization update message to the application service system 107C (for example, in-cloud application service system), and cause the application service system 107C to update the data objects stored in the data object repository 123C (for example, in-cloud data object repository) so that data objects stored in the data object repository 123B of the application service system 107B and data objects stored in the data object repository 123C of the application service system 107C are in sync. Additional details are described herein.

Additionally, or alternatively, the data object repository 123C of the application service system 107C may be an in-cloud data object repository that stores in-cloud data objects as defined herein, and the client device (for example, client devices 101A, 101B, 101N, 101X, . . . ) may transmit in-cloud data object update metadata to the data object repository 123C that includes one or more edits, updates, and/or changes associated with one or more in-cloud data objects stored in the data object repository 123C. In response to receiving the on-premises data object update metadata, the application service system 107C may generate at least one synchronization request message in addition to updating the one or more in-cloud data objects stored in the data object repository 123C based on the in-cloud data object update metadata. In response to receiving a synchronization check message from the application service system 107A (e.g. an on-premises application service system), the application service system 107C (e.g. an in-cloud application service system) may transmit the at least one synchronization request message to the application service system 107A, and cause the application service system 107A to update the data objects stored in the data object repository 123A so that data objects stored in the data object repository 123A of the application service system 107A and data objects stored in the data object repository 123C of the application service system 107C are in sync. Additional details are described herein.

While the description above and FIG. 1 provide an example illustration of a data object synchronization environment, it is noted that the scope of the present disclosure is not limited to the description above and FIG. 1.

For example, the number of on-premises application service systems and/or the number of in-cloud application service systems in an example data object synchronization environment may be less than or more than that of the example shown in FIG. 1. Additionally, or alternatively, the number of on-premises data object repositories and/or the number of in-cloud data object repositories in an example application service system may be less than or more than that of the example shown in FIG. 1. Additionally, or alternatively, the number of on-premises network service servers and/or the number of in-cloud network service servers in an example application service system may be less than or more than that of the example shown in FIG. 1.

It is noted that various components of the data object synchronization environment 100 may leverage the same computer or computing apparatus to perform various operations. For example, various components of one or more network service servers (such as, but not limited to, the application service server 121A in the example shown in FIG. 1) and/or one or more data object repositories (such as, but not limited to, the data object repository 123A in the example shown in FIG. 1) in an application service system may leverage the same computer or computing apparatus to perform various operations.

Example Apparatuses for Implementing Embodiments of the Present Disclosure

The client devices 101A, 101B, 101N, 101X, . . . of FIG. 1 may include one or more computing systems, such as the apparatus 200 shown in FIG. 2. The apparatus 200 may be configured to execute at least some of the operations described above with respect to FIG. 1 and below with respect to FIG. 4 to FIG. 17. The apparatus 200 may include a processor 206, a memory 202, an input/output circuitry 208, a communications circuitry 210, and/or a display 204. The apparatus 200 may be configured to execute the operations described herein. Although the components are described with respect to functional limitations, it should be understood that the particular implementations necessarily include the use of particular hardware. It should also be understood that certain of the components described herein may include similar or common hardware. For example, two sets of circuitries may both leverage use of the same processor, network interface, storage medium, or the like to perform their associated functions, such that duplicate hardware is not required for each set of circuitries. The use of the term "circuitry" as used herein with respect to components of the apparatus should therefore be understood to include particular hardware configured to perform the functions associated with the particular circuitry as described herein.

In some embodiments, the processor 206 (and/or co-processor or any other processing circuitry assisting or otherwise associated with the processor) may be in communication with the memory 202 via a bus for passing information among components of the apparatus. The memory 202 may be non-transitory and may include, for example, one or more volatile and/or non-volatile memories. In other words, for example, the memory 202 may be an electronic storage device (e.g., a computer readable storage medium). The memory 202 may be configured to store information, data, content, applications, instructions, or the like, for enabling the apparatus 200 to carry out various functions in accordance with example embodiments of the present disclosure.

The processor 206 may be embodied in a number of different ways and may, for example, include one or more processing devices configured to perform independently. Additionally, or alternatively, the processor 206 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 206 may be configured to execute instructions stored in the memory 202 or otherwise accessible to the processor. Alternatively, or additionally, the processor 206 may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor 206 is embodied as an executor of software instructions, the instructions may specifically configure the processor to perform the algorithms and/or operations described herein when the instructions are executed.

In some embodiments, the apparatus 200 may include the input/output circuitry 208 that may, in turn, be in communication with the processor 206 to provide output to the user and, in some embodiments, to receive an indication of a user input. The input/output circuitry 208 may comprise a user interface circuitry and may include a display, which may comprise a web user interface, a mobile application, a client device, a kiosk, or the like. In some embodiments, the input/output circuitry 208 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., the memory 202, and/or the like).

In some embodiments, the apparatus 200 may include the display 204 that may, in turn, be in communication with the processor 206 to display renderings of card data object rendering interfaces. In various examples of the present disclosure, the display 204 may include a liquid crystal display (LCD), a light-emitting diode (LED) display, a plasma (PDP) display, a quantum dot (QLED) display, and/or the like.

The communications circuitry 210 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 210 may include, for example, a network interface for enabling communications with a wired or wireless communication network. For example, the communications circuitry 210 may include one or more network interface cards, antennae, buses, switches, routers, modems, and supporting hardware and/or software, or any other device suitable for enabling communications via a network. Additionally, or alternatively, the communication interface may include the circuitry for interacting with the antenna(s) to cause transmission of signals via the antenna(s) or to handle receipt of signals received via the antenna(s).

The application service servers of application service systems of FIG. 1 (such as the application service server 121A of the application service system 107A) may be embodied by one or more computing systems, such as apparatus 300 shown in FIG. 3. The apparatus 300 may include a processor 305, a memory 301, an input/output circuitry 307, and a communications circuitry 303. The apparatus 300 may be configured to execute at least some of the operations described above with respect to FIG. 1 and below with respect to FIG. 4 to FIG. 17. Although these components 301, 303, 305, and 307 are described with respect to functional limitations, it should be understood that the particular implementations necessarily include the use of particular hardware. It should also be understood that certain of these components 301, 303, 305, and 307 may include similar or common hardware. For example, two sets of circuitries may both leverage use of the same processor, network interface, storage medium, or the like to perform their associated functions, such that duplicate hardware is not required for each set of circuitries.

In some embodiments, the processor 305 (and/or co-processor or any other processing circuitry assisting or otherwise associated with the processor) may be in communication with the memory 301 via a bus for passing information among components of the apparatus. The memory 301 is non-transitory and may include, for example, one or more volatile and/or non-volatile memories. In other words, for example, the memory 301 may be an electronic storage device (e.g., a computer-readable storage medium). The memory 301 may be configured to store information, data, content, applications, instructions, or the like for enabling the apparatus to carry out various functions in accordance with example embodiments of the present disclosure.

The processor 305 may be embodied in a number of different ways and may, for example, include one or more processing devices configured to perform independently. In some examples, the processor 305 may include one or more processors configured in tandem via a bus to enable independent execution of instructions, pipelining, and/or multithreading. The use of the term "processor" or "processing circuitry" may be understood to include a single core processor, a multi-core processor, multiple processors internal to the apparatus, and/or remote or "cloud" processors.

In some examples, the processor 305 may be configured to execute instructions stored in the memory 301 or otherwise accessible to the processor 305. In some examples, the processor 305 may be configured to execute hard-coded functionalities. As such, whether configured by hardware or software methods, or by a combination thereof, the processor 305 may represent an entity (e.g., physically embodied in circuitry) capable of performing operations according to an embodiment of the present disclosure while configured accordingly. Alternatively, as another example, when the processor 305 is embodied as an executor of software instructions, the instructions may specifically configure the processor 305 to perform the algorithms and/or operations described herein when the instructions are executed.

In some embodiments, the apparatus 300 may include the input/output circuitry 307 that may, in turn, be in communication with the processor 305 to provide output to the user and, in some embodiments, to receive an indication of a user input. The input/output circuitry 307 may comprise a user interface circuitry and may include a display, which may comprise a web user interface, a mobile application, a client device, a kiosk, or the like. In some embodiments, the input/output circuitry 307 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., the memory 301, and/or the like).

The communications circuitry 303 may be any means such as a device or circuitry embodied in either hardware or a combination of hardware and software that is configured to receive and/or transmit data from/to a network and/or any other device, circuitry, or module in communication with the apparatus 300. In this regard, the communications circuitry 303 may include, for example, a network interface for enabling communications with a wired or wireless communication network (such as the communication network described above in connection with FIG. 1). For example, the communications circuitry 303 may include one or more network interface cards, antennae, buses, switches, routers, modems, and supporting hardware and/or software, or any other device suitable for enabling communications via a network. Additionally, or alternatively, the communications circuitry 303 may include the circuitry for interacting with the antenna/antennae to cause transmission of signals via the antenna/antennae or to handle receipt of signals received via the antenna/antennae.

It is also noted that all or some of the information discussed herein can be based on data that is received, generated and/or maintained by one or more components of apparatus 300. In some embodiments, one or more external systems (such as a remote cloud computing and/or data storage system) may also be leveraged to provide at least some of the functionality discussed herein.

In some embodiments, other elements of the apparatus 300 may provide or supplement the functionality of particular circuitry. For example, the processor 305 may provide processing functionality, the memory 301 may provide storage functionality, the communications circuitry 303 may provide network interface functionality, and the like. As will be appreciated, any such computer program instructions and/or other type of code may be loaded onto a computer, processor or other programmable apparatus's circuitry to produce a machine, such that the computer, processor or other programmable circuitry that execute the code on the machine creates the means for implementing various functions, including those described herein.

Example Methods for Implementing Embodiments of the Present Disclosure

Various example methods described herein, including, for example, those as shown in FIG. 4 to FIG. 17, may provide various technical advantages and/or improvements described above.

It is noted that each block of the flowchart, and combinations of blocks in the flowchart, may be implemented by various means such as hardware, firmware, circuitry and/or other devices associated with execution of software including one or more computer program instructions. For example, one or more of the methods described in FIG. 4 to FIG. 17 may be embodied by computer program instructions, which may be stored by a non-transitory memory of an apparatus employing an embodiment of the present disclosure and executed by a processor in the apparatus. These computer program instructions may direct a computer or other programmable apparatus to function in a particular manner, such that the instructions stored in the computer-readable storage memory produce an article of manufacture, the execution of which implements the function specified in the flowchart block(s).

As described above and as will be appreciated based on this disclosure, embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Similarly, embodiments may take the form of a computer program code stored on at least one non-transitory computer-readable storage medium. Any suitable computer-readable storage medium may be utilized including non-transitory hard disks, CD-ROMs, flash memory, optical storage devices, or magnetic storage devices.

Initial Synchronization Between an on Premises Application Service System and an In-Cloud Application Service System Referring now to FIG. 4, an example method 400 in accordance with some embodiments of the present disclosure is illustrated. In particular, the example method 400 illustrates example steps/operations of synchronizing data between an on-premises application service system and an in-cloud application service system during an initial synchronization.

In particular, the example method 400 of FIG. 4 illustrates an example initial synchronization between an on-premises application service system and an in-cloud application service system. In some examples, the initial synchronization is a specific event that is outside of normal synchronization. This event can be triggered with configuration of which data object repositories or which parts of data object repositories (e.g. on-premises data object repositories and/or in-cloud data object repositories) are to be synchronized. For example, not all data objects of an on-premises data object repository are synchronized with an in-cloud data object repository (e.g. only the configured board data objects, project data objects, and/or data objects associated with a time window are synchronized).

In some examples, this initial synchronization event can be triggered by a user using an on-premises synchronization component user interface (for example, the On-Premises Synchronization Component User Interface 1606 described herein). For example, a user may click, tap, or otherwise select a button on the user interface to trigger this process.

Additionally, or alternatively, this initial synchronization event can be triggered by adding a message to a message queue table object (for example, an outbound message queue table object of an in-cloud application service system described in connection with at least step/operation 1208 of FIG. 12 herein). For example, the on-premises application service system may request this message and process it as an initial synchronization event.

In the example shown in FIG. 4, the example method 400 starts at block 402 and then proceeds to step/operation 404. At step/operation 404, a processing circuitry (such as, but not limited to, the processor 305 of the application service server 121A of the application service system 107A described above in connection with at least FIG. 1 and FIG. 3, another processor of another application service server of another application service system in the data object synchronization environment, and/or the processor 206 of the client device 101A described above in connection with at least FIG. 1 and FIG. 2) transmits a synchronization check message to the in-cloud application service system.

As described above, the example method 400 may be implemented in connection with an initial synchronization between an on-premises application service system and an in-cloud application service system. In particular, the example method 400 may enable on-premises data objects stored in an on-premises data object repository to be synchronized to an in-cloud data object repository, such that in-cloud data objects stored in the in-cloud data object repository are duplicates of the on-premises data objects from the on-premises data object repository.

For example, to start the initial synchronization, an on-premises application service system transmits a synchronization check message to an in-cloud application service system. In some embodiments, the synchronization check message comprises an electronic request to obtain at least one synchronization request message from an in-cloud application service system.

In some embodiments, the in-cloud application service system may define and/or provide one or more interfaces for receiving and/or handling the synchronization check message. For example, the in-cloud application service system may define and/or provide an Application Programming Interface (API) that provides one or more endpoints that are configured to receive messages, queries, and/or requests from another computing system (for example, from the on-premises application service system).

In some embodiments, the API defined and/or provided by the in-cloud application service system may further specify format and/or structure of messages, queries, and/or requests to be received from these one or more endpoints. In such examples, the on-premises application service system may format or structure the synchronization check message based at least in part on the definitions provided by the API, and may transmit the synchronization check message to the one or more endpoints of the API.

While the description above provides an example of transmitting the synchronization check message, it is noted that the scope of the present disclosure is not limited to the description above. In some examples, the synchronization check message may be transmitted to the in-cloud application service system in other ways.

Referring back to FIG. 4, subsequent and/or in response to step/operation 404, the example method 400 proceeds to step/operation 406. At step/operation 406, a processing circuitry (such as, but not limited to, the processor 305 of the application service server 121A of the application service system 107A described above in connection with at least FIG. 1 and FIG. 3, another processor of another application service server of another application service system in the data object synchronization environment, and/or the processor 206 of the client device 101A described above in connection with at least FIG. 1 and FIG. 2) receives the at least one synchronization request message from the in-cloud application service system.

Continuing from the example above, subsequent to the on-premises application service system transmitting the synchronization check message to the in-cloud application service system (for example, to one or more endpoints as defined by the API), the in-cloud application service system may transmit at least one synchronization request message through the API and to the on-premises application service system. In some embodiments, the at least one synchronization request message may be stored in an outbound message queue table object of the in-cloud data object, and the in-cloud data object may retrieve the at least one synchronization request message from the outbound message queue table and transmit the at least one synchronization request message to the on-premises application service system, details of which are described herein.

As defined above, the at least one synchronization request message is generated by the in-cloud application service system and comprises, represents, and/or is associated with a request from the in-cloud application service system to synchronize and/or update data objects stored in an in-cloud data object repository associated with the in-cloud application service system. For example, the at least one synchronization request message comprises at least one synchronization topic indicator and at least one synchronization schedule indicator.

As defined above, the at least one synchronization topic indicator indicates a topic, a content, and/or a requirement for synchronizing data objects from an on-premises data object repository associated with the on-premises application service system to data objects stored in an in-cloud data object repository associated with the in-cloud application service system. For example, the at least one synchronization topic indicator may specify what on-premises data objects stored in the on-premises data object repository should be synchronized to the in-cloud data object repository.

As defined above, the at least one synchronization schedule indicator indicates a schedule for synchronizing data objects from the on-premises data object repository to the in-cloud data object repository. For example, the at least one synchronization schedule indicator may specify when on-premises data objects stored in the on-premises data object repository should be synchronized to the in-cloud data object repository.

As an example, the at least one synchronization request message received by the on-premises application service system comprise a synchronization topic indicator specifying that on-premises data objects generated in the past 3 days should be synchronized and a schedule topic indicator specifying that the synchronization should take place at 0:0:0 (EST) on Sep. 1, 2021.

While the description above provides an example of a synchronization request message, it is noted that the scope of the present disclosure is not limited to the example above.

Referring back to FIG. 4, subsequent and/or in response to step/operation 406, the example method 400 proceeds to step/operation 408. At step/operation 408, a processing circuitry (such as, but not limited to, the processor 305 of the application service server 121A of the application service system 107A described above in connection with at least FIG. 1 and FIG. 3, another processor of another application service server of another application service system in the data object synchronization environment, and/or the processor 206 of the client device 101A described above in connection with at least FIG. 1 and FIG. 2) retrieves at least one on-premises data object.

For example, the on-premises application service system retrieves at least one on-premises data object from an on-premises data object repository associated with the on-premises application service system. Referring to the example shown in FIG. 1, the application service system 107A may be an on-premises application service system. In this example, the application service server 121A may retrieve on-premises data objects from the data object repository 123A.

In some embodiments, the on-premises application service system retrieves the at least one on-premises data object based at least in part on the at least one synchronization topic indicator of the at least one synchronization request message. As described above, the at least one synchronization topic indicator specifies what data objects are to be synchronized, and the on-premises application service system may retrieve only data objects that need to be synchronized in accordance with the at least one synchronization topic indicator of the at least one synchronization request message.

Continuing from the example, the synchronization topic indicator of the at least one synchronization request message may indicate that on-premises data objects generated in the past 3 days should be synchronized. In this example, the on-premises application service system may retrieve on-premises data objects that are generated in the past 3 days from the on-premises data object repository in accordance with the synchronization topic indicator of the at least one synchronization request message.

Referring back to FIG. 4, subsequent and/or in response to step/operation 408, the example method 400 proceeds to step/operation 410. At step/operation 410, a processing circuitry (such as, but not limited to, the processor 305 of the application service server 121A of the application service system 107A described above in connection with at least FIG. 1 and FIG. 3, another processor of another application service server of another application service system in the data object synchronization environment, and/or the processor 206 of the client device 101A described above in connection with at least FIG. 1 and FIG. 2) transmits a duplicate copy of the at least one on-premises data object to the in-cloud application service system.

For example, the on-premises application service system may generate at least one duplicate copy of the at least one on-premises data object retrieved at step/operation 408, and may transmits the al least one duplicate copy of the at least one on-premises data object to the in-cloud application service system at step/operation 410.

In some embodiments, the on-premises application service system transmits the duplicate copy of the at least one on-premises data object based at least in part on the at least one synchronization schedule indicator of the at least one synchronization request message. As described above, the at least one synchronization schedule indicator specifies a schedule of when data objects are to be synchronized, and the on-premises application service system may transmit the at least one duplicate copy of the at least one on-premises data object to the in-cloud application service system in accordance with the schedule that is defined by the at least one synchronization schedule indicator of the at least one synchronization request message.

Continuing from the example, the synchronization schedule indicator of the at least one synchronization request message may indicate that synchronization should take place at 0:0:0 (EST) on Sep. 1, 2021. In this example, the on-premises application service system may transmit the on-premises data objects retrieved at step/operation 408 to the in-cloud application service system on 0:0:0 (EST) on Sep. 1, 2021.

In some embodiments, the on-premises application service system may transmit the at least one duplicate copy of the at least one on-premises data object directly to the in-cloud application service system. For example, the API defined and/or provided by the in-cloud application service system may provide one or more endpoints for receiving data objects, and the on-premises application service system may transmit the at least one duplicate copy of the at least one on-premises data object to the one or more endpoints. As described above, the API defined and/or provided by the in-cloud application service system may further specify format and/or structure of messages, queries, and/or requests. The on-premises application service system may format or structure a transmission message according to the API, and send the transmission message together with the at least one duplicate copy of the at least one on-premises data object.

In some embodiments, the on-premises application service system may transmit the at least one duplicate copy of the at least one on-premises data object to the in-cloud application service system through one or more intermediaries. For example, the on-premises application service system may transmit the at least one duplicate copy of the at least one on-premises data object to another server, a reply, and/or another computing system that may transmit the at least one duplicate copy of the at least one on-premises data object to the in-cloud application service system.

Referring back to FIG. 4, subsequent and/or in response to step/operation 410, the example method 400 proceeds to step/operation 412. At step/operation 412, a processing circuitry (such as, but not limited to, the processor 305 of the application service server 121A of the application service system 107A described above in connection with at least FIG. 1 and FIG. 3, another processor of another application service server of another application service system in the data object synchronization environment, and/or the processor 206 of the client device 101A described above in connection with at least FIG. 1 and FIG. 2) receives at least one synchronization completion success message from the in-cloud application service system.

For example, subsequent to the in-cloud application service system receives the at least one duplicate copy of the at least one on-premises data object that is transmitted by the on-premises application service system, the in-cloud application service system may process the at least one duplicate copy of the at least one on-premises data object and update its in-cloud data object repository.

Subsequent to the in-cloud application service system completing processing and/or updating, the in-cloud application service system may transmit at least one at least one synchronization completion success message. In some embodiments, the synchronization completion success message indicates that the synchronization has been successfully completed by the in-cloud application service system.

As such, on-premises application service system receives at least one synchronization completion success message from the in-cloud application service system subsequent to transmitting the duplicate copy of the at least one on-premises data object to the in-cloud application service system in connection with step/operation 410 above.

Referring back to FIG. 4, subsequent and/or in response to step/operation 412, the example method 400 proceeds to step/operation 414 and ends.

FIG. 5A and FIG. 5B are example signal diagrams illustrating example data communications associated with synchronizing data between an on-premises application service system (including an on-premises data object repository 501 and an on-premises application service server 503) and an in-cloud application service system (including an in-cloud application service server 505) during an initial synchronization in accordance with some embodiments of the present disclosure.

Referring now to FIG. 5A, the on-premises application service server 503 may transmit a synchronization check message 507 to the in-cloud application service server 505. In response to the synchronization check message 507, the in-cloud application service server 505 transmits a synchronization request message 509 to the on-premises application service server 503.

In some embodiments, subsequent to receiving the synchronization request message 509, the on-premises application service server 503 may transmit an acknowledgment message 511 to the in-cloud application service server 505, indicating that the on-premises application service server 503 has received the synchronization request message 509. In response, the in-cloud application service server 505 transmits a receipt confirmation message 513.

In some embodiments, based on the synchronization request message 509, the on-premises application service server 503 retrieves one or more on-premises data object 515 from the on-premises data object repository 501, similar to those described above.

Referring now to FIG. 5B, subsequent to retrieving the at least one on-premises data object 515, the on-premises application service server 503 may transmit duplicates of the at least one on-premises data object 515 to the in-cloud application service server 505 through one or more multiple messages.

For example, the on-premises application service server 503 may transmit a first synchronization message 517 that includes a first part of the duplicates of the at least one on-premises data object 515 to the in-cloud application service server 505. In response to receiving the first synchronization message 517, the in-cloud application service server 505 transmits a first acknowledgment message 519.

In some embodiments, the on-premises application service server 503 may transmit a second synchronization message 521 that includes a second part of the duplicates of the at least one on-premises data object 515 to the in-cloud application service server 505. In response to receiving the second synchronization message 521, the in-cloud application service server 505 transmits a second acknowledgment message 523.

In some embodiments, the on-premises application service server 503 may transmit a third synchronization message 525 that includes a last part of the duplicates of the at least one on-premises data object 515 to the in-cloud application service server 505. In response to receiving the third synchronization message 525, the in-cloud application service server 505 transmits a third acknowledgment message 527.

FIG. 5C and FIG. 5D are example signal diagrams illustrating example data communications associated with synchronizing data between an on-premises application service system (including an on-premises data object repository 501, a processing queue object 531, and an on-premises synchronization component 529) and an in-cloud application service system (including an in-cloud application service server 505) during an initial synchronization in accordance with some embodiments of the present disclosure.

In the examples shown in FIG. 5C and FIG. 5D, the example initial synchronization is related to synchronizing data from the on-premises application service system (for example, data objects stored in the on-premises data object repository 501) to the in-cloud application service system. In particular, FIG. 5C illustrates synchronizing a "snapshot" of the data objects stored in the on-premises data object repository 501, and the "snapshot" may include all of the data objects stored in the on-premises data object repository 501. FIG. 5D illustrates synchronizing one or more "pages" of a "snapshot" of the data objects stored in the on-premises data object repository 501, and the one or more "pages" may include some, but not all, of the data objects stored in the on-premises data object repository 501.

In the present disclosure, the term "snapshot" refers to a set of data at a moment in time. For example, a snapshot provides a current status, version, content, and/or the like of data object(s). Part of the initial synchronization includes a definition of data that is being synced (for example, in the form of a Jira Query Language (JQL) statement). In this example, because data may change after the initial synchronization (for example, one or more issue data objects may be added and/or deleted), the JQL statement needs to utilize snapshot(s) of data that provides a baseline of data that captures information associated with the data at a moment in time (e.g. at the time of the initial synchronization).

In the present disclosure, the term "page" refers to a chunk of snapshot data. In many examples, on-premises application service systems and/or in-cloud application service systems may not be notified as to the amount of data to be synchronized, and the on-premises application service systems and/or the in-cloud application service systems may break up the data to be synchronized into pages, so that one page can be synchronized at a time. For example, if the snapshot data contains 1000 records, the on-premises application service systems and/or the in-cloud application service systems may break the snapshot data up into 10 pages of 100 records each.

In FIG. 5C and FIG. 5D, the in-cloud application service server 505 may add an unique message identifier (e.g. "ALIGN_MESSAGE_ID identifier") to every message (including, but not limited to, synchronization request messages) that it sends to the on-premises synchronization component 529, and the on-premises synchronization component 529 may include the same unique message identifier in every response message (including, but not limited to, synchronization check messages) transmitted to the in-cloud application service server 505.

In some embodiments, after the on-premises synchronization component 529 of the on-premises application service server 503 receives a message from the in-cloud application service server 505, the on-premises application service server 503 immediately sends an acknowledgment/confirmation message to the in-cloud application service server 505 that the message from the in-cloud application service server 505 is received and is under processing (e.g. the on-premises application service server 503 received the message and started working on processing the message). In some embodiments, the on-premises application service server 503 sends a second acknowledgment/confirmation message to the in-cloud application service server 505 when the on-premises application service server 503 completes processing the message from the in-cloud application service server 505. The second acknowledgment/confirmation message may indicate that the processing was successful, or that some errors have occurred while processing the message.

As described above, FIG. 5C illustrates an example where the in-cloud application service server 505 requests a new snapshot from the on-premises application service server 503 during the initial synchronization. In particular, when in-cloud application service server 505 requests the on-premises application service server 503 to create a new snapshot (for example, a snapshot of data objects associated with users, a snapshot of data objects associated with issues, a snapshot of data objects associated with board, etc.), the in-cloud application service server 505 is responsible for generating an unique identifier REFERENCE_ID. The REFERENCE_ID will be used to identify the snapshot. When snapshot is ready, the on-premises application service server 503 sends an acknowledgment/confirmation message to the in-cloud application service server 505. The message will contain: REFERENCE_ID (taken from the request from the in-cloud application service server 505) and NUMBER_OF_PAGES (the size of the newly created snapshot, e.g. the number of pages). The in-cloud application service server 505 is obligated to use the unique REFERENCE_ID every time it requires the new snapshot to be prepared. If the in-cloud application service server 505 uses existing REFERENCE_ID, the on-premises application service server 503 will report an error.

Referring now to FIG. 5C, the on-premises synchronization component 529 transmits a synchronization check message 535 to the in-cloud application service server 505 to poll synchronization request messages from the in-cloud application service server 505. In some embodiments, the synchronization check message 535 may be in the following format:

HTTP get/api/jira/messages?connectorId=123

In response, the in-cloud application service server 505 transmits a synchronization request message 539 to the on-premises synchronization component 529. In some embodiments, the synchronization request message 539 may be in the following format:

return JSON document:
TOPIC=IS_ISSUES
reference_id=1
align_message_id=300

In some embodiments, the in-cloud application service server 505 may transmit a JSON document to the on-premises synchronization component 529, and the JSON document may include one or more messages and/or requests that may or may not be related to one another and may include the synchronization request message 539. In such an example, the on-premises synchronization component 529 treats each message/request separately, and transmits one acknowledgment/confirmation message to the in-cloud application service server 505 for each message/request.

In some embodiments, subsequent to receiving the synchronization request message 539, the on-premises synchronization component 529 inserts the synchronization request message to the processing queue object 531 at data transmission 541. The processing queue object 531 transmits an acknowledgment/confirmation message 545 to the on-premises synchronization component 529.

In the example steps described above, the on-premises synchronization component 529 functions as a data handler 537 that communicates with the in-cloud application service server 505.

In some embodiments, the on-premises application service server 503 transmits an acknowledgment/confirmation message 547 to the in-cloud application service server 505 using the processing queue object 531. In some embodiments, the acknowledgment/confirmation message 589 may be in the following format:

HTTP POST
ACK "received"
reference_id=1
align_message_id=300

In some embodiments, the on-premises application service server 503 may transmit a polling message 551 to the processing queue object 531 every 1 second. In some embodiments, the processing queue object 531 transmits a request message 555 to the on-premises synchronization component 529. In such an example, the on-premises synchronization component 529 functions as an end-user data processor 557 to generate snapshots.

For example, if the synchronization request message 539 from the in-cloud application service server 505 does not include the specific identifiers of the snapshot, and/or the synchronization request message 539 comprises a database query message (for example, a JSQL message), the on-premises synchronization component 529 transmits a request message 559 to the on-premises data object repository 501 to retrieve identifiers of issue data objects that have been updated within the last 30 days. In response, the on-premises data object repository 501 returns a query message 563 with a list of identifiers.

Additionally, or alternatively, the on-premises synchronization component 529 may perform data operation 565 based on the synchronization request message 539. For example, the on-premises synchronization component 529 may group identifiers into batches/pages, generate a list of identifiers in the batches/pages, and store the list of identifiers in a database (for example, the on-premises data object repository 501). In some embodiments, the list of identifiers stored in the database is associated with an identifier based on the synchronization request message 539 (for example, reference_id=1).

In some embodiments, the on-premises synchronization component 529 transmits an acknowledgment/confirmation message 567 to the in-cloud application service server 505 through the processing queue object 531.

In some embodiments, the acknowledgment/confirmation message 567 may indicate the snapshot is ready for transmission to the in-cloud application service server 505. For example, the acknowledgment/confirmation message 567 may be in the following format:

HTTP POST
ACK "Snapshot Ready"
reference_id=1
align_message_id=300
page_count=5

In some embodiments, the acknowledgment/confirmation message 567 may indicate that some errors have occurred.

As described above, FIG. 5D illustrates an example where the in-cloud application service server 505 requests a particular page of a snapshot from the on-premises application service server 503 during the initial synchronization. In particular, when the in-cloud application service server 505 requests a given page of a snapshot from the on-premises application service server 503, the in-cloud application service server 505 has to send a synchronization request message comprising REFERENCE_ID and PAGE_NO (the number of page that is requested). In some embodiments, for requesting multiple pages, the synchronization request message comprises REFERENCE_ID and List <PAGE_NO> (the list of the numbers of pages that are requested).

As described herein, various embodiments of the present disclosure provide various technical benefits and advantages. For example, processing a snapshot with millions of entries in one go is unlikely to be successful. As noted above, the systems cannot rely on updates to the on-premise system, so it is technically beneficial to keep as much configuration in in-cloud application service systems as possible (where one can update it on the fly). Providing in-cloud application service systems the control of which pages to request and when to request them allows the systems to start with a batch of results that one can process in a reasonable amount of time without overloading the system from a performance perspective. As the performance of in-cloud application service systems continues to improve, the systems can increase the page size and/or increase the number of pages requested at the same time.

For example, during a retry, because in-cloud application service systems processing can take place out of process, a failure to process could occur on page 7 of the dataset. Once the in-cloud application service systems recover, they would not need to process pages 1-6 again and could proceed from page 7 on. As such, various embodiments of the present disclosure provide various technical benefits and advantages.

Referring now to FIG. 5D, the on-premises synchronization component 529 transmits a synchronization check message 575 to the in-cloud application service server 505 to poll synchronization request messages from the in-cloud application service server 505, similar to those described above.

In response, the in-cloud application service server 505 transmits a synchronization request message 579 to the on-premises synchronization component 529. In some embodiments, the synchronization request message 579 may be in the following format:

request page
align_message_id=301
reference_id=1
page_no=1

In some embodiments, subsequent to receiving the synchronization request message 579, the on-premises synchronization component 529 inserts the synchronization request message to the processing queue object 531 at data transmission 581. The processing queue object 531 transmits an acknowledgment/confirmation message 585 to the on-premises synchronization component 529.

In the example steps described above, the on-premises synchronization component 529 functions as a data handler 593 that communicates with the in-cloud application service server 505.

In some embodiments, the on-premises application service server 503 transmits an acknowledgment/confirmation message 589 to the in-cloud application service server 505 using the processing queue object 531. In some embodiments, the acknowledgment/confirmation message 589 may be in the following format:

HTTP POST
ACK "received"
align_message_id=301
reference_id=1

In some embodiments, the on-premises application service server 503 may transmit a polling message 587 to the processing queue object 531 every 1 second. In some embodiments, the processing queue object 531 transmits a request message 597 to the on-premises synchronization component 529. In such an example, the on-premises synchronization component 529 functions as an end-user data processor 599 to generate snapshots.

For example, the on-premises synchronization component 529 may perform data operation 560 to identify/locate one or more pages in a database (such as, but not limited to, the on-premises data object repository 501) based on the synchronization request message 579. For example, the on-premises synchronization component 529 may identify page number 1 in the database with the refernece_id 1. In some embodiments, each page may comprise a list of identifiers (for example, the identifiers of issue data objects, board data objects, etc.)

In some embodiments, the on-premises synchronization component 529 transmits a query message 562 to the on-premises data object repository 501 to retrieve one or more data objects from the on-premises data object repository 501 based on the identifiers described above. In some embodiments, the on-premises data object repository 501 transmit a return message 564 to the on-premises synchronization component 529 with a list of data objects.

In some embodiments, the on-premises synchronization component 529 may perform data operation 566 to sterilize all data objects (such as issue data objects) into one payload of a message. In some embodiments, the on-premises synchronization component 529 may transmit the payload 568 to the processing queue object 531, and the processing queue object 531 returns an acknowledgment/confirmation message 570 to the on-premises synchronization component 529.

In some embodiments, the on-premises synchronization component 529 transmits an acknowledgment/confirmation message 572 to the in-cloud application service server 505 through the processing queue object 531. In some embodiments, the acknowledgment/confirmation message 572 may indicate that one or more pages are added to the queue and ready for transmission to the in-cloud application service server 505. For example, the acknowledgment/confirmation message 572 may be in the following format:

HTTP POST
ACK "Page Sent"
align_message_id=301
reference_id=1
page_no=1

In some embodiments, the acknowledgment/confirmation message 572 may indicate that some errors have occurred.

In some embodiments, the on-premises application service server 503 may transmit a polling message 574 to the processing queue object 531 every 1 second. In some embodiments, the processing queue object 531 transmits a request message 576 to the on-premises synchronization component 529. In such an example, the on-premises synchronization component 529 functions as an end-user data processor 578 and transmits the page to the in-cloud application service server 505 at data operation 580. In some embodiments, the in-cloud application service server 505 transmits an acknowledgment/confirmation message 584 to the on-premises synchronization component 529, and the on-premises synchronization component 529 transmits an acknowledgment/confirmation message 582 to the processing queue object 531.

FIG. 6A, FIG. 6B, and FIG. 6C are example signal diagrams illustrating examples of data communications between an on-premises application service system 602 and an in-cloud application service system 604 in accordance with some embodiments of the present disclosure.

In the example shown in FIG. 6A, the on-premises application service system 602 comprises an on-premises application service server 606, similar to those described above. The in-cloud application service system 604 comprises an in-cloud application service server 610 in electronic communication with an inbound/outbound message queue table object 612.

In some embodiments, each of the on-premises application service server 606 and the in-cloud application service server 610 may comprise one or more software application components installed within.

In the example shown in FIG. 6A, the on-premises application service server 606 comprises an on-premises synchronization component 614 that manages synchronization messages generated or received by the on-premises application service server 606. As shown in FIG. 6A, the on-premises synchronization component 614 comprises an outgoing on-demand component 616 that manages transmitting messages to the in-cloud application service server 610 and an incoming timer component 617 that pulls incoming messages from the in-cloud application service server 610 to the on-premises application service server 606.

As described above, various examples of the present disclosure provide technical benefits and advantages. For example, the "incoming" messages are pulled into the on-premises application service server 606 by the incoming timer component 617. The incoming timer component 617 makes an outgoing call to the API component 618 and requests for any "incoming" messages. This mechanism enables a 2-way communication via a 1-way (e.g. outgoing) HTTP request.

In the example shown in FIG. 6A, the in-cloud application service server 610 comprises an API component 618 and an in-cloud synchronization component 620. The API component 618 provides an interface for receiving messages from and transmitting messages to the on-premises application service server 606. The in-cloud synchronization component 620 manages synchronization messages generated or received by the in-cloud application service server 610. As shown in FIG. 6A, the in-cloud synchronization component 620 comprises an outgoing timer component 624 that manages transmitting messages to the on-premises application service server 606 and an incoming timer component 622 that handles processing of incoming messages from the on-premises application service server 606.

As shown in FIG. 6A, in some embodiments, the outgoing on-demand component 616 of the on-premises synchronization component 614 may transmit a synchronization message 626 to the API component 618 of the in-cloud application service server 610. In some embodiments, the synchronization message 626 may be in the form of a POST message and may indicate one or more changes associated with the on-premises data objects stored in an on-premises data object repository. In some embodiments, the API component 618 of the in-cloud application service server 610 stores the incoming message 628 from the on-premises application service server 606 to inbound/outbound message queue table object 612, details of which are described herein. In some embodiments, the incoming timer component 622 of the in-cloud synchronization component 620 may dequeue or retrieve synchronization message 632 from the inbound/outbound message queue table object 612 for processing, and may update one or more in-cloud data objects stored in the in-cloud data object repository. The incoming timer component 622 of the in-cloud synchronization component 620 may also provide status messages 630 indicating the processing queue, details of which are described herein.

In some embodiments, the outgoing timer component 624 may generate synchronization messages 634 that may indicate one or more changes associated with the in-cloud data objects stored in an in-cloud data object repository. The outgoing timer component 624 may enqueue or add the synchronization messages 636 to the inbound/outbound message queue table object 612. Subsequently, the API Component 618 may retrieve the synchronization messages 638 from the inbound/outbound message queue table object 612, and may transmit the synchronization messages 640 to the incoming timer component 617 of the on-premises synchronization component 614. The on-premises synchronization component 614 may update one or more on-premises data objects stored in the on-premises data object repository, details of which are described herein.

In the example shown in FIG. 6B, the on-premises application service system 602 comprises an on-premises synchronization component 614, a processing queue object 646, and an on-premises data object repository 644, similar to those described herein. In some embodiments, an on-premises user 642 may communicate with the on-premises application service system 602 by using one or more client devices, similar to those described herein.

In some embodiments, the on-premises application service system 602 receives on-premises data object update metadata from the on-premises user 642 (for example, indicating updates/changes associated with the data objects stored in the on-premises data object repository 644). For example, one or more client devices may provide on-premises data object update metadata 652 to the processing queue object 646 and/or the on-premises data object update metadata 654 to the on-premises data object repository 644. In some embodiments, the on-premises data object update metadata 652 and the on-premises data object update metadata 654 are the same. Additionally, or alternatively, the processing queue object 646 may perform data operations 656 and/or 658 to store and/or update data objects in the on-premises data object repository 644.

In some embodiments, the on-premises synchronization component 614 monitors for updates/changes associated with the data objects stored in the on-premises data object repository 644. For example, the on-premises synchronization component 614 may detect/determine that new on-premises data object update metadata 652 has been added to the processing queue object 646. In some embodiments, once the on-premises data object update metadata 652 is added to the processing queue object 646, the processing queue object 646 may sterilize the data objects associated with the on-premises data object update metadata 652 (for example, into JSON format) and may transmit the data objects to the on-premises synchronization component 614 at data operation 660.

In some embodiments, the on-premises synchronization component 614 may transmit data objects to the in-cloud application service system 604 at data operation 662 (for example, via REST protocol). In some embodiments, data objects transmitted to the in-cloud application service system 604 may include, but not limited to, on-premises application service system/server version, on-premises application service system/server build number, version of the on-premises synchronization component and messages. In some embodiments, the messages contain actual data/information related to the on-premises data object update metadata (for example, issue changes). In some embodiments, data objects transmitted to the in-cloud application service system 604 may include additional or alternative data/information.

In the example shown in FIG. 6C, the on-premises application service system 602 comprises an on-premises data object repository 644 and a processing queue object 646, similar to those described above. In some embodiments, the on-premises application service system 602 comprises an on-premises synchronization component 614, similar to those described herein. In some embodiments, the on-premises application service system 602 comprises other components 648 that are different from the on-premises synchronization component 614.

Ad described above, the on-premises data object repository 644 comprises data objects. In some embodiments, the processing queue object 646 may be structured on top of the on-premises data object repository 644 (and/or dependent on the on-premises data object repository 644) to provide a configurable queue of changes associated with the data objects stored in the on-premises data object repository 644. In some embodiments, the on-premises synchronization component 614 may be structured on top of the processing queue object 646 (and/or dependent on the on-premises synchronization component 614) to communicate with the processing queue object 646 (for example, fetching data to the in-cloud application service system 604 based on the changes associated with the data objects stored in the on-premises data object repository 644). For example, the on-premises synchronization component 614 may collect information about changes in the on-premises data object repository 644 based on the processing queue object 646, and organize data and/or information related to the changes to the in-cloud application service system 604. As described above, examples of changes include, but not limited to, creating a data object (such as, but not limited to, issue data objects, project data, and/or the like), detecting a data object (such as, but not limited to, issue data objects, project data, and/or the like), updating a data object (such as, but not limited to, issue data objects, project data, and/or the like), archiving a data object (such as, but not limited to, issue data objects, project data, and/or the like), restoring a data object (such as, but not limited to, issue data objects, project data, and/or the like), and/or the like.

In some embodiments, other components 648 may be structured on top of the processing queue object 646 and may provide other functions.

In some embodiments, the on-premises synchronization component 614 is bi-directionally in communicating with the in-cloud application service system 604 (for example, sending messages (e.g. based on data changes) to in-cloud application service system 604, and polling messages (e.g. based on data changes) from in-cloud application service system 604 to address them in the on-premises data object repository 644. In some embodiments, the on-premises synchronization component 614 may poll data from in-cloud application service system 604 according to a polling schedule.

For example, the on-premises synchronization component 614 is able to communicate with the in-cloud application service system 604 (for example, via REST protocol or hardcoded). In some embodiments, the on-premises synchronization component 614 is able to send hello request to the in-cloud application service system 604 on a schedule, set up in configurations, and receive an OK HTTP status from the in-cloud application service system 604 to indicate that the connection has been established properly. The status of request is available in logs/audit of the on-premises application service system 602. In some embodiments, the on-premises synchronization component 614 is able to pull data from the in-cloud application service system 604 on a schedule. In some embodiments, data and/or information about request and its status is available in logs/audit of the on-premises application service system 602.

In some embodiments, the on-premises synchronization component 614 is able to use the processing queue object 646 as a connection middleware between the on-premises synchronization component 614 and the on-premises application service system 602. In some embodiments, the on-premises synchronization component 614 is able to take the data changes from the processing queue object 646 to send them to the in-cloud application service system 604. For example, the on-premises synchronization component 614 is able to write changes to the on-premises application service system 602 (that came from in-cloud application service system 604). In some embodiments, the queue items in the processing queue object 646 are marked as processed when a successful response is received from the in-cloud application service system 604. In some embodiments, the queue items do not put the in-cloud application service system 604 and the on-premises application service system 602 (and the on-premises synchronization component 614 itself) into endless processing cycles.

Synchronizing Updates from an on Premises Application Service System to an In-Cloud Application Service System Referring now to FIG. 7, an example method 700 in accordance with some embodiments of the present disclosure is illustrated. In particular, the example method 700 illustrates example steps/operations of synchronizing data between an on-premises application service system and an in-cloud application service system in response to receiving on-premises data object update metadata associated with at least one on-premises data object.

In the example shown in FIG. 7, the example method 700 starts at block 701 and then proceeds to step/operation 703. At step/operation 703, a processing circuitry (such as, but not limited to, the processor 305 of the application service server 121A of the application service system 107A described above in connection with at least FIG. 1 and FIG. 3, another processor of another application service server of another application service system in the data object synchronization environment, and/or the processor 206 of the client device 101A described above in connection with at least FIG. 1 and FIG. 2) receives on-premises data object update metadata associated with the at least one on-premises data object.

For example, the on-premises application service system receives on-premises data object update metadata from a client device, and the on-premises data object update metadata is associated with the at least one on-premises data object stored in the on-premises data object repository of the on-premises application service system.

As defined above, the on-premises data object update metadata indicates one or more edits, updates, and/or changes associated with an on-premises data object stored in the on-premises data object repository. In some embodiments, on-premises data object update metadata may be generated by a client device based at least in part on user inputs that are provided to the client device and by a user. In some embodiments, the on-premises application service system may update one or more on-premises data objects based at least in part on the on-premises data object update metadata.

As an example, referring to FIG. 1, the application service system 107A may be an on-premises application service system, and the application service system 107C may be an in-cloud application service system. In this example, a user operating the client device 101A may provide user inputs that comprise edits, changes, and/or updates to one or more on-premises data objects stored in the data object repository 123A (e.g. on-premises data object repository). The client device 101A may generate on-premises data object update metadata based on the user inputs, and may transmit the on-premises data object update metadata to the application service system 107A (e.g. on-premises application service system). In some embodiments, the application service system 107A receives the on-premises data object update metadata, and may update the on-premises data objects stored in the data object repository 123A based at least in part on the on-premises data object update metadata.

Referring back to FIG. 7, subsequent and/or in response to step/operation 703, the example method 700 proceeds to step/operation 705. At step/operation 705, a processing circuitry (such as, but not limited to, the processor 305 of the application service server 121A of the application service system 107A described above in connection with at least FIG. 1 and FIG. 3, another processor of another application service server of another application service system in the data object synchronization environment, and/or the processor 206 of the client device 101A described above in connection with at least FIG. 1 and FIG. 2) generates at least one synchronization update message.

For example, the on-premises application service system generates at least one synchronization update message that is in the form of an electronic message and/or electronic notification and represents or indicates one or more updates or edits of one or more on-premises data objects stored in the on-premises data object repository based at least in part on the on-premises data object update metadata received at step/operation 703.

In some embodiments, the at least one synchronization update message comprises at least one update topic indicator. As defined above, the at least one update topic indicator may specify what and/or how on-premises data objects stored in the on-premises data object repository have been edited, updated, and/or changed. In some embodiments, the on-premises application service system may generate the at least one update topic indicator based at least in part on the on-premises data object update metadata received at step/operation 703.

Continuing from the example above in connection with FIG. 1 where the application service system 107A may be an on-premises application service system and the application service system 107C may be an in-cloud application service system, in response to receiving on-premises data object update metadata from the client device 101A, the application service system 107A may generate at least one synchronization update message. The synchronization update message may indicate what and how on-premises data objects stored in the data object repository 123A have been edited, updated, and/or changed by the user inputs to the client device 101A as reflected in the on-premises data object update metadata.

Referring back to FIG. 7, subsequent and/or in response to step/operation 705, the example method 700 proceeds to step/operation 707. At step/operation 707, a processing circuitry (such as, but not limited to, the processor 305 of the application service server 121A of the application service system 107A described above in connection with at least FIG. 1 and FIG. 3, another processor of another application service server of another application service system in the data object synchronization environment, and/or the processor 206 of the client device 101A described above in connection with at least FIG. 1 and FIG. 2) adds the at least one synchronization update message to a processing queue object.

For example, the on-premises application service system may comprise a processing queue object, and may add the at least one synchronization update message to the processing queue object of the on-premises application service system. As defined above, the processing queue object may be in a data structure for storing one or more synchronization update messages generated by the on-premises application service system.

Continuing from the example above in connection with FIG. 1 where the application service system 107A may be an on-premises application service system and the application service system 107C may be an in-cloud application service system, the on-premises application service system comprise a processing queue object that stores synchronization update message(s) generated by the application service system 107A. In this example, the application service system 107A adds the at least one synchronization update message generated by the application service system 107A at step/operation 705 to the processing queue object.

Referring back to FIG. 7, subsequent and/or in response to step/operation 707, the example method 700 proceeds to step/operation 709. At step/operation 709, a processing circuitry (such as, but not limited to, the processor 305 of the application service server 121A of the application service system 107A described above in connection with at least FIG. 1 and FIG. 3, another processor of another application service server of another application service system in the data object synchronization environment, and/or the processor 206 of the client device 101A described above in connection with at least FIG. 1 and FIG. 2) processes the plurality of synchronization update messages from the processing queue object.

In some embodiments, the on-premises application service system may process the plurality of synchronization update messages from the processing queue object by (1) updating one or more on-premises data objects stored in the on-premises data object repository that are associated with the on-premises data object update metadata received at step/operation 703, and/or (2) transmitting the at least one synchronization update message that is added to the processing queue object at step/operation to an in-cloud application service system.

Continuing from the example above in connection with FIG. 1 where the application service system 107A may be an on-premises application service system and the application service system 107C may be an in-cloud application service system, the application service system 107A may update the one or more on-premises data objects stored in the data object repository 123A based on the on-premises data object update metadata received at step/operation 703. Additionally, or alternatively, the application service system 107A may transmit the at least one synchronization update message to the application service system 107C (e.g. an in-cloud application service system).

In some embodiments, step/operation 709 of FIG. 7 may comprise one or more additional sub-steps/sub-operations. In the example shown in FIG. 7, step/operation 709 may comprise sub-step/sub-operation 713. At sub-step/sub-operation 713, a processing circuitry (such as, but not limited to, the processor 305 of the application service server 121A of the application service system 107A described above in connection with at least FIG. 1 and FIG. 3, another processor of another application service server of another application service system in the data object synchronization environment, and/or the processor 206 of the client device 101A described above in connection with at least FIG. 1 and FIG. 2) transmits the at least one synchronization update message to the in-cloud application service system.

For example, the on-premises application service system transmits one or more synchronization update messages from the processing queue object of the on-premises application service system to the in-cloud application service system. In some examples, the number of synchronization update messages within a transmission to the in-cloud application service system and/or the schedule (e.g. time, frequency, etc.) of such a transmission may be specified by the in-cloud application service system (for example, but not limited to, based at least in part on a synchronization schedule indicator generated by the in-cloud application service system). As such, network traffic due to data synchronizations can be reduced, which provides improvements on computer and network technologies.

Continuing from the example above in connection with FIG. 1 where the application service system 107A may be an on-premises application service system and the application service system 107C may be an in-cloud application service system, the application service system 107A may retrieve one or more synchronization update messages from the processing queue object of the application service system 107A, and may transmit the one or more synchronization update messages to the application service system 107C. As described above, the number of synchronization update messages within a transmission to the application service system 107C and/or the schedule (e.g. time, frequency, etc.) of such a transmission may be specified by the application service system 107C.

Referring back to FIG. 7, subsequent and/or in response to sub-step/sub-operation 713, the example method 700 proceeds to sub-step/sub-operation 715. At sub-step/sub-operation 715, a processing circuitry (such as, but not limited to, the processor 305 of the application service server 121A of the application service system 107A described above in connection with at least FIG. 1 and FIG. 3, another processor of another application service server of another application service system in the data object synchronization environment, and/or the processor 206 of the client device 101A described above in connection with at least FIG. 1 and FIG. 2) updates the processing queue object.

For example, subsequent to transmitting the at least one synchronization update message to the in-cloud application service system at sub-step/sub-operation 713, the on-premises application service system updates the processing queue object to indicate a processing completion of the at least one synchronization update message. For example, the on-premises application service system removes the at least one synchronization update message from the processing queue object and/or updates a status of the at least one at least one synchronization update message to indicate that the at least one synchronization update message has been transmitted, so that the on-premises application service system can continue processing other synchronization update message(s) stored in the processing queue object.

Continuing from the example above in connection with FIG. 1 where the application service system 107A may be an on-premises application service system and the application service system 107C may be an in-cloud application service system, subsequent to the application service system 107A transmitting the at least one synchronization update message to the application service system 107C, the application service system 107A may update a processing queue of the application service system 107A to indicate that the processing of the at least one synchronization update message has been completed.

Referring back to FIG. 7, subsequent and/or in response to sub-step/sub-operation 715 and/or step/operation 709, the example method 700 proceeds to step/operation 717 and ends.

Referring now to FIG. 8, an example method 800 in accordance with some embodiments of the present disclosure is illustrated. In particular, the example method 800 illustrates example steps/operations of synchronizing at least one in-cloud data object that is stored in an in-cloud data object repository based on on-premises data object update metadata associated with the at least one on-premises data object stored in an on-premises data object repository.

In the example shown in FIG. 8, the example method 800 starts at block 802 and then proceeds to step/operation 804. At step/operation 804, a processing circuitry (such as, but not limited to, the processor 305 of the application service server 121A of the application service system 107A described above in connection with at least FIG. 1 and FIG. 3, another processor of another application service server of another application service system in the data object synchronization environment, and/or the processor 206 of the client device 101A described above in connection with at least FIG. 1 and FIG. 2) transmits at least one synchronization update message to the inbound message queue table object of the in-cloud application service system.

As described above, an in-cloud application service system may comprise an inbound message queue table object for storing one or more messages received by the in-cloud application service system such as, but not limited to, synchronization update messages from an on-premises application service system. In some embodiments, the in-cloud application service system may provide and/or define API(s) that provides one or more endpoints associated with the inbound message queue table object. Similar to those described above in connection with at least sub-step/sub-operation 713 of FIG. 7, the on-premises application service system can transmit the at least one synchronization update message to the inbound message queue table object of the in-cloud application service system based on, for example but not limited to, API(s) of the in-cloud application service system.

As an example, referring to FIG. 1, the application service system 107A may be an on-premises application service system, and the application service system 107C may be an in-cloud application service system. In this example, the application service system 107A may transmit at least one synchronization update message to the inbound message queue table object of the application service system 107C.

Referring back to FIG. 8, subsequent and/or in response to step/operation 804, the example method 800 proceeds to step/operation 806. At step/operation 806, a processing circuitry (such as, but not limited to, the processor 305 of the application service server 121A of the application service system 107A described above in connection with at least FIG. 1 and FIG. 3, another processor of another application service server of another application service system in the data object synchronization environment, and/or the processor 206 of the client device 101A described above in connection with at least FIG. 1 and FIG. 2) causes the in-cloud application service system to add a message processing status indicator to the message status table object.

In some embodiments, the on-premises application service system causes the in-cloud application service system to add a message processing status indicator to the message status table object corresponding to the at least one synchronization update message. In some embodiments, the in-cloud application service system adds a message processing status indicator to the message status table object corresponding to the at least one synchronization update message.

As described above, the in-cloud application service system may comprise a message status table object that records, stores, and/or indicates the status of messages that are received by the in-cloud application service system, including, but not limited to, the at least one synchronization update message received from the on-premises application service system at step/operation 804.

In some embodiments, the in-cloud application service system may generate a message processing status indicator for each synchronization update message received from the on-premises application service system and indicates its corresponding status, and may store the message processing status indicators in the message status table object. In some embodiments, when a new message (such as a new synchronization update message) is received by the in-cloud application service system, the in-cloud application service system may add a new message processing status indicator to the message status table object.

In some embodiments, the message processing status indicator may indicate a current status (e.g. received, in-flight, success, failure, etc. as defined above). Additionally, or alternatively, the message processing status indicator may indicate a time code or a timestamp of when the corresponding message (e.g. the synchronization update message) is received by the in-cloud application service system.

Continuing from the example above in connection with FIG. 1 where the application service system 107A may be an on-premises application service system and the application service system 107C may be an in-cloud application service system, the application service system 107C may add at least one message processing status indicator to the message status table object of the application service system 107C in response to receiving the at least one synchronization update message at step/operation 804. In some embodiments, the at least one message processing status indicator may indicate that the corresponding at least one synchronization update message has been received by the application service system 107C for processing.

Referring back to FIG. 8, subsequent and/or in response to step/operation 806, the example method 800 proceeds to step/operation 808. At step/operation 808, a processing circuitry (such as, but not limited to, the processor 305 of the application service server 121A of the application service system 107A described above in connection with at least FIG. 1 and FIG. 3, another processor of another application service server of another application service system in the data object synchronization environment, and/or the processor 206 of the client device 101A described above in connection with at least FIG. 1 and FIG. 2) causes the in-cloud application service system to determine whether a time period indicator between a previous message processing time indicator and a current system time indicator satisfies a message processing time interval threshold.

In some embodiments, the on-premises application service system causes the in-cloud application service system to determine whether a time period indicator between a previous message processing time indicator and a current system time indicator satisfies a message processing time interval threshold. In some embodiments, the in-cloud application service system determines whether a time period indicator between a previous message processing time indicator and a current system time indicator satisfies a message processing time interval threshold.

As defined above, the previous message processing time indicator refers to a time point when the in-cloud application service system last processed a synchronization update message from the inbound message queue table object, and the message processing time interval refers to a predetermined threshold time frequency for the in-cloud application service system to process synchronization update messages from the inbound message queue table object.

In some embodiments, the message processing time interval threshold is three minutes such that data are synchronized every three minutes. In some embodiments, the message processing time interval threshold can be of other values.

At step/operation 808, the in-cloud application service system determines whether a sufficient amount of time (as compared to the message processing time interval) has passed since the in-cloud application service system last processes synchronization update messages from the inbound message queue table object.

Continuing from the example above in connection with FIG. 1 where the application service system 107A may be an on-premises application service system and the application service system 107C may be an in-cloud application service system, the previous message processing time indicator associated with the application service system 107C may indicate a time point of 0:0:0 (EST) on Aug. 1, 2021. The current system time indicator may indicate a current time point 0:0:0 (EST) on Aug. 2, 2021. In this example, the time period indicator between the previous message processing time indicator and the current system time indicator is 24 hours. The message processing time interval of the application service system 107C may be 48 hours.

Referring back to FIG. 8, if, at step/operation 808, the time period indicator does not satisfy the message processing time interval threshold, the example method 800 proceeds to step/operation 814 and ends.

For example, if the time period indicator indicates a time period that is shorter than the message processing time interval threshold, the in-cloud application service system forgoes processing the message from the inbound message queue table object at the current system time. In some embodiments, the in-cloud application service system continues to wait until the time period between the previous message processing time indicator and the current system time indicator is longer than the message processing time interval threshold.

Continuing from the example above in connection with FIG. 1 where the application service system 107A may be an on-premises application service system and the application service system 107C may be an in-cloud application service system, the previous message processing time indicator associated with the application service system 107C may indicate a time point of 0:0:0 (EST) on Aug. 1, 2021. The current system time indicator may indicate a current time point 0:0:0 (EST) on Aug. 2, 2021. In this example, the time period indicator between the previous message processing time indicator and the current system time indicator is 24 hours. The message processing time interval of the application service system 107C may be 48 hours. In this example, the application service system 107C determines that an insufficient amount of time (as compared to the message processing time interval) has passed since the application service system 107C last processes synchronization update messages from the inbound message queue table object, and forgoes processing the synchronization update messages at the current system time.

As such, by implementing a message processing time interval threshold, various embodiments of the present disclosure not only improve the processing efficiency of the in-cloud application service system, but also reduce the processing resource needed for the in-cloud application service system, and therefore providing various technical benefits and improvements.

Referring back to FIG. 8, If, at step/operation 808, the time period indicator satisfies the message processing time interval threshold, the example method 800 proceeds to step/operation 810. At step/operation 810, a processing circuitry (such as, but not limited to, the processor 305 of the application service server 121A of the application service system 107A described above in connection with at least FIG. 1 and FIG. 3, another processor of another application service server of another application service system in the data object synchronization environment, and/or the processor 206 of the client device 101A described above in connection with at least FIG. 1 and FIG. 2) causes the in-cloud application service system to retrieve the at least one synchronization update message from the inbound message queue table object.

Continuing from the example above in connection with FIG. 1 where the application service system 107A may be an on-premises application service system and the application service system 107C may be an in-cloud application service system, the previous message processing time indicator associated with the application service system 107C may indicate a time point of 0:0:0 (EST) on Aug. 1, 2021. The current system time indicator may indicate a current time point 0:0:0 (EST) on Aug. 2, 2021. In this example, the time period indicator between the previous message processing time indicator and the current system time indicator is 24 hours. The message processing time interval of the application service system 107C may be 12 hours. In this example, the application service system 107C determines that an sufficient amount of time (as compared to the message processing time interval) has passed since the application service system 107C last processes synchronization update messages from the inbound message queue table object, and proceeds to step/operation 810.

In some embodiments, in response to the time period indicator being determined to satisfy the message processing time interval threshold, the on-premises application service system causes the in-cloud application service system to retrieve at least one synchronization update message from the inbound message queue table object. In some embodiments, in response to the time period indicator being determined to satisfy the message processing time interval threshold, the in-cloud application service system retrieves at least one synchronization update message from the inbound message queue table object.

In some embodiments, the on-premises data object repository and the in-cloud data object repository of the in-cloud application service system have previously been synchronized, such that each of the on-premises data objects stored in the on-premises data object repository corresponds to one of the in-cloud data objects stored in the in-cloud data object repository.

As described above, the at least one synchronization update message may comprise, represent, and/or is associated with one or more updates or edits of one or more on-premises data objects stored in an on-premises data object repository. As such, after the in-cloud application service system retrieves the at least one synchronization update message from the inbound message queue table object of the in-cloud application service system, the in-cloud application service system retrieves one or more in-cloud data objects stored in the in-cloud data object repository that correspond to the one or more on-premises data objects associated with the at least one synchronization update message (for example, based on their corresponding data object identifiers), and may apply updates to the one or more in-cloud data objects in accordance with the at least one synchronization update message.

Continuing from the example above in connection with FIG. 1 where the application service system 107A may be an on-premises application service system and the application service system 107C may be an in-cloud application service system, the application service system 107C retrieves at least one synchronization update message from the inbound message queue table object associated with the application service system 107C. As an example, the at least one synchronization update message may indicate one or more edits to an on-premises data object stored in the data object repository 123A (e.g. on-premises data object repository). In this example, the application service system 107C may retrieve an in-cloud data object from the data object repository 123C (e.g. in-cloud data object repository) that corresponds to this on-premises data object, and may apply the one or more edits to the in-cloud data object in accordance with the at least one synchronization update message.

Referring back to FIG. 8, subsequent and/or in response to step/operation 810, the example method 800 proceeds to step/operation 812. At step/operation 812, a processing circuitry (such as, but not limited to, the processor 305 of the application service server 121A of the application service system 107A described above in connection with at least FIG. 1 and FIG. 3, another processor of another application service server of another application service system in the data object synchronization environment, and/or the processor 206 of the client device 101A described above in connection with at least FIG. 1 and FIG. 2) causes the in-cloud application service system to update the message processing status indicator to indicate a processing status of the at least one synchronization update message.

In some embodiments, in response to the time period indicator being determined to satisfy the message processing time interval threshold, the on-premises application service system causes the in-cloud application service system to update the message processing status indicator to indicate a processing status of the at least one synchronization update message. In some embodiments, in response to determining that the time period indicator being determined to satisfy the message processing time interval threshold, the in-cloud application service system updates the message processing status indicator to indicate a processing status of at least one synchronization update message.

For example, subsequent to retrieving the at least one synchronization update message from the inbound message queue table object, the in-cloud application service system may update at least one message processing status indicator that corresponds to the at least one synchronization update message to indicate a processing status of the at least one synchronization update message.

For example, the processing status may be "in-flight," indicating that the at least one synchronization update message has been retrieved by the in-cloud application service system for processing. Additionally, or alternatively, the processing status may be "success," indicating that the at least one synchronization update message has been successfully processed by the in-cloud application service system. Additionally, or alternatively, the processing status may be "failure," indicating that the in-cloud application service system has failed to process the at least one synchronization update message. Additional details associated with updating the at least one message processing status indicator are described herein, including, but not limited to, those described herein in connection with at least FIG. 10A and FIG. 10B.

Continuing from the example above in connection with FIG. 1 where the application service system 107A may be an on-premises application service system and the application service system 107C may be an in-cloud application service system, the application service system 107C may update the message processing status indicator that corresponds to the at least one synchronization update message retrieved at step/operation 810. For example, the application service system 107C may update the processing status to "in-flight" similar to those described above.

Referring back to FIG. 8, subsequent and/or in response to step/operation 812, the example method 800 proceeds to step/operation 814 and ends.

FIG. 9A and FIG. 9B are example signal diagrams illustrating data communications associated with synchronizing at least one in-cloud data object based on on-premises data object update metadata associated with the at least one on-premises data object in accordance with some embodiments of the present disclosure.

In the example shown in FIG. 9A, an on-premises user 901 provides on-premises data object update metadata 914 to the on-premises synchronization component 905. For example, the on-premises user 901 may change the description of an issue data object, which may trigger an issue update event by the on-premises synchronization component 905.

In some embodiments, the on-premises synchronization component 905 may generate a synchronization update message 916, and may add the synchronization update message 916 to the processing queue object 903. Continuing from the example above, the synchronization update message 916 may comprise at least one synchronization topic indicator such as, but not limited to, "IssueCreatedEvent," "IssueDeletedEvent," "IssueChangedEvent."

Continuing from the example shown in FIG. 9A, the processing queue object 903 may push the one or more synchronization update messages 923 to the on-premises synchronization component 905, and the on-premises synchronization component 905 may transmit the one or more synchronization update messages 927 to the API Component 907 of the in-cloud application service system. In some embodiments, the one or more synchronization update messages 927 may be in the following example format:

HTTP POST

/api/2/jira/messages?connectorId=123

Subsequently, the API component 907 transmits the one or more synchronization update messages 931 to the inbound message queue table object 909. In response, the inbound message queue table object 909 may transmit one or more acknowledgment messages 937 to the API Component 907. In some embodiments, the inbound message queue table object 909 transmits one or more synchronization update messages 935 to the application service component 913 for processing, details of which are described in connection with at least FIG. 9B.

Referring back to FIG. 9A, in some embodiments, the API Component 907 adds one or more message processing status indicators 939 to the message status table object 911. In response, the message status table object 911 transmits one or more acknowledgment messages 943 to the API Component 907.

In some embodiments, subsequent to receiving the one or more acknowledgment messages 943, the API Component 907 transmits one or more acknowledgment messages 945 to the on-premises synchronization component 905. For example, the API Component 907 only transmits the one or more acknowledgment messages to the on-premises synchronization component 905 when a predetermined amount of acknowledgment messages 943 are received from the message status table object 911.

In some embodiments, once the on-premises synchronization component 905 receives the one or more acknowledgment messages 945, the on-premises synchronization component 905 transmits one or more update messages 947 to the processing queue object 903 to indicate that the corresponding one synchronization update messages stored in the processing queue object 903 has been handled by the in-cloud application service system.

As shown, the block A connects FIG. 9A to FIG. 9B. Referring now to FIG. 9B, in some embodiments, subsequent to receiving the one or more synchronization update messages, the application service component 913 transmits retrieval request messages 953 to the inbound message queue table object 909, and receives one or more synchronization update messages 961.

In some embodiments, after receiving the one or more synchronization update messages 961, the application service component 913 transmits update messages 963 to the message status table object 911 to update the one or more message processing status indicators corresponding to the received one or more synchronization update messages 961, and receives one or more acknowledgment messages 967 from the message status table object 911 in return.

In some embodiments, the application service component 913 may cause updates to be applied to one or more in-cloud data objects stored in the in-cloud data object repository. For example, the application service component 913 may transmit one or more synchronization update messages 969 to the issue service component 915, which may in turn transmit one or more synchronization update messages 973 to the feature service component 917.

In some embodiments, the feature service component 917 may update one or more in-cloud data objects based on the one or more synchronization update messages 969. Subsequently, the feature service component 917 may transmit one or more acknowledgment messages 977 to the issue service component 915, which in turn transmits one or more acknowledgment messages 979 to the application service component 913.

In some embodiments, subsequent to receiving the one or more acknowledgment messages 979, the application service component 913 transmits update messages 981 to the message status table object 911 to update the one or more message processing status indicators corresponding to the received one or more synchronization update messages 973, and receives one or more acknowledgment messages 985 from the message status table object 911 in return.

Referring now to FIG. 10A and FIG. 10B, an example method 1000 in accordance with some embodiments of the present disclosure is illustrated. In particular, the example method 1000 illustrates example steps/operations of synchronizing an in-cloud data object repository that may or may not comprise an in-cloud data object that corresponds to the on-premises data object associated with on-premises data object update metadata.

In the example shown in FIG. 10A, the example method 1000 starts at block 1002 and then proceeds to step/operation 1004. At step/operation 1004, a processing circuitry (such as, but not limited to, the processor 305 of the application service server 121A of the application service system 107A described above in connection with at least FIG. 1 and FIG. 3, another processor of another application service server of another application service system in the data object synchronization environment, and/or the processor 206 of the client device 101A described above in connection with at least FIG. 1 and FIG. 2) causes the in-cloud application service system to determine whether an in-cloud data object repository associated with the in-cloud application service system comprises at least one in-cloud data object that corresponds to the at least one on-premises data object associated with at least one synchronization update message.

In some embodiments, the on-premises application service system causes the in-cloud application service system to determine whether an in-cloud data object repository associated with the in-cloud application service system comprises at least one in-cloud data object that corresponds to the at least one on-premises data object. In some embodiments, the in-cloud application service system determines whether an in-cloud data object repository associated with the in-cloud application service system comprises at least one in-cloud data object that corresponds to the at least one on-premises data object.

For example, subsequent to a previous synchronization of on-premises data objects stored in an on-premises data object repository and in-cloud data objects stored in an in-cloud data object repository, one or more additional on-premises data objects may be generated by the on-premises application service system that have not synchronized to the in-cloud data object repository. A client device may provide on-premises data object update metadata associated with the one or more additional on-premises data objects to the on-premises application service system, and the on-premises application service system may generate a synchronization update message based on the on-premises data object update metadata, and may transmit the synchronization update message to an in-cloud application service system in accordance with various examples described herein. In such an example, the synchronization update message is associated with one or more additional on-premises data objects, and the in-cloud data object repository does not comprise any in-cloud data objects that correspond to these one or more additional on-premises data objects.

In some embodiments, to determine whether determines whether an in-cloud data object repository comprises at least one in-cloud data object that corresponds to the at least one on-premises data object associated with the at least one synchronization update message, the in-cloud application service system may determine a data object identifier from the at least one synchronization update message, which uniquely identifies the data object to which updates and edits associated with the at least one synchronization update message have been applied. The in-cloud application service system may determine whether the in-cloud data object repository comprises a data object that has a data object identifier that is the same or corresponds to the data object identifier from the at least one synchronization update message. If so, the in-cloud application service system determines that the in-cloud data object repository comprises at least one in-cloud data object that corresponds to the at least one on-premises data object associated with at least one synchronization update message. If not, the in-cloud application service system determines that the in-cloud data object repository does not comprise at least one in-cloud data object that corresponds to the at least one on-premises data object associated with at least one synchronization update message.

While the description above provides an example of making a determination for step/operation 1004, it is noted that the scope of the present disclosure is not limited to the description above. In some examples, an example method may determine whether an in-cloud data object repository comprises an in-cloud data object that corresponds to the on-premises data object associated with the synchronization update message through other ways.

As an example, referring to FIG. 1, the application service system 107A may be an on-premises application service system, and the application service system 107C may be an in-cloud application service system. In this example, the application service system 107C may retrieve a synchronization update message from an inbound message queue table object (similar to those described above), and may determine whether the data object repository 123C (e.g. in-cloud data object repository) comprises an in-cloud data object that corresponds to the on-premises data object associated with the synchronization update message.

Referring back to FIG. 10A, if, at step/operation 1004, the in-cloud data object repository associated with the in-cloud application service system does not comprise the at least one in-cloud data object that corresponds to the at least one on-premises data object, the example method 1000 proceeds to step/operation 1006.

At step/operation 1006, a processing circuitry (such as, but not limited to, the processor 305 of the application service server 121A of the application service system 107A described above in connection with at least FIG. 1 and FIG. 3, another processor of another application service server of another application service system in the data object synchronization environment, and/or the processor 206 of the client device 101A described above in connection with at least FIG. 1 and FIG. 2) causes the in-cloud application service system to generate a synchronization request message associated with the at least one on-premises data object.

In some embodiments, in response to the in-cloud data object repository associated with the in-cloud application service system is determined to not comprise the at least one in-cloud data object that corresponds to the at least one on-premises data object, the on-premises application service system causes the in-cloud application service system to generate a synchronization request message associated with the at least one on-premises data object. In some embodiments, in response to the in-cloud data object repository associated with the in-cloud application service system is determined to not comprise the at least one in-cloud data object that corresponds to the at least one on-premises data object, the in-cloud application service system generates a synchronization request message associated with the at least one on-premises data object.

For example, the in-cloud application service system may generate a synchronization request message that comprises, represents, and/or is associated with a request by the in-cloud application service system to receive a duplicate of the on-premises data object associated with the synchronization update message from the on-premises application service system. For example, the synchronization topic indicator may indicate the on-premises data object associated with the synchronization update message.

In such an example, the in-cloud application service system determines that the edits and/or changes associated with the on-premises data object as reflected by the synchronization update message cannot be applied because the in-cloud data object repository does not have a data object that corresponds to the on-premises data object. The in-cloud application service system holds off processing the synchronization update message and waits to receive a duplicate copy of the on-premises data object.

Continuing from the example above in connection with FIG. 1 where the application service system 107A may be an on-premises application service system and the application service system 107C may be an in-cloud application service system, the application service system 107C determines that the synchronization update message is associated with an on-premises data object that does not have a corresponding in-cloud data object in the data object repository 123C (e.g. in-cloud data object repository). In such an example, the application service system 107C holds off processing the synchronization update message, and waits for the application service system 107A to transmit a duplicate copy of the on-premises data object associated with the synchronization update message.

Referring back to FIG. 10A, subsequent and/or in response to step/operation 1006, the example method 1000 proceeds to step/operation 1008. At step/operation 1008, a processing circuitry (such as, but not limited to, the processor 305 of the application service server 121A of the application service system 107A described above in connection with at least FIG. 1 and FIG. 3, another processor of another application service server of another application service system in the data object synchronization environment, and/or the processor 206 of the client device 101A described above in connection with at least FIG. 1 and FIG. 2) causes the in-cloud application service system to store the second synchronization request message in an outbound message queue table object.

In some embodiments, the on-premises application service system causes the in-cloud application service system to store the synchronization request message in an outbound message queue table object associated with the in-cloud application service system. In some embodiments, the in-cloud application service system stores the synchronization request message in an outbound message queue table object associated with the in-cloud application service system.

As defined above, the in-cloud application service system may comprise an outbound message queue table object storing one or more messages generated by the in-cloud application service system and ready for transmission, such as, but not limited to, the second synchronization request message generated at step/operation 1006.

In some embodiments, an on-premises application service system may transmit a synchronization check message to the in-cloud application service system that comprises an electronic request to obtain at least one synchronization request message from the in-cloud application service system, similar to those described in connection with at least FIG. 4. In response to receiving the synchronization check message, the in-cloud application service system may transmit the second synchronization request message generated at step/operation 1006, similar to those described in connection with at least FIG. 4. In response to receiving the second synchronization request message, the on-premises application service system may transmit a duplicate of the on-premises data object associated with the synchronization update message to the in-cloud application service system, similar to those described in connection with at least FIG. 4. In response to receiving duplicates of the on-premises data object associated with the synchronization update message, the in-cloud application service system may process the synchronization update message.

Continuing from the example above in connection with FIG. 1 where the application service system 107A may be an on-premises application service system and the application service system 107C may be an in-cloud application service system, the application service system 107C may store the synchronization request message generated at step/operation 1006 in an outbound message queue table object associated with the application service system 107C. Subsequently the application service system 107A may transmit a synchronization check message to the application service system 107C that comprises an electronic request to obtain at least one synchronization request message from the application service system 107C, similar to those described in connection with at least FIG. 4. In response to receiving the synchronization check message, the application service system 107C may transmit the synchronization request message generated at step/operation 1006 to the application service system 107A, similar to those described in connection with at least FIG. 4. In response to receiving the synchronization request message, the application service system 107A may transmit a duplicate of the on-premises data object associated with the synchronization update message to the application service system 107C, similar to those described in connection with at least FIG. 4. In response to receiving duplicates of the on-premises data object associated with the synchronization update message, the application service system 107C may process the synchronization update message.

Referring back to FIG. 10A, subsequent and/or in response to step/operation 1008, the example method 1000 proceeds to step/operation 1010 and ends.

If, at step/operation 1004, the in-cloud data object repository associated with the in-cloud application service system comprises the at least one in-cloud data object that corresponds to the at least one on-premises data object, the example method 1000 proceeds to step/operation 1012.

At step/operation 1012, a processing circuitry (such as, but not limited to, the processor 305 of the application service server 121A of the application service system 107A described above in connection with at least FIG. 1 and FIG. 3, another processor of another application service server of another application service system in the data object synchronization environment, and/or the processor 206 of the client device 101A described above in connection with at least FIG. 1 and FIG. 2) causes the in-cloud application service system to update the at least one in-cloud data object based at least in part on the at least one synchronization update message.

In some embodiments, in response to the in-cloud data object repository associated with the in-cloud application service system is determined to comprise the at least one in-cloud data object that corresponds to the at least one on-premises data object, the on-premises application service system causes the in-cloud application service system to update the at least one in-cloud data object based at least in part on the at least one synchronization update message. In some embodiments, in response to the in-cloud data object repository associated with the in-cloud application service system is determined to comprise the at least one in-cloud data object that corresponds to the at least one on-premises data object, the in-cloud application service system updates the at least one in-cloud data object based at least in part on the at least one synchronization update message.

As described above, the synchronization update message may comprise, represent, and/or is associated with one or more updates or edits of one or more on-premises data objects stored in an on-premises data object repository. After the in-cloud application service system determines that one or more in-cloud data objects stored in the in-cloud data object repository correspond to the one or more on-premises data objects associated with the at least one synchronization update message (for example, based on their corresponding data object identifiers), the in-cloud application service system may apply updates to the one or more in-cloud data objects in accordance with the at least one synchronization update message.

Continuing from the example above in connection with FIG. 1 where the application service system 107A may be an on-premises application service system and the application service system 107C may be an in-cloud application service system, the application service system 107C determines that the data object repository 123C comprises one or more in-cloud data objects that correspond to the one or more on-premises data objects associated with the at least one synchronization update message. The application service system 107C may apply edits and/or changes to these one or more in-cloud data objects in accordance with the at least one synchronization update message.

Referring back to FIG. 10A, subsequent and/or in response to step/operation 1012, the example method 1000 proceeds to block A, which connects FIG. 10A to FIG. 10B. Referring now to FIG. 10B, subsequent and/or in response to step/operation 1012, the example method 1000 proceeds to step/operation 1014. At step/operation 1014, a processing circuitry (such as, but not limited to, the processor 305 of the application service server 121A of the application service system 107A described above in connection with at least FIG. 1 and FIG. 3, another processor of another application service server of another application service system in the data object synchronization environment, and/or the processor 206 of the client device 101A described above in connection with at least FIG. 1 and FIG. 2) causes the in-cloud application service system to determine whether updating the at least one in-cloud data object is successful.

In some embodiments, the on-premises application service system causes the in-cloud application service system to determine whether updating the at least one in-cloud data object is successful. In some embodiments, the in-cloud application service system determines whether updating the at least one in-cloud data object is successful.

For example, the in-cloud application service system may determine whether updating the at least one in-cloud data object is successful based at least in part on whether an update completion message has been generated and/or received by an in-cloud application service server.

In this example, an example in-cloud application service system may comprise one or more in-cloud application service servers, where each in-cloud application service server is configured to perform one or more specific functions. The in-cloud application service system may transmit the synchronization update message to an in-cloud application service server that is configured to handle updating in-cloud data objects, and may determine whether the in-cloud application service server returns an update completion message. If so, the in-cloud application service system determines that updating the at least one in-cloud data object is successful. If not, the in-cloud application service system determines that updating the at least one in-cloud data object is not successful.

While the description above provides an example of determining whether updating the at least one in-cloud data object is successful, it is noted that the scope of the present disclosure is not limited to the description above. In some examples, an example method may determine whether updating the at least one in-cloud data object is successful through other ways.

Continuing from the example above in connection with FIG. 1 where the application service system 107A may be an on-premises application service system and the application service system 107C may be an in-cloud application service system, the application service system 107C may transmit the synchronization update message to the application service server 121C, and may determine whether the application service server 121C returns an update completion message. If so, the application service system 107C determines that updating the at least one in-cloud data object is successful. If not, the application service system 107C determines that updating the at least one in-cloud data object is not successful.

If, at step/operation 1014, the updating is determined to be successful, the example method 1000 proceeds to step/operation 1016. At step/operation 1016, a processing circuitry (such as, but not limited to, the processor 305 of the application service server 121A of the application service system 107A described above in connection with at least FIG. 1 and FIG. 3, another processor of another application service server of another application service system in the data object synchronization environment, and/or the processor 206 of the client device 101A described above in connection with at least FIG. 1 and FIG. 2) causes the in-cloud application service system to update the message processing status indicator to indicate a synchronization completion success message.

In some embodiments, in response to the updating being determined to be successful, the on-premises application service system causes the in-cloud application service system to update the message processing status indicator to indicate a synchronization completion success message. In some embodiments, in response to the updating being determined to be successful, the in-cloud application service system updates the message processing status indicator to indicate a success status.

For example, the in-cloud application service system may retrieve the message processing status indicator that corresponds to the synchronization update message from the message status table object, and update the message processing status indicator to indicate the synchronization update message has been successfully processed.

Continuing from the example above in connection with FIG. 1 where the application service system 107A may be an on-premises application service system and the application service system 107C may be an in-cloud application service system, the application service system 107C determines that the updating the at least one in-cloud data object at step/operation 1014 is successfully, and may update the message processing status indicator to indicate the synchronization update message has been successfully processed.

Referring back to FIG. 10B, subsequent and/or in response to step/operation 1016, the example method 1000 proceeds to step/operation 1018. At step/operation 1018, a processing circuitry (such as, but not limited to, the processor 305 of the application service server 121A of the application service system 107A described above in connection with at least FIG. 1 and FIG. 3, another processor of another application service server of another application service system in the data object synchronization environment, and/or the processor 206 of the client device 101A described above in connection with at least FIG. 1 and FIG. 2) causes the in-cloud application service system to transmit a synchronization completion success message to the on-premises application service system.

In some embodiments, the on-premises application service system causes the in-cloud application service system to transmit the synchronization completion success message to the on-premises application service system. In some embodiments, the in-cloud application service system transmits the synchronization completion success message to the on-premises application service system.

Continuing from the example above in connection with FIG. 1 where the application service system 107A may be an on-premises application service system and the application service system 107C may be an in-cloud application service system, the application service system 107C transmits a synchronization completion success message to the application service system 107A.

Referring back to FIG. 10B, subsequent and/or in response to step/operation 1018, the example method 1000 proceeds to step/operation 1024 and ends.

If, at step/operation 1014, the updating is determined to be not successful, the example method 1000 proceeds to step/operation 1020. At step/operation 1020, a processing circuitry (such as, but not limited to, the processor 305 of the application service server 121A of the application service system 107A described above in connection with at least FIG. 1 and FIG. 3, another processor of another application service server of another application service system in the data object synchronization environment, and/or the processor 206 of the client device 101A described above in connection with at least FIG. 1 and FIG. 2) causes the in-cloud application service system to update the message processing status indicator to indicate a failure status.

In some embodiments, in response to the updating being determined to be not successful, the on-premises application service system causes the in-cloud application service system to update the message processing status indicator to indicate a synchronization completion failure message. In some embodiments, in response to the updating being determined to be not successful, the in-cloud application service system updates the message processing status indicator to indicate a synchronization completion failure message.

For example, the in-cloud application service system may retrieve the message processing status indicator that corresponds to the synchronization update message from the message status table object, and update the message processing status indicator to indicate that processing the synchronization update message has failed.

Continuing from the example above in connection with FIG. 1 where the application service system 107A may be an on-premises application service system and the application service system 107C may be an in-cloud application service system, the application service system 107C determines that the updating the at least one in-cloud data object at step/operation 1014 is not successfully, and may update the message processing status indicator to indicate that processing the synchronization update message has failed.

Referring now to FIG. 10B, subsequent and/or in response to step/operation 1020, the example method 1000 proceeds to step/operation 1022. At step/operation 1022, a processing circuitry (such as, but not limited to, the processor 305 of the application service server 121A of the application service system 107A described above in connection with at least FIG. 1 and FIG. 3, another processor of another application service server of another application service system in the data object synchronization environment, and/or the processor 206 of the client device 101A described above in connection with at least FIG. 1 and FIG. 2) causes the in-cloud application service system to transmit a synchronization completion failure message to the on-premises application service system.

In some embodiments, the on-premises application service system causes the in-cloud application service system to transmit the synchronization completion failure message to the on-premises application service system. In some embodiments, the in-cloud application service system transmits the synchronization completion failure message to the on-premises application service system.

Continuing from the example above in connection with FIG. 1 where the application service system 107A may be an on-premises application service system and the application service system 107C may be an in-cloud application service system, the application service system 107C transmits a synchronization completion failure message to the application service system 107A Referring now to FIG. 10B, subsequent and/or in response to step/operation 1022, the example method 1000 proceeds to step/operation 1024 and ends.

FIG. 11 illustrates an example message status diagram 1100 illustrating example processing statuses associated with example messages in accordance with some embodiments of the present disclosure.

In the example shown in FIG. 11, when a synchronization update message is retrieved from an inbound message queue table object at step/operation 1101, the processing message processing status indicator corresponding to the synchronization update message is changed to "processing" at step/operation 1103.

In some examples, if the synchronization update message is successfully processed at step/operation 1105, the processing message processing status indicator indicates a "complete-success" status at step/operation 1107. In some examples, if the synchronization update message is not successfully processed at step/operation 1109, the processing message processing status indicator indicates a "complete-fail" status at step/operation 1111.

In some embodiments, if the synchronization update message is associated with an on-premises data object that does not have a corresponding in-cloud data object at step/operation 1113, the processing message processing status indicator indicates a "blocked" status at step/operation 1115. In such an example, updating to the in-cloud data object repository is blocked, and the in-cloud application service system generates an synchronized request message to request synchronizing the on-premises data object to the in-cloud data object repository at step/operation 1117.

In some embodiments, once the synchronized request message is stored in the outbound message queue table object at step/operation 1119, the processing message processing status indicator of the synchronized request message indicates a "ready" status at step/operation 1121. In response to receiving a synchronization check message from an on-premises application service system, the in-cloud application service system transmit the synchronized request message to the on-premises application service system.

Synchronizing Updates from an In-Cloud Application Service System to an on Premises Application Service System Referring now to FIG. 12, an example method 1200 in accordance with some embodiments of the present disclosure is illustrated. In particular, the example method 1200 illustrates example steps/operations of synchronizing data between an on-premises application service system and an in-cloud application service system in response to receiving in-cloud data object update metadata associated with at least one in-cloud data object.

In the example shown in FIG. 12, the example method 1200 starts at block 1202 and then proceeds to step/operation 1204. At step/operation 1204, a processing circuitry (such as, but not limited to, the processor 305 of the application service server 121A of the application service system 107A described above in connection with at least FIG. 1 and FIG. 3, another processor of another application service server of another application service system in the data object synchronization environment, and/or the processor 206 of the client device 101A described above in connection with at least FIG. 1 and FIG. 2) causes the in-cloud application service system to receive in-cloud data object update metadata associated with at least one in-cloud data object stored in the in-cloud data object repository.

In some embodiments, the on-premises application service system causes the in-cloud application service system to receive in-cloud data object update metadata associated with at least one in-cloud data object stored in the in-cloud data object repository. In some embodiments, the in-cloud application service system receives in-cloud data object update metadata associated with at least one in-cloud data object stored in the in-cloud data object repository.

For example, the in-cloud application service system receives in-cloud data object update metadata from a client device, and the in-cloud data object update metadata is associated with the at least one in-cloud data object stored in the in-cloud data object repository of the in-cloud application service system.

As defined above, the in-cloud data object update metadata indicates one or more edits, updates, and/or changes associated with an in-cloud data object stored in the in-cloud data object repository. In some embodiments, in-cloud data object update metadata may be generated by a client device based at least in part on user inputs that are provided to the client device and by a user. In some embodiments, the in-cloud application service system may update one or more in-cloud data objects based at least in part on the on-premises data object update metadata.

As an example, referring to FIG. 1, the application service system 107A may be an on-premises application service system, and the application service system 107C may be an in-cloud application service system. In this example, a user operating the client device 101A may provide user inputs that comprise edits, changes, and/or updates to one or more on-premises data objects stored in the data object repository 123C (e.g. in-cloud data object repository). The client device 101A may generate in-cloud data object update metadata based on the user inputs, and may transmit the in-cloud data object update metadata to the application service system 107C (e.g. in-cloud application service system). In some embodiments, the application service system 107C receives the in-cloud data object update metadata, and may update the in-cloud data objects stored in the data object repository 123C based at least in part on the on-premises data object update metadata.

Referring back to FIG. 12, subsequent and/or in response to step/operation 1204, the example method 1200 proceeds to step/operation 1206. At step/operation 1206, a processing circuitry (such as, but not limited to, the processor 305 of the application service server 121A of the application service system 107A described above in connection with at least FIG. 1 and FIG. 3, another processor of another application service server of another application service system in the data object synchronization environment, and/or the processor 206 of the client device 101A described above in connection with at least FIG. 1 and FIG. 2) causes the in-cloud application service system to generate, based at least in part on the in-cloud data object update metadata, a synchronization request message.

In some embodiments, the on-premises application service system causes the in-cloud application service system to generate a synchronization request message based at least in part on the in-cloud data object update metadata. In some embodiments, the in-cloud application service system generates a synchronization request message based at least in part on the in-cloud data object update metadata.

For example, the in-cloud application service system generates at least one synchronization request message that is in the form of an electronic message and/or electronic notification and represents or indicates one or more updates or edits of one or more in-cloud data objects stored in the in-cloud data object repository based at least in part on the in-cloud data object update metadata received at step/operation 703.

In some embodiments, the at least one in-cloud data object associated with in-cloud data object update metadata corresponds to the at least one on-premises data object stored in the on-premises data object repository. In some embodiments, the at least one synchronization request message may comprise at least one synchronization topic indicator that indicates what on-premises data objects stored in the on-premises data object repository should be synchronized based on the in-cloud data object update metadata received at step/operation 1204.

Continuing from the example above in connection with FIG. 1 where the application service system 107A may be an on-premises application service system and the application service system 107C may be an in-cloud application service system, subsequent to the application service system 107C receiving the in-cloud data object update metadata, the application service system 107C generate a synchronization request message based at least in part on the in-cloud data object update metadata.

Referring back to FIG. 12, subsequent and/or in response to step/operation 1206, the example method 1200 proceeds to step/operation 1208. At step/operation 1208, a processing circuitry (such as, but not limited to, the processor 305 of the application service server 121A of the application service system 107A described above in connection with at least FIG. 1 and FIG. 3, another processor of another application service server of another application service system in the data object synchronization environment, and/or the processor 206 of the client device 101A described above in connection with at least FIG. 1 and FIG. 2) caused the in-cloud application service system to add the synchronization request message to the outbound message queue table object of the in-cloud application service system.

In some embodiments, the on-premises application service system causes the in-cloud application service system to add the synchronization request message to the outbound message queue table object of the in-cloud application service system. In some embodiments, the in-cloud application service system adds the synchronization request message to the outbound message queue table object of the in-cloud application service system.

As defined above, the in-cloud application service system may comprise an outbound message queue table object storing one or more messages generated by the in-cloud application service system and ready for transmission, such as, but not limited to, the synchronization request message generated at step/operation 1206.

In some embodiments, an on-premises application service system may transmit a synchronization check message to the in-cloud application service system that comprises an electronic request to obtain at least one synchronization request message from the in-cloud application service system, similar to those described in connection with at least FIG. 4. In response to receiving the synchronization check message, the in-cloud application service system may transmit the synchronization request message generated at step/operation 1206, similar to those described in connection with at least FIG. 4. In response to receiving the synchronization request message, the on-premises application service system may update the at least one on-premises data object that corresponds to the at least one in-cloud data object associated with the in-cloud data object update metadata.

Continuing from the example above in connection with FIG. 1 where the application service system 107A may be an on-premises application service system and the application service system 107C may be an in-cloud application service system, the application service system 107C may store the synchronization request message generated at step/operation 1206 in an outbound message queue table object associated with the application service system 107C. Subsequently the application service system 107A may transmit a synchronization check message to the application service system 107C that comprises an electronic request to obtain at least one synchronization request message from the application service system 107C, similar to those described in connection with at least FIG. 4. In response to receiving the synchronization check message, the application service system 107C may transmit the synchronization request message generated at step/operation 1206, similar to those described in connection with at least FIG. 4. In response to receiving the synchronization request message, the application service system 107A may update the at least one on-premises data object that corresponds to the at least one in-cloud data object associated with the in-cloud data object update metadata.

Referring back to FIG. 12, subsequent and/or in response to step/operation 1208, the example method 1200 proceeds to step/operation 1210 and ends.

FIG. 13A and FIG. 13B are example signal diagrams illustrating example data communications associated with synchronizing data between an on-premises application service system and an in-cloud application service system in response to receiving in-cloud data object update metadata in accordance with some embodiments of the present disclosure.

Referring now to FIG. 13A, the in-cloud user 1301 provides in-cloud data object update metadata 1311. Based on the in-cloud data object update metadata 1311, one or more synchronization request messages are generated and stored at the outbound message queue table object 1305.

In some embodiments, the on-premises synchronization component 1309 transmits a synchronization check message 1313 to the API Component 1307. In response to the synchronization check message 1313, the API Component 1307 transmits retrieval request messages 1315 to the outbound message queue table object 1305. The outbound message queue table object 1305 provides one or more synchronization request messages 1317 to the API component 1307 in return.

In some embodiments, subsequent to transmitting the synchronization request messages 1317, the API Component 1307 transmits one or more status request messages 1319 to the message status table object 1303, and the message status table object 1303 returns one or more message processing status indicators 1321 in return. In some embodiments, the message processing status indicator 1321 indicates status such as, but not limited to, "ready," "retry," "complete-fail" or "complete-success," similar to those described herein. In some embodiments, the API Component 1307 transmits status update messages 1323 to the message status table object 1303, which may set the message processing status indicators 1321 as "in-flight" or "retry," details of which are described herein. In some embodiments, the API Component 1307 may transmit one or more synchronization request messages 1325 to the on-premises synchronization component 1309.

Referring now to FIG. 13B, in some embodiments, the on-premises synchronization component 1309 transmits one or more status update messages 1327 to the API component 1307, indicating the statuses of processing of the one or more synchronization request messages (e.g. success, failure, etc.). In some embodiments, the API Component 1307 transmits one or more update messages to the message status table object 1303 to update the one or more message processing status indicators corresponding to the one or more synchronization request messages. In some embodiments, the message status table object 1303 transmits one or more acknowledgment messages 1331 to the API Component 1307, which in turn transmits one or more acknowledgment messages 1333 to the on-premises synchronization component 1309.

Referring now to FIG. 14A and FIG. 14B, an example method 1400 in accordance with some embodiments of the present disclosure is illustrated. In particular, the example method 1400 illustrates example steps/operations of managing synchronization statuses of an on-premises application service system and an in-cloud application service system in response to receiving in-cloud data object update metadata associated with at least one in-cloud data object.

In the example shown in FIG. 14A, the example method 1400 starts at block 1402 and then proceeds to step/operation 1404. At step/operation 1404, a processing circuitry (such as, but not limited to, the processor 305 of the application service server 121A of the application service system 107A described above in connection with at least FIG. 1 and FIG. 3, another processor of another application service server of another application service system in the data object synchronization environment, and/or the processor 206 of the client device 101A described above in connection with at least FIG. 1 and FIG. 2) causes the in-cloud application service system to add a message processing status indicator to the message status table object.

For example, the in-cloud application service system may generate a synchronization request message in response to receiving in-cloud data object update metadata and add the synchronization request message to an outbound message queue table object of the in-cloud application service system in accordance with at least FIG. 12 described above. In some embodiments, the on-premises application service system causes the in-cloud application service system to add a message processing status indicator corresponding to the synchronization request message to the message status table object. In some embodiments, the in-cloud application service system adds a message processing status indicator corresponding to the synchronization request message to the message status table object.

As described above, the in-cloud application service system may comprise a message status table object that records, stores, and/or indicates the status of messages that are generated by the in-cloud application service system, including, but not limited to, the at least one synchronization request message that has been generated by the in-cloud application service system and/or added to an outbound message queue table object in response to receiving in-cloud data object update metadata based on, for example but not limited to, at least FIG. 12.

In some embodiments, the in-cloud application service system may generate a message processing status indicator for each synchronization request message generated by the in-cloud application service system and indicates its corresponding status, and may store the message processing status indicators in the message status table object. In some embodiments, when a new message (such as a new synchronization request message) is generated by the in-cloud application service system and/or added to the outbound message queue table object, the in-cloud application service system may add a new message processing status indicator corresponding to the new message to the message status table object.

In some embodiments, the message processing status indicator may indicate a current status (e.g. received, in-flight, success, failure, etc. as defined herein). Additionally, or alternatively, the message processing status indicator may indicate a time code or a timestamp of when the corresponding message (e.g. the synchronization request message) is generated by the in-cloud application service system and/or added to the outbound message queue table object.

Continuing from the example above in connection with FIG. 1 where the application service system 107A may be an on-premises application service system and the application service system 107C may be an in-cloud application service system, the application service system 107C may add at least one message processing status indicator to the message status table object of the application service system 107C subsequent to generating the at least one synchronization request message and/or storing the at least one synchronization request message in an outbound message queue table object. In some embodiments, the at least one synchronization request message may be generated by the application service system 107C based at least in part on the example method 1200 described above in connection with at least FIG. 12). In some embodiments, the at least one message processing status indicator may indicate that the corresponding at least one synchronization request message has been generated by the application service system 107C.

Referring back to FIG. 14A, subsequent and/or in response to step/operation 1404, the example method 1400 proceeds to step/operation 1406. At step/operation 1406, a processing circuitry (such as, but not limited to, the processor 305 of the application service server 121A of the application service system 107A described above in connection with at least FIG. 1 and FIG. 3, another processor of another application service server of another application service system in the data object synchronization environment, and/or the processor 206 of the client device 101A described above in connection with at least FIG. 1 and FIG. 2) transmits a synchronization check message to the in-cloud application service system.

In some embodiments, the on-premises application service system transmits the synchronization check message to the in-cloud application service system similar to those described above in connection with at least step/operation 404 of FIG. 4.

Continuing from the example above in connection with FIG. 1 where the application service system 107A may be an on-premises application service system and the application service system 107C may be an in-cloud application service system, the application service system 107A transmits a synchronization check message to the application service system 107C.

Referring back to FIG. 14A, subsequent and/or in response to step/operation 1406, the example method 1400 proceeds to step/operation 1408. At step/operation 1408, a processing circuitry (such as, but not limited to, the processor 305 of the application service server 121A of the application service system 107A described above in connection with at least FIG. 1 and FIG. 3, another processor of another application service server of another application service system in the data object synchronization environment, and/or the processor 206 of the client device 101A described above in connection with at least FIG. 1 and FIG. 2) receives the synchronization request message in response to the second synchronization check message.

In some embodiments, the in-cloud application service system transmits the second synchronization request message to the on-premises application service system in response to receiving the second synchronization check message, and the on-premises application service system receives the second synchronization request message similar to those described above in connection with at least step/operation 406 of FIG. 4. In particular, the on-premises application service system receives the second synchronization request message that is generated by the in-cloud data object in response to receiving in-cloud data object update metadata (for example, based at least in part on the example method 1200 described above in connection with at least FIG. 12).

Continuing from the example above in connection with FIG. 1 where the application service system 107A may be an on-premises application service system and the application service system 107C may be an in-cloud application service system, the application service system 107A receives a synchronization request message from the application service system 107C. As described above, the synchronization request message is generated by the application service system 107C based on receiving in-cloud data object update metadata.

Referring back to FIG. 14A, subsequent and/or in response to step/operation 1410, the example method 1400 proceeds to step/operation 1412. At step/operation 1412, a processing circuitry (such as, but not limited to, the processor 305 of the application service server 121A of the application service system 107A described above in connection with at least FIG. 1 and FIG. 3, another processor of another application service server of another application service system in the data object synchronization environment, and/or the processor 206 of the client device 101A described above in connection with at least FIG. 1 and FIG. 2) updates the at least one on-premises data object based at least in part on the synchronization request message.

For example, as described above in connection with at least FIG. 12, the synchronization request message may comprise at least one synchronization topic indicator that indicates what on-premises data objects stored in the on-premises data object repository should be synchronized based on the in-cloud data object update metadata received by the in-cloud application service system. Accordingly, the on-premises application service system updates the corresponding at least one on-premises data object stored in the on-premises data object repository based at least in part on the second synchronization request message.

Continuing from the example above in connection with FIG. 1 where the application service system 107A may be an on-premises application service system and the application service system 107C may be an in-cloud application service system, the application service system 107A updates the at least one on-premises data object based on the synchronization request message received from the application service system 107C.

Referring back to FIG. 14A, subsequent and/or in response to step/operation 1410, the example method 1400 proceeds to block A, which connects FIG. 14A to FIG. 14B.

Referring back to FIG. 14A, subsequent and/or in response to step/operation 1408, the example method 1400 proceeds to step/operation 1412. At step/operation 1412, a processing circuitry (such as, but not limited to, the processor 305 of the application service server 121A of the application service system 107A described above in connection with at least FIG. 1 and FIG. 3, another processor of another application service server of another application service system in the data object synchronization environment, and/or the processor 206 of the client device 101A described above in connection with at least FIG. 1 and FIG. 2) causes the in-cloud application service system to update the message processing status indicator to indicate a processing status of the synchronization request message.

In some embodiments, subsequent to receiving the synchronization request message, the on-premises application service system causes the in-cloud application service system to update the message processing status indicator to indicate a processing status of the synchronization request message. In some embodiments, subsequent to the on-premises application service system receiving the synchronization request message, the in-cloud application service system updates the message processing status indicator to indicate a processing status of the synchronization request message.

For example, subsequent to transmitting the second synchronization request message to the on-premises application service system, the in-cloud application service system updates the message processing status indicator that corresponds to the synchronization request message and was added to the message status table object at step/operation 1404. The in-cloud application service system may update the message processing status indicator to indicate an "in-flight" status, which indicates that the synchronization request message has been transmitted to the on-premises application service system.

Continuing from the example above in connection with FIG. 1 where the application service system 107A may be an on-premises application service system and the application service system 107C may be an in-cloud application service system, the application service system 107C updates the message processing status indicator to indicate an "in-flight" status.

Referring back to FIG. 14A, subsequent and/or in response to step/operation 1412, the example method 1400 proceeds to block A, which connects FIG. 14A to FIG. 14B.

Referring now to FIG. 14B, subsequent and/or in response to step/operation 1412, the example method 1400 proceeds to step/operation 1414. At step/operation 1414, a processing circuitry (such as, but not limited to, the processor 305 of the application service server 121A of the application service system 107A described above in connection with at least FIG. 1 and FIG. 3, another processor of another application service server of another application service system in the data object synchronization environment, and/or the processor 206 of the client device 101A described above in connection with at least FIG. 1 and FIG. 2) causes the in-cloud application service system to determine whether a synchronization completion success message is received within a message acknowledgment time interval.

In some embodiments, the on-premises application service system causes the in-cloud application service system to determine whether a synchronization completion success message is received within a message acknowledgment time interval. In some embodiments, the in-cloud application service system determines whether a synchronization completion success message is received from the on-premises application service system within a message acknowledgment time interval.

As defined above, a synchronization completion success message refers to an electronic message and/or an electronic notification that indicates a synchronization of one or more data objects is successful. In some embodiments, if the on-premises application service system successfully updates the at least one on-premises data object based on the second synchronization request message, the on-premises application service system generates a synchronization completion success message and transmits the synchronization completion success message to the in-cloud application service system.

As defined above, the message acknowledgment time interval is a predetermined threshold time period between a first time point when the in-cloud application service system transmits a synchronization request message to an on-premises application service system and a second time point when the in-cloud application service system receives a synchronization completion success message from the on-premises application service system. For example, the in-cloud application service system may set a message acknowledgment time interval based at least in part on synchronization requirements associated with the in-cloud application service system and/or the on-premises application service system.

In some embodiments, the message acknowledgment time interval may increase over time. For example, the initial retries may happen at the time for next queue processing, and additional failures can increase the time to retry. As an example, in response to an increase in the number of retries, the system may increase the message acknowledgment time interval.

Continuing from the example above in connection with FIG. 1 where the application service system 107A may be an on-premises application service system and the application service system 107C may be an in-cloud application service system, the message acknowledgment time interval may be 60 seconds. In this example, the application service system 107C determines whether it receives a synchronization completion success message from the application service system 107A within 60 seconds after the application service system 107C transmits the synchronization request message to the application service system 107A.

If, at step/operation 1414, the synchronization completion success message is received within the message acknowledgment time interval, the example method 1400 proceeds to step/operation 1416. At step/operation 1416, a processing circuitry (such as, but not limited to, the processor 305 of the application service server 121A of the application service system 107A described above in connection with at least FIG. 1 and FIG. 3, another processor of another application service server of another application service system in the data object synchronization environment, and/or the processor 206 of the client device 101A described above in connection with at least FIG. 1 and FIG. 2) causes the in-cloud application service system to update the message processing status indicator to indicate a success status.

In some embodiments, in response to the synchronization completion success message is determined to be received within the message acknowledgment time interval, the on-premises application service system causes the in-cloud application service system to update the message processing status indicator to indicate a success status. In some embodiments, in response to the synchronization completion success message is determined to be received within the message acknowledgment time interval, the in-cloud application service system updates the message processing status indicator to indicate a success status.

Continuing from the example above in connection with FIG. 1 where the application service system 107A may be an on-premises application service system and the application service system 107C may be an in-cloud application service system, the application service system 107C receives a synchronization completion success message from the application service system 107C within 60 seconds after transmitting the synchronization request message to the application service system 107A. In this example, the application service system 107C updates the message processing status indicator corresponding to the synchronization request message to indicate a success status.

Referring back to FIG. 14B, subsequent and/or in response to step/operation 1416, the example method 1000 proceeds to step/operation 1424 and ends, If, at step/operation 1414, the synchronization completion success message is not received within the message acknowledgment time interval, the example method 1400 proceeds to step/operation 1420.

At step/operation 1420, a processing circuitry (such as, but not limited to, the processor 305 of the application service server 121A of the application service system 107A described above in connection with at least FIG. 1 and FIG. 3, another processor of another application service server of another application service system in the data object synchronization environment, and/or the processor 206 of the client device 101A described above in connection with at least FIG. 1 and FIG. 2) causes the in-cloud application service system to determine whether a retry counter associated with the second synchronization request message satisfies a synchronization retry threshold.

In some embodiments, in response to the synchronization completion success message is determined not to be received within the message acknowledgment time interval, the on-premises application service system causes the in-cloud application service system to determine whether a retry counter associated with the second synchronization request message satisfies a synchronization retry threshold. In some embodiments, in response to the synchronization completion success message is determined not to be received within the message acknowledgment time interval, the in-cloud application service system determines whether a retry counter associated with the second synchronization request message satisfies a synchronization retry threshold.

In some embodiments, the retry counter is a numeric counter that indicates a number of times that the in-cloud application service system has retried transmitting the synchronization request message to the on-premises application service system. In some embodiments, the retry counter does not include the initial transmission of the synchronization request message to the on-premises application service system described above in connection with step/operation 1408.

In some embodiments, the synchronization retry threshold is a predetermined threshold number of retries before the in-cloud application service system determines that the on-premises application service system has failed to update the on-premises data objects in response to the synchronization request message that has been transmitted to the on-premises application service system at step/operation 1408.

Continuing from the example above in connection with FIG. 1 where the application service system 107A may be an on-premises application service system and the application service system 107C may be an in-cloud application service system, the synchronization retry threshold may be 3, which indicates a maximum number of three reties that is will be carried out by the application service system 107C before the application service system 107C determines that the application service system 107A failed to update one or more on-premises data object in response to the synchronization request message received at step/operation 1408.

If, at step/operation 1420, the retry counter is determined to satisfy the synchronization retry threshold, the example method 1400 proceeds to step/operation 1422. At step/operation 1422, a processing circuitry (such as, but not limited to, the processor 305 of the application service server 121A of the application service system 107A described above in connection with at least FIG. 1 and FIG. 3, another processor of another application service server of another application service system in the data object synchronization environment, and/or the processor 206 of the client device 101A described above in connection with at least FIG. 1 and FIG. 2) causes the in-cloud application service system to update the message processing status indicator to a failure status.

In some embodiments, in response to the retry counter being determined to satisfy the synchronization retry threshold, the on-premises application service system causes the in-cloud application service system to update the message processing status indicator to indicate a failure status. In some embodiments, in response to the retry counter being determined to satisfy the synchronization retry threshold, the in-cloud application service system updates the message processing status indicator to indicate a failure status.

For example, if the retry counter indicates that a number of retry is not less than the threshold number indicated by the synchronization retry threshold, the in-cloud application service system determines that the on-premises application service system failed to update one or more on-premises data object in response to the second synchronization request message received at step/operation 1408.

Continuing from the example above in connection with FIG. 1 where the application service system 107A may be an on-premises application service system and the application service system 107C may be an in-cloud application service system, the retry counter may be 3 and the synchronization retry threshold may be 3. In this example, the application service system 107C has retried transmitting the synchronization request message to the application service system 107A three times, reaching the maximum number of retry allowed. As the application service system 107C determines that a synchronization completed success message has not been received at step/operation 1414, the in-cloud application service system determines that the on-premises application service system has failed to update the one or more on-premises data objects based on the second synchronization request message.

Referring back to FIG. 14B, subsequent and/or in response to step/operation 1422, the example method 1000 proceeds to step/operation 1424 and ends.

If, at step/operation 1420, the retry counter is determined not to satisfy the synchronization retry threshold, the example method 1400 proceeds to step/operation 1418. At step/operation 1418, a processing circuitry (such as, but not limited to, the processor 305 of the application service server 121A of the application service system 107A described above in connection with at least FIG. 1 and FIG. 3, another processor of another application service server of another application service system in the data object synchronization environment, and/or the processor 206 of the client device 101A described above in connection with at least FIG. 1 and FIG. 2) cause the in-cloud application service system to retry transmitting the synchronization request message to the on-premises application service system.

In some embodiments, in response to the retry counter is determined not to satisfy the synchronization retry threshold, the on-premises application service system cause the in-cloud application service system to retry transmitting the synchronization request message to the on-premises application service system. In some embodiments, in response to the retry counter being determined not to satisfy the synchronization retry threshold, the in-cloud application service system retries transmitting the synchronization request message to the on-premises application service system.

For example, if the retry counter indicates that a number of retry is less than the threshold number indicated by the synchronization retry threshold, the in-cloud application service system retries transmitting the synchronization request message to the on-premises application service system.

Continuing from the example above in connection with FIG. 1 where the application service system 107A may be an on-premises application service system and the application service system 107C may be an in-cloud application service system, the retry counter may be 1 and the synchronization retry threshold may be 3. In this example, the application service system 107C has retried transmitting the synchronization request message to the application service system 107A once and has not reached the maximum number of retry allowed. In this example, the application service system 107C retries transmitting the synchronization request message to the application service system 107A.

Referring back to FIG. 14B, subsequent and/or in response to step/operation 1422, the example method 1000 returns to step/operation 1414, where the in-cloud application service system determines whether a synchronization completion success message is received within a message acknowledgment time interval subsequent to retry transmitting the transmitting the second synchronization request message to the on-premises application service system, similar to various examples described above.

FIG. 15 illustrates an example message status diagram 1500 illustrating example processing statuses associated with example messages in accordance with some embodiments of the present disclosure.

In the example shown in FIG. 15, a synchronization request message is generated at step/operation 1501 based on in-cloud data object update metadata, and the message processing status indicator 1503 indicates that the status of the synchronization request message is "Ready."

Subsequent to transmitting the synchronization request message to the on-premises application service system at 1505, the message processing status indicator is updated to indicate "in-flight" at step/operation 1507.

In some embodiments, if a synchronization completion success message is received within the message acknowledgment time interval at step/operation 1509, the message processing status indicator is updated to indicate "complete-success" at step/operation 1511.

In some embodiments, if a synchronization completion failure message is received at step/operation 1513, the message processing status indicator is updated to indicate "complete-fail" at step/operation 1515.

In some embodiments, if no synchronization completion success message is received within the message acknowledgment time interval at step/operation 1517, the message processing status indicator is updated to indicate "retry" at step/operation 1519 and the retry counter is incremented. Subsequently, the synchronization request message is retransmitted to the on-premises application service system at step/operation 1521 if the retry counter does not satisfy the synchronization retry threshold.

In some embodiments, if the retry counter satisfies the synchronization retry threshold at step/operation 1523, the processing status indicator is updated to indicate "failed" at step/operation 1525.

FIG. 16A and FIG. 16B are example signal diagrams illustrating example data communications associated with synchronizing data between an on-premises application service system and an in-cloud application service system in accordance with some embodiments of the present disclosure.

Referring now to FIG. 16A, an on-premises user 1604 may add a board configuration 1616 to the on-premises data object repository via the on-premises synchronization component user interface 1606. Subsequently, the on-premises synchronization component user interface 1606 provides an update message 1618 to the API Component 1608.

In some embodiments, the API Component 1608 provides a request message 1620 to the application service component 1610, indicating an update to the configuration with the new mapping for the board data object. In some embodiments, the application service component 1610 generates a synchronization update message 1622 indicating the generation of the new board data object, and stores the synchronization update message 1622 to the message queue table object 1612.

In some embodiments, the message queue table object 1612 transmits the synchronization update message 1624 to the application service component 1610, which in turn transmits the synchronization update message 1626 to the API component 1608, which in turn transmits the synchronization update message 1628 to the on-premises synchronization component user interface 1606, which in turn transmits the synchronization update message 1630 to the on-premises synchronization component application interface 1602.

Referring now to FIG. 16B, in some embodiments, in response to receiving the synchronization update message 1630, the on-premises synchronization component application interface 1602 transmits an invoking message 1632 to the event filtering service 1614. In response, the event filtering service 1614 provides an acknowledgment message 1634 to the API Component 1608, which in turn provides an acknowledgment message 1636 to the message queue table object 1612. The status of the synchronization request message is updated to indicate a "complete" status.

In some embodiments, the message queue table object 1612 provides a status update confirmation message 1638 to the API component 1608, which in turn provides a status update confirmation message 1640 to the event filtering service 1614.

In the example illustrated in FIG. 16A and FIG. 16B, the board configuration 1616 may be a type of data object that describes configuration associated with a board data object. In some examples, the board configuration and/or the corresponding board data object is only present or recognized in the in-cloud environment and not in the on-premises environment. The event of adding a board configuration 1616 may happen in an on-premises synchronization component (such as, but not limited to, the on-premises synchronization component 614 from FIG. 6A) in the on-premises application service system.

The on-premises application service system may need to inform the addition, changes, and/or deletion of the board configuration 1616 to the in-cloud application service system. This change has to be communicated to the in-cloud application service system, so that it kicks off the chain of events as described. Through this chain of event, the on-premises user 1604 is configuring the on-premises synchronization component (such as, but not limited to, the on-premises synchronization component 614 from FIG. 6A), not using the on-premises application service system per se.

In some embodiments, the in-cloud application service system needs to know information about board data objects that are configured to be synchronized from the on-premises application service system in order to process information from certain messages. In some embodiments, the on-premises synchronization component (such as, but not limited to, on-premises synchronization component 614 from FIG. 6A) also needs to know which board data objects are configured to be synchronized so it can filter out messages that do not need to be transmitted to the in-cloud application service system. In some embodiments, the on-premises user 1604 configures a board data object to be synchronized with the in-cloud application service system, and any updates of issue data objects, board data objects, project data objects, and/or the like that occur with no relation to the configured board objects should not be sent to the in-cloud application service system.

FIG. 17 is an example signal diagram illustrating example data communications associated with synchronizing data where an on-premises application service system has multiple nodes (e.g. multiple on-premises application service servers) that use the same database (e.g. the same on-premise data object repository). In particular, the example shown in FIG. 17 illustrates providing a single source of truth for an on-premises application service system when it comes to configuration data associated with data objects (such as board data object configurations).

In the example shown in FIG. 17, the on-premises application service system may include computer program modules (such as, but not limited to, a configuration change job scheduler 1707 and a configuration mapping service 1705) that are installed on computing devices (such as, but not limited to, on-premises application service servers described herein). The on-premises application service system may also include data storage devices such as, but not limited to, database 1701 (e.g. an on-premise data object repository), a configuration mapping store 1703 (e.g. for caching mappings of configuration data to data objects), and a configuration singleton 1709 (e.g. for providing a single source of truth for configuration data).

In the example shown in FIG. 17, the configuration change job scheduler 1707 transmits a configuration query message 1711 to the configuration mapping service 1705. In some embodiments, the configuration query message 1711 requests identifying changes of configurations associated with a board data object.

The configuration mapping service 1705 in turn transmits a mapping request 1713 to the configuration mapping store 1703 in order to get mappings of the configuration data from the database 1701, and the configuration mapping store 1703 transmits a mapping request 1715 to the database 1701 in order to get mappings of the configuration from the database 1701. In some embodiments, the configuration mapping store 1703 receives and/or caches mappings 1717 from the database 1701, and the configuration mapping store 1703 transmits the mapping 1719 to the configuration mapping service 1705.

Subsequently, the configuration mapping service 1705 transmits a configuration update message 1721 to the configuration singleton 1709. As described above, the configuration singleton 1709 provides a single source of truth for data object configurations. As such, the example illustrated in FIG. 17 provides an example of updating the single source of truth.

As described above, an on-premises application service system may have multiple nodes (e.g. multiple on-premises application service servers) for storing/processing data objects that use the same database (e.g. database 1701), such as:

myjira.com Jira1 Database1
myjira.com Jira2 Database1

In some examples, the purpose of multiple nodes/on-premises application service servers is to provide increased performance by having more on-premises application service processes capable of processing user requests and interactions. In some examples, data in these nodes/on-premises application service servers is individually cached to avoid overloading the database (while on-premises application service servers may still interact with the same database). In the above example, solving technical problems where discrepancies form between different nodes/on-premises application service servers (e.g. Jira1 and Jira2) becomes important to make sure users accessing myjira.com have a consistent experience.

The example shown in FIG. 17 describes the process to keep data (such as configured board data objects) synchronized across the different nodes/on-premises application service servers. For example, these configurations must be kept as in synchronization as reasonably possible because they are used to decide when the on-premises synchronization component (such as, but not limited to, the on-premises synchronization component 614 from FIG. 6A) should send an event (e.g. messages and/or data objects for synchronization) to the in-cloud application service system or when such an event should be filtered out (such as those described above in connection with at least FIG. 16A and FIG. 16B).

The example shown in FIG. 17 illustrates that, for on-premises data object repository in the on-premises application service system, the configuration singleton 1709 provides a single source of truth for that on-premises data object repository when it comes to board configuration. This single source of truth will be periodically updated from the database 1701. For example, the configuration change job scheduler 1707 may only periodically transmits query messages to trigger the data flow illustrated in FIG. 17, thereby allowing the on-premises data object repository to operate without overloading the database (in comparison to querying it for board configuration every time the plugin processes an event). As such, various embodiments of the present disclosure may improve the performance of the on-premises application service system (for example, only looking up in the database every 5 minutes, instead of potentially multiple times a second).

Additional Implementation Details

Although example processing systems have been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer-readable storage medium for execution by, or to control the operation of, information/data processing apparatus. A computer-readable storage medium can be, or be included in, a computer-readable storage device, a computer-readable storage substrate, a random or serial access memory array or device, or a combination of one or more of them. The computer-readable storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (Application Specific Integrated Circuit). The apparatus can also include, in addition to hardware, code that creates an execution environment for the computer program in question, e.g., code that constitutes processor firmware, a protocol stack, a data object repository management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory, a random-access memory, or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer needs not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., an LCD monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client device having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML (Hypertext Markup Language) page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as description of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results, unless described otherwise. In certain implementations, multitasking and parallel processing may be advantageous.

Many modifications and other embodiments of the disclosures set forth herein will come to mind to one skilled in the art to which these disclosures pertain having the benefit of the teachings presented in the foregoing description and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

The invention claimed is:

1. An apparatus for synchronizing data between an on-premises application service system and an in-cloud application service system, the apparatus comprising at least one processor and at least one non-transitory memory comprising program code, the at least one non-transitory memory and the program code configured to, with the at least one processor, cause the apparatus to at least:

transmit, by the on-premises application service system, a synchronization check message to the in-cloud application service system, wherein the synchronization check message comprises an electronic request to obtain at least one synchronization request message;

receive, by the on-premises application service system and from the in-cloud application service system, the at least one synchronization request message comprising at least one synchronization topic indicator and at least one synchronization schedule indicator;

retrieve, by the on-premises application service system and from an on-premises data object repository associated with the on-premises application service system, at least one on-premises data object based at least in part on the at least one synchronization topic indicator of the at least one synchronization request message;

transmit, by the on-premises application service system, a duplicate copy of the at least one on-premises data object to the in-cloud application service system based at least in part on the at least one synchronization schedule indicator of the at least one synchronization request message; and subsequent to transmitting the duplicate copy of the at least one on-premises data object, receive, by the on-premises application service system and from the in-cloud application service system, at least one synchronization completion success message.

2. The apparatus of claim 1, wherein the at least one non-transitory memory and the program code are configured to, with the at least one processor, cause the apparatus to at least:

receive, by the on-premises application service system, on-premises data object update metadata associated with the at least one on-premises data object stored in the on-premises data object repository associated with the on-premises application service system;

generate, by the on-premises application service system and based at least in part on the on-premises data object update metadata, at least one synchronization update message comprising at least one update topic indicator; and add, by the on-premises application service system, the at least one synchronization update message to a processing queue object of the on-premises application service system.

3. The apparatus of claim 2, wherein the processing queue object comprises a plurality of synchronization update messages, wherein the at least one non-transitory memory and the program code are configured to, with the at least one processor, cause the apparatus to process the plurality of synchronization update messages from the processing queue object by at least:

transmitting the at least one synchronization update message to the in-cloud application service system; and subsequent to transmitting the at least one synchronization update message, updating the processing queue object.

4. The apparatus of claim 2, wherein the in-cloud application service system comprises an inbound message queue table object and a message status table object, wherein the at least one non-transitory memory and the program code are configured to, with the at least one processor, cause the apparatus to at least:

transmit, by the on-premises application service system, the at least one synchronization update message to the inbound message queue table object of the in-cloud application service system; and cause the in-cloud application service system to add a message processing status indicator to the message status table object corresponding to the at least one synchronization update message.

5. The apparatus of claim 4, wherein the at least one non-transitory memory and the program code are configured to, with the at least one processor, cause the apparatus to at least:

cause the in-cloud application service system to determine whether a time period indicator between a previous message processing time indicator and a current system time indicator satisfies a message processing time interval threshold;

in response to determining that the time period indicator satisfies the message processing time interval threshold:

cause the in-cloud application service system to retrieve the at least one synchronization update message from the inbound message queue table object; and cause the in-cloud application service system to update the message processing status indicator to indicate a processing status of the at least one synchronization update message.

6. The apparatus of claim 5, wherein the at least one non-transitory memory and the program code are configured to, with the at least one processor, cause the apparatus to at least:

cause the in-cloud application service system to determine whether an in-cloud data object repository associated with the in-cloud application service system comprises at least one in-cloud data object that corresponds to the at least one on-premises data object associated with the at least one synchronization update message.

7. The apparatus of claim 6, wherein the at least one non-transitory memory and the program code are configured to, with the at least one processor, cause the apparatus to at least:

in response to the in-cloud data object repository associated with the in-cloud application service system not comprising the at least one in-cloud data object that corresponds to the at least one on-premises data object, cause the in-cloud application service system to generate a second synchronization request message associated with the at least one on-premises data object; and cause the in-cloud application service system to store the second synchronization request message in an outbound message queue table object associated with the in-cloud application service system.

8. A computer-implemented method for synchronizing data between an on-premises application service system and an in-cloud application service system, comprising:

transmitting, by the on-premises application service system, a synchronization check message to the in-cloud application service system, wherein the synchronization check message comprises an electronic request to obtain at least one synchronization request message;

receiving, by the on-premises application service system and from the in-cloud application service system, the at least one synchronization request message comprising at least one synchronization topic indicator and at least one synchronization schedule indicator;

retrieving, by the on-premises application service system and from an on-premises data object repository associated with the on-premises application service system, at least one on-premises data object based at least in part on the at least one synchronization topic indicator of the at least one synchronization request message;

transmitting, by the on-premises application service system, a duplicate copy of the at least one on-premises data object to the in-cloud application service system based at least in part on the at least one synchronization schedule indicator of the at least one synchronization request message; and subsequent to transmitting the duplicate copy of the at least one on-premises data object, receiving, by the on-premises application service system and from the in-cloud application service system, at least one synchronization completion success message.

9. The computer-implemented method of claim 8, further comprising:

receiving, by the on-premises application service system, on-premises data object update metadata associated with the at least one on-premises data object stored in the on-premises data object repository associated with the on-premises application service system;

generating, by the on-premises application service system and based at least in part on the on-premises data object update metadata, at least one synchronization update message comprising at least one update topic indicator; and adding, by the on-premises application service system, the at least one synchronization update message to a processing queue object of the on-premises application service system.

10. The computer-implemented method of claim 9, wherein the processing queue object comprises a plurality of synchronization update messages, wherein the computer-implemented method further comprises processing the plurality of synchronization update messages from the processing queue object by at least:

transmitting the at least one synchronization update message to the in-cloud application service system; and subsequent to transmitting the at least one synchronization update message, updating the processing queue object.

11. The computer-implemented method of claim 9, wherein the in-cloud application service system comprises an inbound message queue table object and a message status table object, wherein the computer-implemented method further comprises:

transmitting, by the on-premises application service system, the at least one synchronization update message to the inbound message queue table object of the in-cloud application service system; and causing the in-cloud application service system to add a message processing status indicator to the message status table object corresponding to the at least one synchronization update message.

12. The computer-implemented method of claim 11, further comprising:

causing the in-cloud application service system to determine whether a time period indicator between a previous message processing time indicator and a current system time indicator satisfies a message processing time interval threshold;

in response to determining that the time period indicator satisfies the message processing time interval threshold:

causing the in-cloud application service system to retrieve the at least one synchronization update message from the inbound message queue table object; and causing the in-cloud application service system to update the message processing status indicator to indicate a processing status of the at least one synchronization update message.

13. The computer-implemented method of claim 12, further comprising:

causing the in-cloud application service system to determine whether an in-cloud data object repository associated with the in-cloud application service system comprises at least one in-cloud data object that corresponds to the at least one on-premises data object associated with the at least one synchronization update message.

14. The computer-implemented method of claim 13, further comprising:

in response to the in-cloud data object repository associated with the in-cloud application service system not comprising the at least one in-cloud data object that corresponds to the at least one on-premises data object, causing the in-cloud application service system to generate a second synchronization request message associated with the at least one on-premises data object; and causing the in-cloud application service system to store the second synchronization request message in an outbound message queue table object associated with the in-cloud application service system.

15. A computer program product for synchronizing data between an on-premises application service system and an in-cloud application service system, the computer program product comprising at least one non-transitory computer-readable storage medium having computer-readable program code portions stored therein, the computer-readable program code portions comprising an executable portion configured to:

transmit, by the on-premises application service system, a synchronization check message to the in-cloud application service system, wherein the synchronization check message comprises an electronic request to obtain at least one synchronization request message;

receive, by the on-premises application service system and from the in-cloud application service system, the at least one synchronization request message comprising at least one synchronization topic indicator and at least one synchronization schedule indicator;

retrieve, by the on-premises application service system and from an on-premises data object repository associated with the on-premises application service system, at least one on-premises data object based at least in part on the at least one synchronization topic indicator of the at least one synchronization request message;

transmit, by the on-premises application service system, a duplicate copy of the at least one on-premises data object to the in-cloud application service system based at least in part on the at least one synchronization schedule indicator of the at least one synchronization request message; and subsequent to transmitting the duplicate copy of the at least one on-premises data object, receive, by the on-premises application service system and from the in-cloud application service system, at least one synchronization completion success message.

16. The computer program product of claim 15, wherein the computer-readable program code portions comprise the executable portion configured to:

receive, by the on-premises application service system, on-premises data object update metadata associated with the at least one on-premises data object stored in the on-premises data object repository associated with the on-premises application service system;

generate, by the on-premises application service system and based at least in part on the on-premises data object update metadata, at least one synchronization update message comprising at least one update topic indicator; and add, by the on-premises application service system, the at least one synchronization update message to a processing queue object of the on-premises application service system.

17. The computer program product of claim 16, wherein the processing queue object comprises a plurality of synchronization update messages, wherein the computer-readable program code portions comprise the executable portion configured to process the plurality of synchronization update messages from the processing queue object by at least:

transmitting the at least one synchronization update message to the in-cloud application service system; and subsequent to transmitting the at least one synchronization update message, updating the processing queue object.

18. The computer program product of claim 16, wherein the in-cloud application service system comprises an inbound message queue table object and a message status table object, wherein the computer-readable program code portions comprise the executable portion configured to:

transmit, by the on-premises application service system, the at least one synchronization update message to the inbound message queue table object of the in-cloud application service system; and cause the in-cloud application service system to add a message processing status indicator to the message status table object corresponding to the at least one synchronization update message.

19. The computer program product of claim 18, wherein the computer-readable program code portions comprise the executable portion configured to:

cause the in-cloud application service system to determine whether a time period indicator between a previous message processing time indicator and a current system time indicator satisfies a message processing time interval threshold;

in response to determining that the time period indicator satisfies the message processing time interval threshold:

cause the in-cloud application service system to retrieve the at least one synchronization update message from the inbound message queue table object; and cause the in-cloud application service system to update the message processing status indicator to indicate a processing status of the at least one synchronization update message.

20. The computer program product of claim 19, wherein the computer-readable program code portions comprise the executable portion configured to:

cause the in-cloud application service system to determine whether an in-cloud data object repository associated with the in-cloud application service system comprises at least one in-cloud data object that corresponds to the at least one on-premises data object associated with the at least one synchronization update message.

* * * * *